US012614045B2

(12) United States Patent
Wan et al.

(10) Patent No.: US 12,614,045 B2
(45) Date of Patent: Apr. 28, 2026

(54) RANGE EXTENSION AND DYNAMIC POWER CONTROL FOR LOCALIZATION ON COMMERCIAL UHF RFID READER

(71) Applicant: Intel Corporation, Santa Clara, CA (US)

(72) Inventors: Chieh-Yih Wan, Beaverton, OR (US); Eduardo Alban, Hillsboro, OR (US); Satoshi Suzuki, Hillsboro, OR (US); Robert Flory, Hillsboro, OR (US); Alex Nguyen, San Jose, CA (US); Rahul C. Shah, San Francisco, CA (US); Cagri Tanriover, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 986 days.

(21) Appl. No.: 17/553,092

(22) Filed: Dec. 16, 2021

(65) Prior Publication Data

US 2022/0108092 A1 Apr. 7, 2022

(51) Int. Cl.
*G06K 7/10* (2006.01)
*G06K 19/07* (2006.01)

(52) U.S. Cl.
CPC ..... *G06K 7/10366* (2013.01); *G06K 19/0701* (2013.01)

(58) Field of Classification Search
CPC ........................ G06K 7/10366; G06K 19/0701
See application file for complete search history.

(56) References Cited

U.S. PATENT DOCUMENTS

| | | | | |
|---|---|---|---|---|
| 5,489,908 A | * | 2/1996 | Orthmann ............ | G06K 7/0008 342/44 |
| 5,673,037 A | * | 9/1997 | Cesar ................... | G06K 7/0008 340/572.1 |
| 7,030,731 B2 | * | 4/2006 | Lastinger ........... | G06K 7/10079 714/823 |
| 7,274,907 B1 | * | 9/2007 | Perotti ............... | H04B 7/15507 455/13.1 |
| 7,916,028 B2 | * | 3/2011 | Oberle ................. | G06Q 10/087 705/28 |

(Continued)

OTHER PUBLICATIONS

Ma et al., Drone Relays for Battery-Free Networks (Year: 2017).*

(Continued)

*Primary Examiner* — Quang Pham
(74) *Attorney, Agent, or Firm* — Hanley, Flight & Zimmerman, LLC

(57) ABSTRACT

The present disclosure relates to a mobile agent in an RFID system with reduced power consumption and increased localization capabilities. In one aspect, a relay circuit attached to a mobility mechanism such as a drone or robot is in communication with an RFID reader and a backend host computer. The mobile agent moves around a warehouse, for instance, in which landmark RFID tags are arranged. The mobile agent can transmit with an adjustable power to identify a single landmark tag and associate it with object tags of one or more objects within the range of the mobile agent. The host computer can communicate with the mobile agent to instruct it to adjust its power when multiple landmark tags are detected.

25 Claims, 17 Drawing Sheets

(56) References Cited

U.S. PATENT DOCUMENTS

| | | | |
|---|---|---|---|
| 8,549,068 B2 * | 10/2013 | Choi | H04N 21/4345 |
| | | | 715/825 |
| 8,994,508 B2 * | 3/2015 | Dacus | G06K 7/0008 |
| | | | 340/3.52 |
| 9,041,517 B2 * | 5/2015 | Tietke | G06K 19/0701 |
| | | | 340/10.5 |
| 9,536,215 B2 * | 1/2017 | Rehman | G06Q 10/08 |
| 11,016,051 B1 * | 5/2021 | Sinko | B32B 3/08 |
| 11,122,519 B1 * | 9/2021 | Ichapurapu | H04W 52/20 |
| 11,691,727 B1 * | 7/2023 | Brown | G05D 1/101 |
| | | | 701/2 |
| 2004/0192189 A1 * | 9/2004 | Yuhara | H04H 40/90 |
| | | | 455/12.1 |
| 2005/0046567 A1 * | 3/2005 | Mortenson | G07C 9/00 |
| | | | 340/541 |
| 2005/0114326 A1 * | 5/2005 | Smith | G06K 7/10009 |
| 2005/0179545 A1 * | 8/2005 | Bergman | G08B 25/08 |
| | | | 340/539.1 |
| 2006/0144940 A1 * | 7/2006 | Shannon | G08B 13/2462 |
| | | | 340/572.1 |
| 2006/0176152 A1 * | 8/2006 | Wagner | G06K 7/0008 |
| | | | 340/10.2 |
| 2006/0241812 A1 * | 10/2006 | Jung | G05D 1/0044 |
| | | | 700/254 |
| 2006/0284727 A1 * | 12/2006 | Steinke | G06K 19/0723 |
| | | | 342/127 |
| 2008/0018431 A1 * | 1/2008 | Turner | G06K 7/0008 |
| | | | 340/10.2 |
| 2008/0106382 A1 * | 5/2008 | Choi | G06K 7/10049 |
| | | | 340/10.2 |
| 2008/0150696 A1 * | 6/2008 | Bolander | H02J 50/20 |
| | | | 340/10.3 |
| 2008/0224870 A1 * | 9/2008 | Yeo | G06K 19/0723 |
| | | | 340/572.1 |
| 2008/0252426 A1 * | 10/2008 | Lee | G06K 19/0701 |
| | | | 340/10.3 |
| 2008/0280560 A1 * | 11/2008 | Tuttle | H04B 5/77 |
| | | | 455/41.2 |
| 2009/0231142 A1 * | 9/2009 | Nikitin | G06K 7/0008 |
| | | | 340/572.8 |
| 2009/0243809 A1 * | 10/2009 | Sugano | G06K 7/10217 |
| | | | 340/10.2 |
| 2010/0090807 A1 * | 4/2010 | Tsujimoto | G06K 7/0008 |
| | | | 340/10.4 |
| 2010/0127829 A1 * | 5/2010 | Daneshmand | G06K 7/0008 |
| | | | 340/10.1 |
| 2010/0148933 A1 * | 6/2010 | Dacus | G06K 19/0716 |
| | | | 340/10.3 |
| 2012/0120988 A1 * | 5/2012 | Li | H04B 17/40 |
| | | | 375/211 |
| 2012/0146774 A1 * | 6/2012 | Kasai | G06K 7/10445 |
| | | | 340/10.42 |
| 2013/0154802 A1 * | 6/2013 | O'Haire | G01S 5/18 |
| | | | 367/99 |
| 2014/0298768 A1 * | 10/2014 | Head | D04C 3/24 |
| | | | 56/51 |
| 2015/0230169 A1 * | 8/2015 | Hood | H04L 43/0882 |
| | | | 370/311 |
| 2015/0282457 A1 * | 10/2015 | Yarden | A61D 17/002 |
| | | | 340/573.2 |
| 2015/0355308 A1 * | 12/2015 | Ishida | G01S 1/04 |
| | | | 455/456.1 |
| 2016/0065005 A1 * | 3/2016 | Won | H02J 50/80 |
| | | | 307/104 |
| 2017/0019754 A1 * | 1/2017 | Wilkinson | H04B 5/77 |
| 2017/0064647 A1 * | 3/2017 | Debates | G06K 7/10207 |
| 2017/0238891 A1 * | 8/2017 | Taskinen | A61B 6/547 |
| 2018/0290745 A1 * | 10/2018 | Kumada | B64D 45/00 |
| 2019/0156081 A1 * | 5/2019 | Pous | G06K 19/0723 |
| 2019/0297462 A1 * | 9/2019 | Aljadeff | G01S 13/88 |
| 2020/0050810 A1 * | 2/2020 | Watanabe | G06K 7/10425 |
| 2020/0265285 A1 * | 8/2020 | Paidimarri | G06K 7/0008 |
| 2021/0197867 A1 * | 7/2021 | Kirk | B60K 35/10 |
| 2021/0203888 A1 * | 7/2021 | Black | G06V 10/95 |
| 2021/0264120 A1 * | 8/2021 | Suzuki | G06K 7/10108 |
| 2021/0302260 A1 * | 9/2021 | Baggs | H04W 4/38 |
| 2021/0374364 A1 * | 12/2021 | Peternel | G06K 19/0724 |
| 2022/0236747 A1 * | 7/2022 | Tanaka | G08G 5/32 |
| 2022/0303331 A1 * | 9/2022 | Svennebring | H04N 21/44209 |
| 2022/0318529 A1 * | 10/2022 | Vaught | G06K 7/10297 |
| 2023/0063285 A1 * | 3/2023 | Horn | H04B 7/18504 |
| 2023/0154300 A1 * | 5/2023 | Forster | G08B 13/2474 |
| | | | 340/572.1 |
| 2023/0274107 A1 * | 8/2023 | Fujii | H04B 5/48 |
| | | | 235/451 |
| 2023/0333256 A1 * | 10/2023 | Fujii | G01S 13/762 |

OTHER PUBLICATIONS

Yunfei Ma et al., "Drone Relays for Battery-Free Networks", In Proceedings of the Conference of the ACM Special Interest Group on Data Communication, Aug. 2017 pp. 335-347.

* cited by examiner

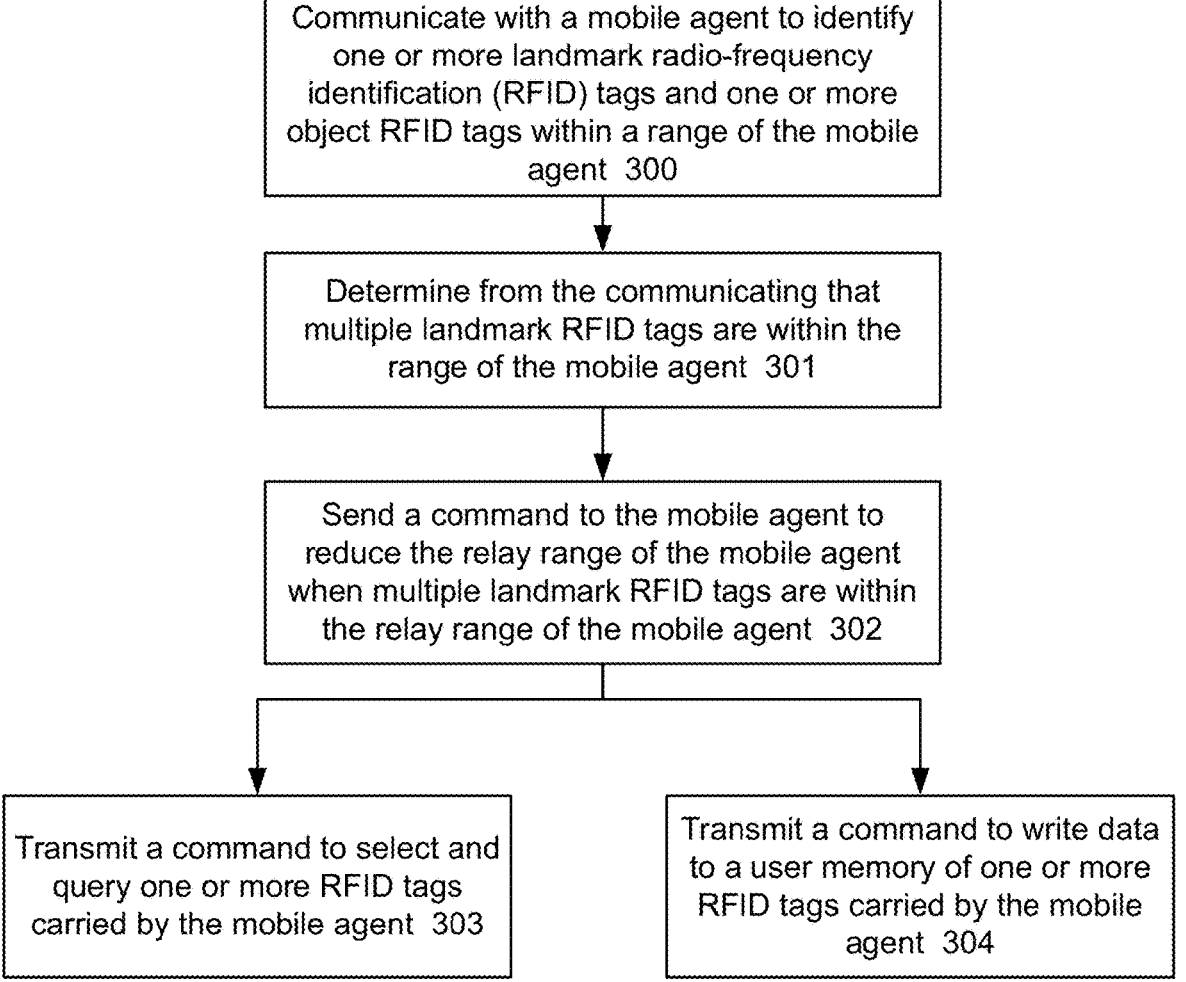

Communicate with a mobile agent to identify one or more landmark radio-frequency identification (RFID) tags and one or more object RFID tags within a range of the mobile agent  300

Determine from the communicating that multiple landmark RFID tags are within the range of the mobile agent  301

Send a command to the mobile agent to reduce the relay range of the mobile agent when multiple landmark RFID tags are within the relay range of the mobile agent  302

Transmit a command to select and query one or more RFID tags carried by the mobile agent  303

Transmit a command to write data to a user memory of one or more RFID tags carried by the mobile agent  304

1856 processor 1852
instructions 1881 trusted execution environment 1890

1860 memory 1854
instructions 1882 storage 1858
instructions 1883 output circuitry 1884 input circuitry 1886 acceleration circuitry 1864

1866
1866y
1866x
1866z network interface 1868 external interface 1870 battery 1826 battery monitor / charger 1828 edge devices 1862 edge cloud 1863 sensors 1872 actuators 1874 pos 1875 power block 1880

SDP 1905
1960

1910

PP(s) 1900
1960

1900

RANGE EXTENSION AND DYNAMIC POWER CONTROL FOR LOCALIZATION ON COMMERCIAL UHF RFID READER

TECHNICAL FIELD

The present disclosure is generally related to edge computing, cloud computing, network communication, data centers, network topologies, and communication system implementations, and in particular, to a mobile agent used to inventory objects using radio-frequency identification (RFID).

BACKGROUND

RFID systems are commonly used to keep track of inventory such as in a warehouse, library, hospital or retail store. An RFID tag is attached to the objects to be tracked while a reader transmits signals which are received by the RFID tags. For passive tags, the transmitted signal is reflected back and modulated to carry data such as an identifier of the tag, referred to as an electronic product code (EPC). The EPC is a unique number that identifies the tag and therefore the associated object. The reflected back signal, referred to as a backscatter signal, is received and decoded by the reader. For active tags, the reader receives a signal which is transmitted by the tag. Moreover, to increase the range of the signals from the reader and the tag, a relay circuit can be used. In some case, the relay circuit can be mobile. However, various challenges are presented in such systems.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which:

FIG. 3 depicts a flowchart of an example process performed by a host computer of FIG. 1A according to various embodiments.

DETAILED DESCRIPTION

Figure 1A:
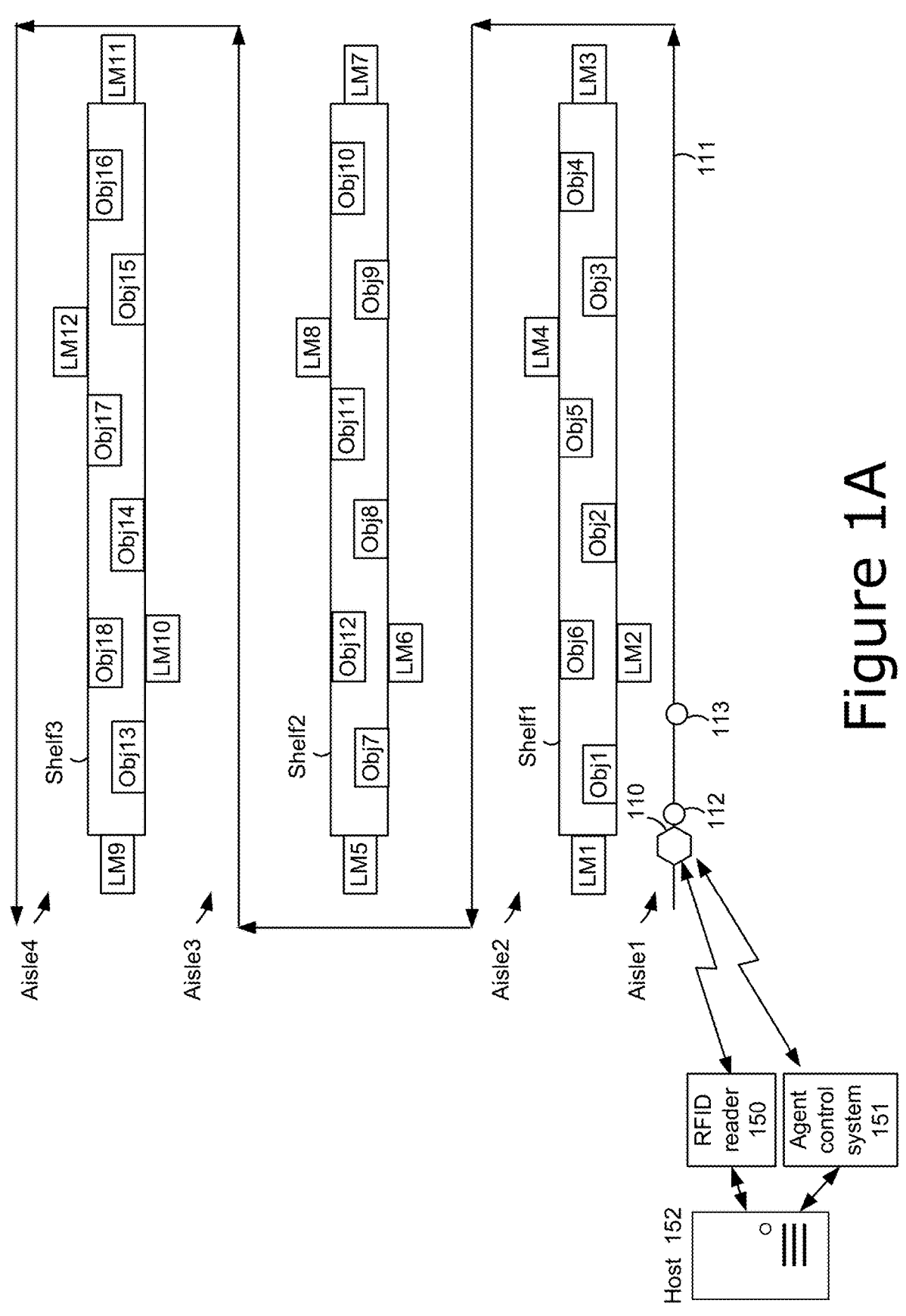
FIG. 1A depicts an example scenario in which a mobile agent looks for landmark RFID tags and object RFID tags in a warehouse according to various embodiments.

The following embodiments generally relate to a mobile agent in an RFID system with reduced power consumption and increased localization capabilities. Today, in most large warehouses, scanning and locating items mainly relies on having human operator walking through the space and scan barcodes of individual packages. Even though emerging UHF RFID based solutions promise great time efficiency and reduced labor cost for inventory management, the difficulty of providing coverage over a large area results in the total deployment cost of readers being prohibitively high. This is due to the range limitation of commercial readers, e.g., typically less than 10 meters. For a large warehouse, complete RFID coverage would require deployment of hundreds of readers, and a high cost in networking all the readers. In reality, full coverage is unattainable as many RFID tags may remain in blind spots or dead zones due to destructive interference or orientation misalignment.

In addition, locating a tag to an accuracy within a couple of meters is also important for humans or autonomous systems to access specific packages or for better inventory management. Existing solutions depend on third party hardware and software for localization rather than using the existing RFID infrastructure. This brings additional cost and complexity in terms of integration and deployment in the field.

Moreover, commercial readers currently on the market are not designed with dynamic power control and instead operate at a set transmission power level. Besides the energy consumption implications, a fixed transmission power can create deployment problems in terms of interference between different readers as well as blind spots in tag detection.

One possible solution is to mount an RFID reader on a mobile RFID reader platform such as a drone or land-based robot where a human operator remotely controls the movement of the RFID reader platform to extend the RFID coverage. This approach is limited by the communication range of the mobile RFID reader platform and/or the communication range of the client device used to operate the RFID reader platform. However, these approaches usually have high operational costs, have limited capabilities when operating in large areas such as warehouses or data centers, and increase health and safety risks due to the need for operation by humans (e.g., injuries related to physical operation of such systems). Furthermore, typical commercially available RFID readers are optimized for maximizing coverage, and therefore, have limited range control capabilities. As a result, finer-grained localization of the tag position based on the mobile RFID reader platform's position becomes a challenge. Moreover, powering the reader may impact the battery life of the mobile RFID reader platform.

Another approach is to use a fixed transmission power to relay the reader's signals. This provides a simplified implementation but may drain the battery of the relay circuit too quickly. Moreover, a localization capability can be provided by sensing signals from multiple beacons and performing triangulation. However, this approach is complex and environment dependent.

The techniques herein address the above and other issues. Various implementations discussed herein include a relay circuit that relays signals between an RFID reader and RFID tags. The relay circuit receives signals from an RFID reader, and relays the signals with an adjustable power level. The power level is adjustable based on commands received from the RFID reader. Additionally, the relay circuit relays signals from the RFID reader with enough power to reach the RFID tags within a desired range. Furthermore, through the relay with range control feature, an application running on the host can implement logic to infer the location of a particular RFID tag.

In one aspect, a mobile agent is provided, which has an adjustable transmission power level. The agent is in communication with a stationary reader to relay signals to and from a population of RFID tags including landmark tags and object tags. The landmark tags are positioned at known locations in a facility such as a warehouse while the object tags are on objects which are the inventory of the facility. When an object tag is detected, the mobile agent can report an identifier of the object tag along with the identifier of a landmark tag which is closest to the object tag. When the mobile agent reports that multiple landmark tags are within its range, the reader, with the assistance of a backend host computer, instructs the mobile agent to reduce its transmission power until a single landmark tag is within its range. The mobile agent then reports back the identifier of the single landmark tag to identify the location of the object tag. The host computer can maintain a database of object tag identifiers cross-referenced to landmark tag identifiers to keep track of the locations of the associated objects.

In one approach, the mobile agent can move past the objects to obtain an inventory of all objects which are present. In another approach, the mobile agent moves past the objects to locate a particular specified object.

The instructions to reduce power can be achieved using various communication protocols involving on-board RFID tags on the relay circuit. In one approach, each on-board RFID tag generates a bit of data when it is queried by the reader. There may be more than one bit of information (i.e., multiple tags on board the mobile agent). In particular, the RFID chip of an on-board tag which is queried generates an interrupt for a microprocessor which is interpreted as a 1 bit, for example. The RFID chip of an on-board tag which is not queried does not generate an interrupt and this is interpreted as a 0 bit, for example. In another approach, the reader transmits a write command to an on-board RFID tag for storage in a user memory of the tag, and the data which is written is transferred from the user memory to a microprocessor via a serial interface.

The data which is communicated to the relay circuit can comprise an instruction to reduce power such as by temporarily going into a sleep mode, to recall the mobile agent for maintenance or charging, or to perform some other function.

The techniques can be used with existing RFID readers, without modifying the readers, including those that support the Gen 2 standard, to minimize implementation complexity. In these ways, the implementations discussed herein reduce the number of readers needed for a given area in comparison to existing RFID systems/networks. Additionally, unlike existing approaches, the implementations discussed herein can be used with autonomous mobile platforms, and can be used in deployment scenarios where vision-based systems may not be practical due to occlusions, lighting concerns, and/or the like. These and other advantages are discussed further infra.

FIG. 1A depicts an example scenario in which a mobile agent 110 looks for landmark RFID tags and object RFID tags in a warehouse according to various embodiments. The warehouse includes objects such as goods to be managed by an RFID system, where each object has an associated RFID tag attached. The objects are located on shelves which are separated by aisles. The managed objects are typically static but examples are possible where the managed objects are moving such as with livestock or other animals.

In this example, the shelves are Shelf1-Shelf3 and the aisles are Aisle1-Aisle4. Shelf1 includes objects Obj1-Obj6, Shelf2 includes objects Obj7-Obj12 and Shelf3 includes objects Obj13-Obj18. Additionally, a number of landmark RFID tags are positioned at predetermined locations in the warehouse. In this example, four landmark tags are provided for each shelf: one tag at each end and two tags partway down an aisle. Specifically, Shelf1 includes landmark tags LM1-LM4, Shelf2 includes landmark tags LM5-LM8 and Shelf3 includes landmark tags LM9-LM12.

A mobile agent 110 moves in the warehouse along a path 111, such as along each aisle from one end to another and then along the next aisle. A relay circuit 811 (see e.g., FIGS. 8 and 10) is disposed on the mobile agent 110 or embedded in the mobile agent 110. As discussed in more detail infra, the relay circuit 811 relays signals from the RFID tags to the RFID reader 150 and relays signals from the RFID reader 150 to one or more RFID tags within a range of the relay circuit 811. The movement of the agent 110 depends on the task it is performing. For example, to obtain an inventory of each object, the agent 110 would move up and down each aisle until all aisles were traversed. To locate a specific object, the agent 110 would move up and down successive aisles until the object was located. Note that movement along an aisle is one example. The agent 110 could move in other directions such as across aisles, in a circular or spiral pattern and so forth, in particular when the agent 110 comprises a flying drone. Additionally or alternatively, the agent 110 can operate simultaneous localization and mapping (SLAM) algorithms and/or other Artificial Intelligence (AI)/Machine Learning (ML)-based navigation models to generate/determine the path 111 or otherwise traverse the warehouse based on, for example, sensor data (e.g., LiDAR, etc.) and/or the detected signals from the RFID tags.

The mobile agent 110 communicates with an RFID reader 150 and an agent control system 151. The RFID reader 150 is involved in the RFID communications while the agent control system 151 is involved in controlling the mobility components of the agent 110. In some implementations, the mobile agent 110 is fully autonomous and does not rely on communications from the agent control system 151, although the agent control system 151 could still be used to override the autonomous control mechanisms of the mobile agent 110. As mentioned previously, the mobile agent 110 can be of any type of machine/device/system capable of moving about the warehouse, such as, for example, a land-based robot or a flying drone. The RFID reader 150 and agent control system 151 communicate with a host computer 152. The host computer 152 may be the same or similar as the computing node 1850 of FIG. 18 (discussed infra). The host computer 152 may maintain or otherwise access a database of identifiers of objects and landmark tags, for instance. The host computer 152 may also execute software or other instructions for instructing the RFID reader 150 in communicating with the mobile agent 110. For example, the host computer 152 may instruct the RFID reader 150 to transmit commands to the relay circuit 811 of the mobile agent 110 to adjust its transmission power for relaying signaling to/from the RFID tags.

By performing the power adjustment tasks at the host computer 152, a standard RFID reader 150 can be used. One example is an RFID reader conforming to the Gen2 protocol, the current standard for ultra-high frequency (UHF) passive RFID readers and tags. In some implementations, the RFID reader 150 and/or the agent control system 151 may be software and/or hardware elements of the host computer 152.

Figure 2:
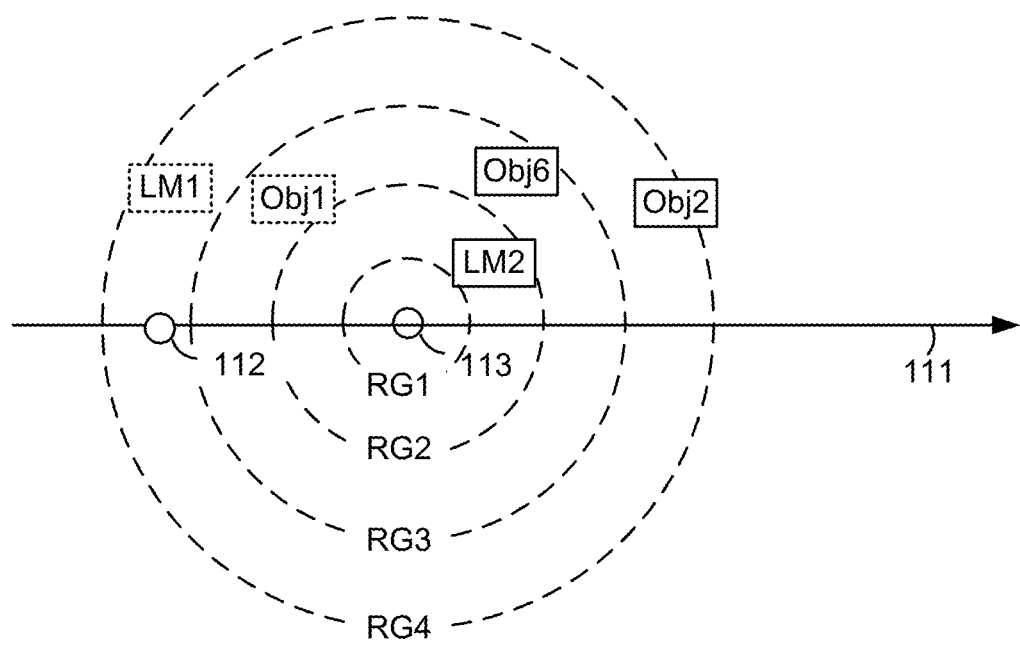
FIG. 2 depicts different transmission ranges of the mobile agent of FIG. 1A at a location, and RFID tags within the ranges, according to various embodiments.

As the mobile agent 110 moves, its transmission range encompasses different tags. For example, when the mobile agent 110 is at the location 113 on the path 111, it may have a range as depicted in FIG. 2. A location 112 on the path 111 is also depicted.

Figure 1B:
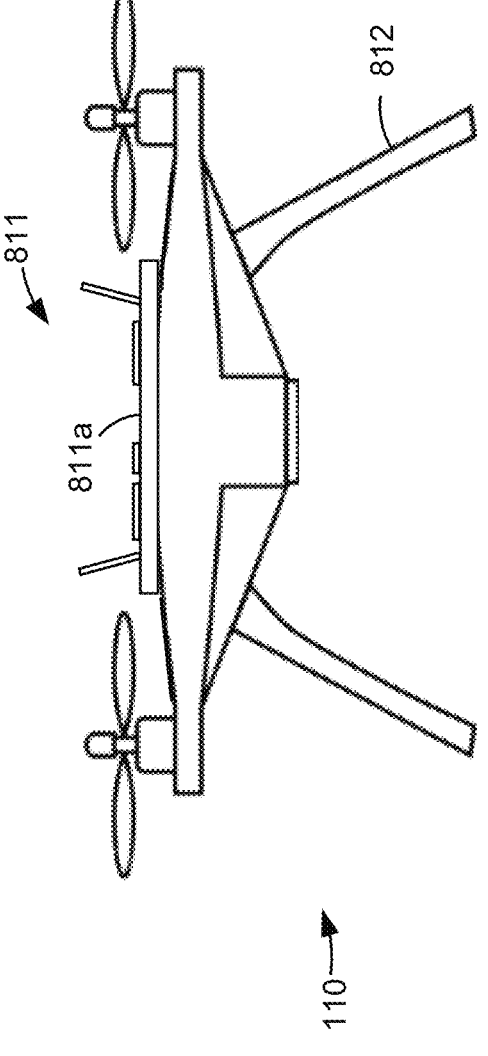
FIG. 1B depicts an example implementation of the mobile agent of FIG. 1A, according to various embodiments.

FIG. 1B depicts an example implementation of the mobile agent 110 of FIG. 1A, according to various embodiments. The mobile agent includes a mobility mechanism 812 and a relay circuit 811. Here, the mobility mechanism 812 may refer to an entirety of the drone depicted by FIG. 1B, or the mobility mechanism 812 may refer to specific components/ elements of the drone 812 such as individual propellers of the depicted drone. The mobile agent may be a drone or other autonomous vehicle such as a robot, car, etc. The relay circuit 811 includes components such as a microprocessor, antennas, amplifiers, and other components on a printed circuit board (PCB) 811a, in one approach. See FIG. 10 for a detailed implementation of the relay circuit 811.

FIG. 2 depicts different transmission ranges, or relay ranges, of the mobile agent 110 of FIG. 1A at the location 113, and RFID tags within the ranges, according to various embodiments. As mentioned, various advantages can be achieved by providing the relay circuit 811 with an adjustable transmission power which results in different transmission (relay) ranges. A transmission range is a distance or range of distances in which a passive RFID tag can receive a signal from the relay circuit 811 and reflect it back so that it can be detected by the relay circuit 811 and relayed to the reader 150. In this example, the transmission range is assumed to be circular for simplicity. However, other shapes may be provided depending on factors such as the type of antenna used.

Here, RG4 represents the maximum range, RG3 represents the second largest range, RG2 represents the third largest range, and RG1 represents the smallest range. Additionally, LM2 is within the range RG2, Obj 1 and Obj6 are within the range RG3 and LM1 and Obj2 are within the range RG4. If the mobile agent 110 is transmitting with the highest power level, multiple landmark tags, LM1 and LM2, will be detected. In order to detect the closest landmark tag to the mobile agent 110, the mobile agent 110 can reduce its transmit power in one or more steps until only a single landmark tag is within its range. For example, by reducing the range from RG4 to RG3, LM1 becomes out of range and LM2 is the sole in-range landmark tag. Thus, Obj2 and Obj6 can be associated with the location of LM2. The landmark tag which is closest to the mobile agent 110 when an object tag is detected can therefore be used as a location identifier of the object.

When the mobile agent 110 was previously at the location 112 on the path 111, LM1 was the closest landmark tag to the mobile agent 110 when Obj 1 was detected. Accordingly, Obj 1 can be associated with the location of LM2.

Note that the granularity in which the location of an object is determined is based on the spacing between the landmark tags. A larger number of tags spaced closer together yields a more accurate location determination.

FIG. 3 depicts a flowchart of an example process performed by the host computer 152 of FIG. 1A according to various embodiments. In one approach, the process is performed by the host computer 152 via the reader 150. This process can be implemented using a mobile agent having full duplex communication, along with statically positioned passive landmark tags to coarsely locate target RFID tags. The process uses dynamic power control to reduce interference with other RFID readers in the environment and to further refine locations of the target RFID tags.

Step 300 includes communicating with a mobile agent 110 to identify one or more landmark radio-frequency identification (RFID) tags and one or more object RFID tags within a range of the mobile agent 110. The host computer 152 may have a list of identifiers such as EPCs which have been reserved for use with the landmark tags. When a landmark tag is within the range of the mobile agent 110, the reader 150 will query the tag to obtain its EPC and provide it to the host computer 152. The host computer 152 can then compare the EPC to its list. Step 301 includes determining from the communicating that multiple landmark RFID tags are within the range of the mobile agent 110. The host computer 152 may determine this, e.g., when the different EPCs of multiple landmark RFID tags are received while the mobile agent 110 is stationary. In another approach, the host computer 152 may determine this when the different EPCs of multiple landmark RFID tags are received within a specified time window.

Step 302 includes sending a command to the mobile agent to reduce the transmission range of the mobile agent when multiple landmark RFID tags are within the relay range of the mobile agent. See FIGS. 4 and 5 for further example scenarios. In one approach, step 302 is implemented using step 303, which includes transmitting a command to select and query one or more RFID tags carried by the mobile agent 110. See also FIGS. 11A to 11C and 12. In another approach, step 302 is implemented using step 304, which includes transmitting a command to write data to a user memory of one or more RFID tags carried by the mobile agent 110. See also FIG. 13.

The relay range can be reduced at step 302 until a single landmark tag and one or more object tags are within the range of the mobile agent. In some cases, there may be two or more landmark tags at a similar distance from the mobile agent such that one cannot be distinguished over the other by adjusting the relay range. In this case, the relay range can still be reduced to reduce the number of landmark tags within the range of the mobile agent. In one possible scenario, the reduced range includes one or more landmark tags but no object tags, such as when the mobile agent is closer to the landmark tag than to the object tag.

Another possible feature involves adjusting the power level based on a density of RFID tags within the relay range of the relay circuit. For example, the power level can be adjusted as the relay circuit moves relative to a population of RFID tags such as the objects on the shelves in FIG. 1A.

The power level can be set relatively high when the density of objects is relatively low. For example, in FIG. 1A, the objects on Shelf1 may be relatively large such that the density of tags is relatively low. In this case, a relatively high power level will result in a relatively large relay range. However, this is acceptable as the number of responding tags will not be excessive. The objects on Shelf2 may be relatively small such that the density of tags is relatively high. In this case, a relatively low power level will result in a relatively small relay range. This is appropriate to avoid an excessive number of tags responding to queries relayed by the mobile agent, resulting in an excessive number of collisions which can increase the time needed to read the tags.

Figure 4:
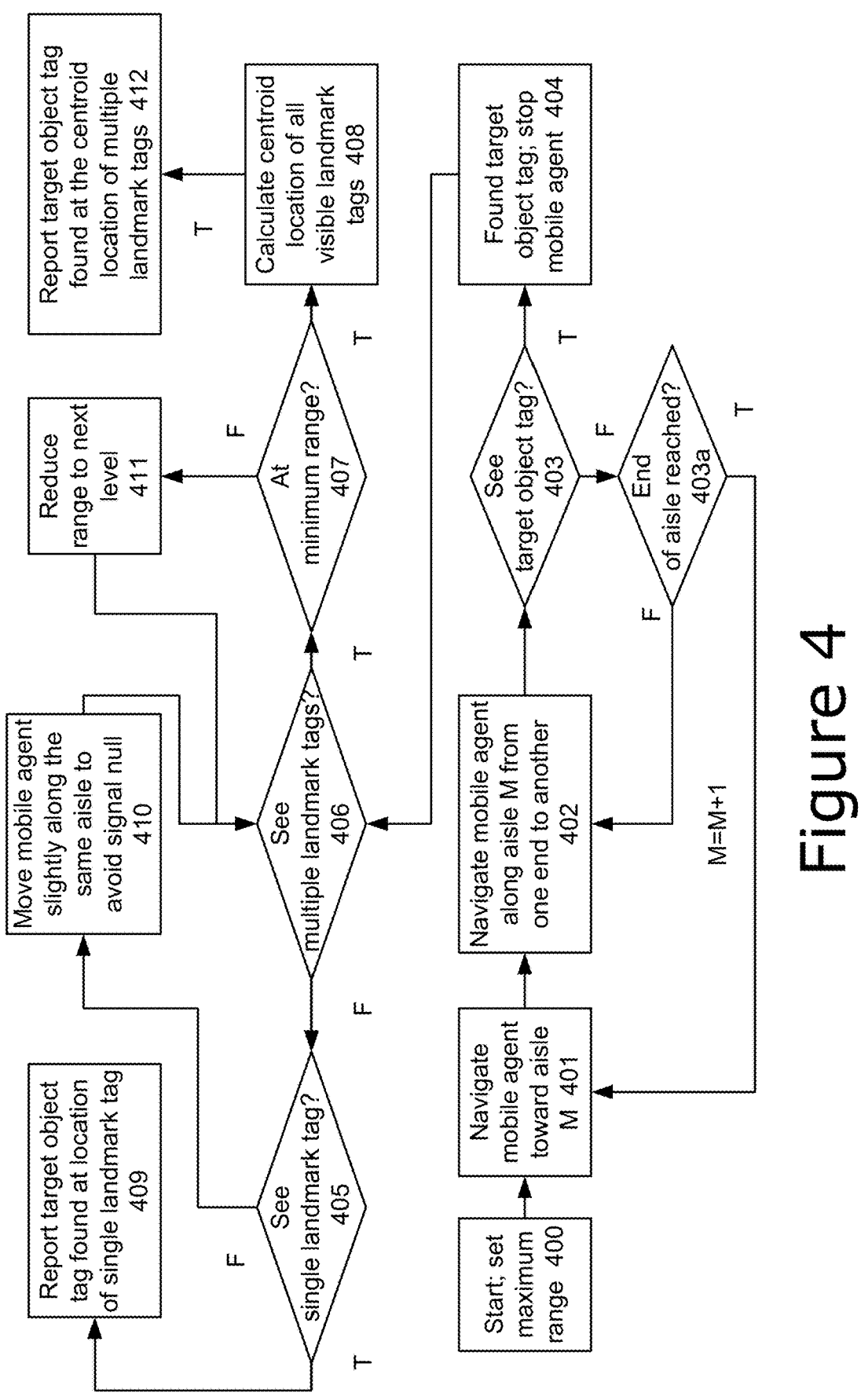
FIG. 4 depicts a flowchart of an example process for finding a target object tag according to various embodiments.

FIG. 4 depicts a flowchart of an example process for finding a target object tag according to various embodiments. The techniques disclosed herein enable real-time dynamic range control of a mobile agent 110 to support inventory operations in warehouses and factories, for instance. This example can involve locating a specific tagged item with a known EPC. A goal may be to find an object which is needed for sale or other use, or to find an object which is missing from its expected location. The deployment plan ensures multiple landmark tags are attached along the shelves of every aisle and at least one is visible within the range of the mobile agent 110, while tags located at different aisles are outside of the range of the mobile agent 110. Another use case is enabling self-localization of the mobile agent 110 to assist in the navigation of the mobile agent 110. That is, the mobile agent 110 can determine its own location from the nearest landmark tag.

The search for the object can involve controlling the mobile agent 110 to systematically traverse the aisles while continuously relaying query transmissions from the reader 150 for any tags within range.

The process starts at step 400, which includes setting a maximum range for the relay transmission of the mobile agent 110. This may correspond to R4 in FIG. 2, for example. The maximum range may be set by default in the MA without requiring an instruction from the reader 150. Step 401 includes navigating the relay toward a particular Mth aisle, e.g., M=1. Step 402 includes navigating the mobile agent 110 along aisle M from one end to another. As the mobile agent 110 is moving along the aisle, a decision step 403 determines whether the mobile agent 110 sees the target object tag, e.g., whether the target object tag is within the range of the relay. If the decision step 403 is false (F), a decision step 403a determines whether the end of the aisle is reached by the mobile agent 110. If the decision step 403a is false, step 402 continues in which the mobile agent 110 continues to move along the aisle. If the decision step 403a is true (T), the aisle identifier M is incremented, e.g., M=M+1, and the mobile agent 110 navigates to the next aisle at step 401. If the decision step 403 is true, step 404 indicates the object has been found and the mobile agent 110 is stopped. As mentioned, the movement of the mobile agent 110 can be controlled by an agent control system 151, in one option.

A decision step 406 determines whether the mobile agent 110 sees multiple landmark tags. If the decision step 406 is false, a decision step 405 determines whether the mobile agent 110 sees a single landmark tag. If the decision step 405 is true, step 409 reports the target object tag was found at the location of the single landmark tag and the process is done. Seeing a tag refers to detecting a signal from the tag.

If the decision step 405 is false, no landmark tag is within the range of the mobile agent 110. In this case, step 410 includes moving the mobile agent 110 slightly along the same aisle to avoid a signal null and attempt to detect a landmark tag. The decision step 406 then follows.

If the decision step 406 is true, a decision step 407 determines whether the mobile agent 110 is at its minimum range, e.g., RG2 in FIG. 2. If the decision step 407 is false, step 411 reduces the range to the next level and the decision step 406 follows. If the decision step 407 is true, step 408 calculates a centroid location of all visible landmarks tags and step 412 reports the target object tag as being found at the centroid location of multiple landmark tags and the process is done. Alternatively, the EPCs of the multiple landmark tags are reported to the reader 150 and host computer 152 without the mobile agent 110 determining the centroid at the mobile agent 110. The centroid can optionally be determined at the host computer 152, for example.

Figure 5:
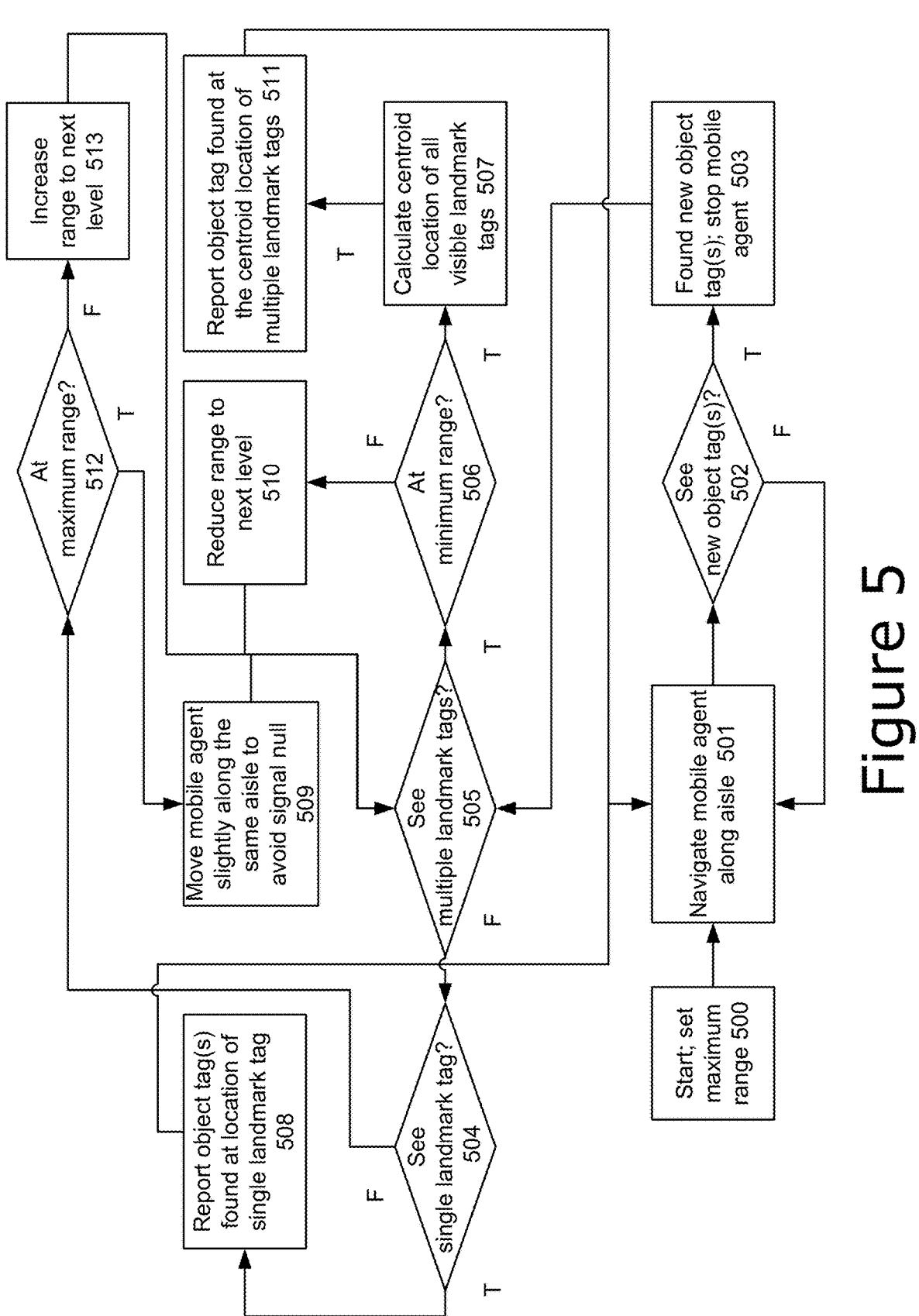
FIG. 5 depicts a flowchart of an example process for taking an inventory of object tags according to various embodiments.

FIG. 5 depicts a flowchart of an example process for taking an inventory of object tags according to various embodiments. In this scenario, a goal may be to find all objects to update an inventory record. In one option, the EPCs of the objects can be filtered based on specified bits in the EPC so that the inventory is for a subset of all objects. The search for the objects can involve controlling the mobile agent 110 to systematical traverse the aisles of a warehouse, for instance, while continuously relaying query transmissions from the reader 150 for any in-range tags, or for in-range tags having specified bits in their EPC. The EPC commonly comprises 96 or 128 bits.

The process involves navigating an aisle of products and can be repeated for multiple aisles. The process starts at step 500, which includes setting a maximum range for the relay transmission of the mobile agent 110. Step 501 includes navigating the mobile agent 110 along an aisle. As the mobile agent 110 is moving along the aisle, a decision step 502 determines whether the mobile agent 110 sees new object tag(s), e.g., whether new object tag(s) are within the range of the mobile agent 110. The object tags are new if they have not previously been seen by the mobile agent 110 and relayed to and stored at the host computer 152. If the decision step 502 is false (F), step 501 continues in which the mobile agent 110 continues to move along the aisle. If the decision step 502 is true (T), step 503 indicates the object has been found and the mobile agent 110 is stopped.

A decision step 505 determines whether the mobile agent 110 sees multiple landmark tags. If the decision step 505 is false, a decision step 504 determines whether the mobile agent 110 sees a single landmark tag. If the decision step 504 is true, step 508 reports the object tag(s) are found at the location of the single landmark tag. The process then continues at step 501. The process is done for the aisle when the relay reaches the end of the aisle.

If the decision step 504 is false, no landmark tag is within the range of the mobile agent 110. In this case, a decision step 512 determines whether the mobile agent 110 is at its maximum range. If the decision step 512 is false, step 513 increases the range to the next level by increasing the transmission power of the mobile agent 110. The decision step 505 is then reached again. If the decision step 512 is true, step 509 includes moving the mobile agent 110 slightly along the same aisle to avoid a signal null and attempt to detect a landmark tag.

If the decision step 505 is true, a decision step 506 determines whether the mobile agent 110 is at its minimum range. If the decision step 506 is false, step 510 reduces the range to the next level and the decision step 505 follows. If the decision step 506 is true, step 507 calculates a centroid location of all visible landmarks tags and step 511 reports the object tag as being found at the centroid location of multiple landmark tags. Step 501 then follows. Alternatively, the EPCs of the multiple landmark tags are reported to the reader 150 and host computer 152 without determining the centroid at the mobile agent 110, and the centroid can optionally be determined at the host computer 152.

Figure 6:
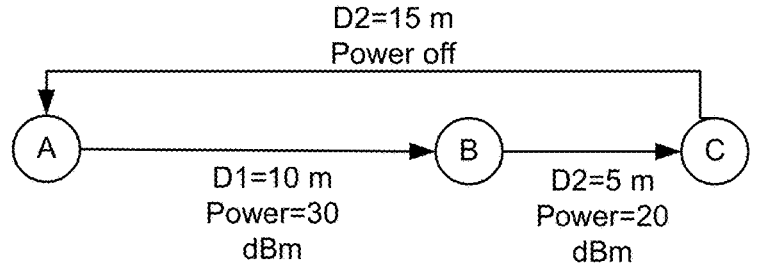
FIG. 6 depicts an example of movements of the mobile agent using a reduced transmission power according to various embodiments.

FIG. 6 depicts an example of movements of the mobile agent using a reduced transmission power according to various embodiments. In this scenario, there is an RFID tag at each position A, B and C. Further, assume the mobile agent 110 has a preprogrammed mission to travel from A to B a distance of 10 m, then from B to C, a distance of 5 m, and then return from point C to point A, distance of 15 m. In a first case, the mobile agent 110 has a relay board that does not have an adjustable power control as described herein. As a result, the tag scans at each point A, B and C are performed with a fixed transmission power of, e.g., 30 dBm. dBm, or Decibel-milliwatt, is the output power in decibels referenced to 1 mW. The relay board may be powered using an independent battery pack that is exclusively used for scanning the tags in the environment.

In a second case, the mobile agent 110 is retrofitted using a relay board with dynamic power control, which allows it to stay at 30 dBm transmission power while travelling between points A and B, and to switch to 20 dBm transmission power while travelling between points B and C. The reduced power can be used since the separation between the two tags at B and C is shorter than the separation between the two tags at A and B. In both cases, the relay boards are assumed to power down completely on their way back to point A from point C. It is also assumed for this example that the mobile agent 110 travels at a constant speed of 1 m/s and the battery supply voltage is 7.4 V.

Figure 7:
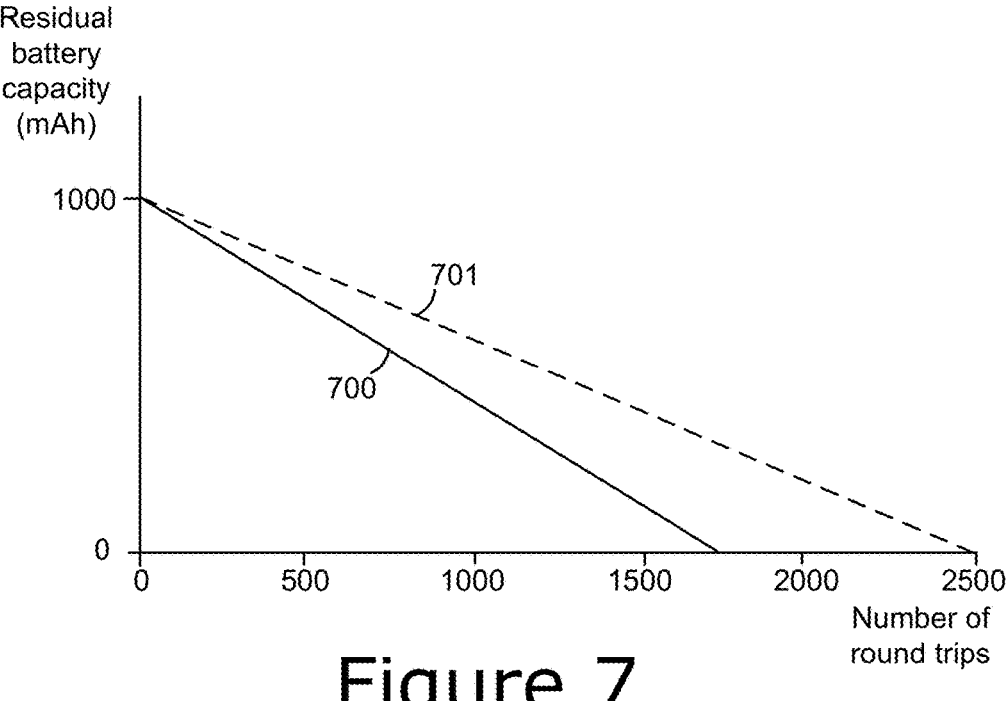
FIG. 7 depicts an example plot of a savings in battery life for the mobile agent according to various embodiments.

FIG. 7 depicts an example plot of a savings in battery life for the mobile agent according to various embodiments. The horizontal axis depicts a number of round trips of the mobile agent 110, e.g., from A to B to C and back to A in FIG. 6. The vertical axis depicts the residual battery capacity in mAh. Plot 700 depicts the case of no adjustment to the transmission power of the relay, and plot 701 depicts the case of an adjustment to the transmission power of the relay. It can be seen that the power adjustment results in a significant number of extra round trips, e.g., from 1750 to 2500 round trips—a 42% increase.

In a specific example, the battery charge consumption is calculated based on the above assumptions in FIG. 6. The results are for a 1000 mAh battery installed on the mobile agent 110. See the battery 1070 of FIG. 10. The number of round trips performed in each case is given on the x-axis. The relay board without the power control completely depletes the battery after 1770 round trips (plot 700) while the board with power control can perform 750 more round trips (plot 701). This represents a significant increase of 42% in the RFID tag scan time.

Figure 8:
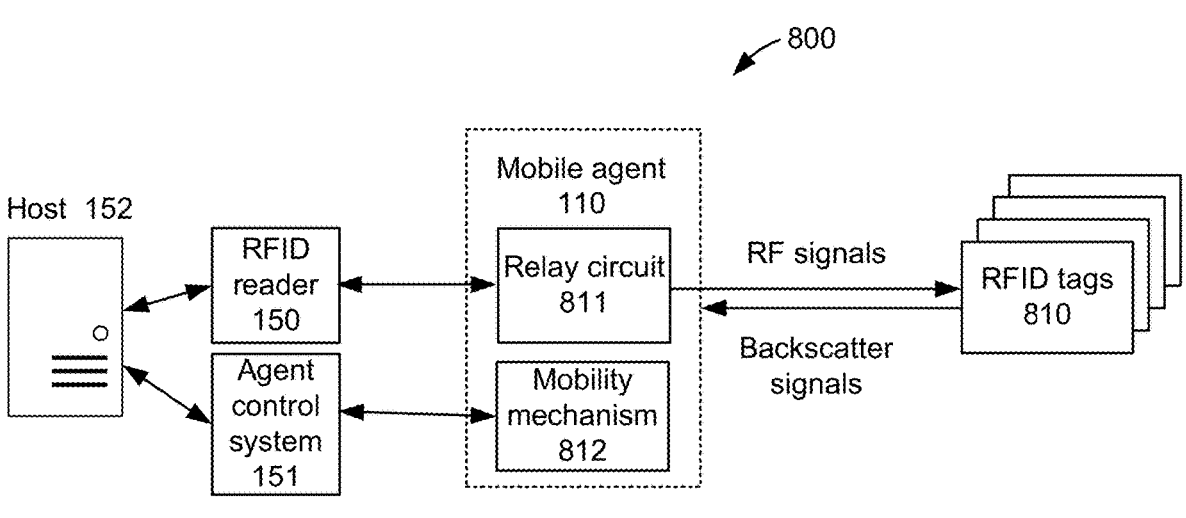
FIG. 8 depicts an example RFID system according to various embodiments.

FIG. 8 depicts a system 800 comprising the RFID reader 150, agent control system 151, host computer 152, mobile agent 110 and a population of RFID tags 810, consistent with FIG. 1A and according to various embodiments. The RFID reader 150, agent control system 151 and host computer 152 are as depicted in FIG. 1A and as discussed previously. The mobile agent 110 includes a relay circuit 811 and a mobility mechanism 812, such as a drone or robot, as mentioned previously. The mobility mechanism 812 may include devices or components that allow the mobility mechanism 812 to propel itself or otherwise move along the path 111 (e.g., actuators 1874 of FIG. 18 discussed infra). The relay circuit 811 transmits radio frequency (RF) signals to a population of RFID tags 810 and receives backscatter signals in response, in the case of passive tags. The RF signals represent a relaying of corresponding RF signals from the reader 150 in a downlink channel of the relay circuit 811. The backscatter signals are relayed to the reader 150 in an uplink channel of the relay circuit 811. See FIGS. 9A to 9C and 10 for further details. The relay circuit 811 is a signal booster or repeater.

The system provides a number of advantages including greatly extending the range of a reader via a low-cost mobile relay, thereby significantly reducing the number of readers needed to ensure coverage. The system provides a reference relay design with has a small footprint and is lightweight to allow retrofitting of autonomous platforms such as drones, robots or similar mobility mechanisms to support various Internet of Things (IoT) applications at the edge of a network. At the same time, the system provides a self-localization capability for the mobile agent 110 without the need for a costly third-party localization service. The system also provides dynamic power control to localize a tag of interest such that it can be easily retrieved later.

These features enable innovative smart warehouse usages in addition to significant savings in deployment cost. The system includes three core components. First, a lightweight relay circuit can transparently extend the range of a commercial reader, such that the reader controls all the inventory rounds, including decoding etc. while the relay circuit 811 acts as a transparent "pipe" between the reader and the tags. Second, a lightweight communication channel is fully compatible with Gen2 protocols between the reader 150 and the relay circuit 811 so that a host computer 152 controlling the reader 150 can decode the EPC and trigger dynamic power control on the relay at the right time. Due to this compatibility, the reader 150 does not need to add any other communication mechanism (e.g., Wi-Fi, Bluetooth, etc.) to communicate with the relay and can be used to control other aspects of the relay as well (such as turning it on/off, etc.) that does not require high bandwidth. Third, self-sufficient landmark (stationary) tags provide a coarse localization, as an alternative to vision-based approaches or Wi-Fi/Beacon based solutions.

The solutions can be implemented independent of the reader platform. Moreover, the solution can be retrofitted into inventory control systems in warehouses and other settings including those utilizing Industrial Supply Chain and Global Supply Chain systems. These systems have features such as inventory control, locating specific objects, etc. and are typically deployed as part of complete systems comprising servers, small form factor personal computers (PCs) and RFID readers, etc. all integrated into one solution. The technique can be retrofitted into such systems to enable RFID solutions which would otherwise be cost-prohibitive or infeasible due to the logistics of deploying numerous readers in warehouse or other space. Moreover, given that the cost of relay hardware is expected to be far lower than a commercial RFID reader, the RFID coverage expansion makes the addition of this cheaper component as part of an RFID system attractive.

For example, the solutions can be useful to online retailers who digitize inventory information to increase sales. The solutions can also be useful to retail stores which need to track availability and the location of certain goods such as for grocery delivery and pick up.

Through integrating the proposed solution, various benefits can be achieved. These include a significantly lower deployment cost. This technology reduces the number of readers by an order of magnitude and all the associated deployment/networking costs, while adding the cost of a low-cost consumer grade drone and relay board (e.g., a printed circuit board or PCB 811*a*). Another benefit is supporting a fully automated operation and significantly lowering the operating costs compared to using handheld readers with human operators. Another benefit is enabling the deployment of RFID inventory systems in locations where vision-based inventory systems may not be practical due to occlusion and lighting concerns. Another benefit is that mobile relays can provide much better coverage than fixed-reader deployments since their motion can reduce the problems of RF-dead spots and zones.

Another benefit is fitness for real-world deployments that use commercially available and Federal Communications Commission (FCC)-compliant RFID systems. For example, the solution supports general broadcast-based inventory (and simultaneous localization) applications where the EPCs of tags in the environment are unknown. The solution works with commercially available RFID readers with frequency hopping and can be seamlessly integrated with the real-world FCC compliant RFID systems.

Another benefit is flexibility of use by multiple RFID readers in the environment. The relay circuit 811 of the mobile agent 110 can provide shared use between different RFID readers. In this shared use case, the relay circuit 811 can also detect common regions of coverage where transmissions from multiple RFID readers overlap in real field applications. Upon detecting these overlap regions, the relay circuit 811 can adaptively turn itself off or be turned off to ensure connection to a single target RFID reader once outside of such overlap regions.

Another benefit is interference mitigation and battery efficiency enabled by dynamic power control. This is in contrast to systems which operate on fixed power resulting in high battery consumption and potential interference. The dynamic power control not only extends the uninterrupted operation period on a single battery charge but also minimizes interference in spaces where multiple RFID readers may be operating concurrently. Further, a power control block of the relay circuit 811 eliminates the need to calibrate uplink/downlink power levels using variable gain amplifiers.

Another benefit is reduced system complexity as it performs coarse localization by using the passive landmark RFID tags statically positioned in the environment rather than by performing complex computations. Once these landmark tags are detected by the relay board, because their positions are known and fixed, no sensitive and complex phase calculations are required. This reduced complexity also helps in terms of extending the battery life on the mobile agent 110.

For example, the coarse localization feature can be a strong enabler for taking the online shopping experience of today to a whole new level in the future. Imagine a shopper connecting remotely to a mobile agent deployed in a physical store. When the shopper raises a request to browse the shelves, e.g., for cookware, the mobile agent can move towards the cookware aisle using coarse localization, similar to the way a person browses while in a store. The mobile agent will make its way towards the correct aisle by sequentially detecting RFID tags installed along its route while gradually reducing its transmission power as it approaches the target location. When the drone reaches the target shelf, the shopper can see the available items through a camera on the mobile agent.

Figure 9A:
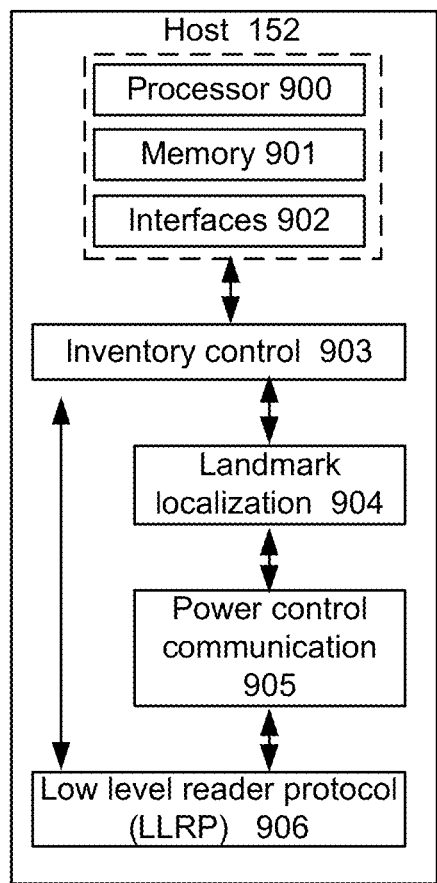
FIG. 9A depicts an example host computer configuration according to various embodiments.

FIG. 9A depicts an example configuration of the host computer 152 of FIG. 8 according to various embodiments. The host computer 152 includes a processor 900, memory

901 and interfaces 902. The memory may store instructions for execution by the processor to provide the techniques described herein. The interfaces allow the host computer 152 to communicate with the RFID reader 150 and, optionally, the agent control system 151. These components are used to provide an inventory control application 903.

The inventory control application stores data identifying objects and their location in a facility such as a warehouse. During an RFID tag inventory process, the reader 150 sends out a query, and tags in the field that are within RF range respond to the reader 150. The query serves both as a mechanism to power up the passive tags and a means to communicate with the tags. The data identifying an object can be an EPC number of an RFID tag attached to the object, and the data identifying the location can be the EPC number of the landmark tag which is closest to the object. The inventory control application includes a landmark localization application 904 and a power control communication application 905. The host computer 152 can implement the inventory control application 903 on top of any commercial Gen2 readers through Low Level Reader Protocol (LLRP) or software development kit (SDK) libraries provided by the reader manufacturer. See the LLRP application 906.

The landmark location application can involve techniques such as depicted in FIGS. 4 and 5 to identify a landmark tag which is closest to the mobile agent 110. The landmark localization application localizes RFIDs in the environment without a global positioning system (GPS) or third party indoor localization system, leveraging the dynamic power/range control on the relay circuit 811 and the lightweight power control communication feature that is fully transparent to the Gen2 readers and tags. The landmark localization block leverages pre-deployed stationary tags attached at known locations, e.g., landmark tags, and a local database that maps each landmark tag's unique ID (EPC) to its location.

In one embodiment, landmark tags can be attached to the front, middle and end portions of a shelf along an aisle. When a landmark tag is within the radio range of the relay circuit 811 and shows up in the list of decoded EPCs on the host computer 152, the landmark localization block knows its position can be approximated using the location of the landmark tag, within the error margin defined by the radio range. If multiple landmark tags are detected up at the same time, e.g., within a specified time period, the landmark localization block can further narrow down the positioning by sending a signal to the relay to reduce its effective downlink range, e.g., until only one landmark tag remains on the list.

The power control communication application can involve techniques such as depicted in FIGS. 11A to 13 for communicating with a mobile agent 110 via the reader 150 to set a transmission power of the mobile agent 110. The power control communication application implements a lightweight signaling protocol between the host computer 152 and the relay circuit 811 based on the Gen2 SELECT operation or the Gen2 WRITE operation, for example, for the purpose of dynamic power/range control. In one embodiment, consistent with FIGS. 11A to 12, two RFID tags are used on the relay to implement a 2-bit or 4-level range control signaling protocol. The number of bit levels can be extended depending on the application.

Moreover, the power control application removes the need for a static calibration in every new environment to maximize the downlink transmission range to tags without saturating the uplink receive channel (Rx).

Figure 9B:
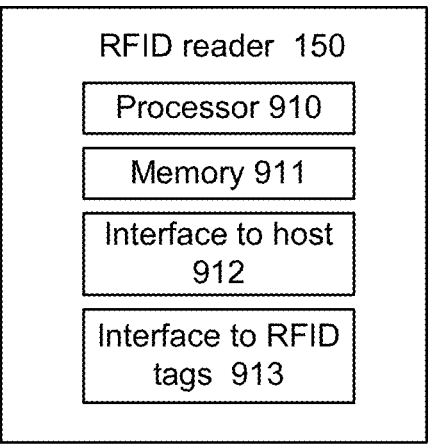
FIG. 9B depicts an example RFID reader configuration according to various embodiments.

FIG. 9B depicts an example configuration of the RFID reader 150 of FIG. 8 according to various embodiments. The reader 150 includes a processor 910, memory 911, an interface to the host computer 912 and an interface to the RFID tags 913. The memory may store instructions for execution by the processor to provide the techniques described herein. The interface to the host computer 912 allows the reader 150 to receive commands from the host computer 152 such as for sending queries to the relay circuit 811, and to provide data to the host computer 152 from the relay circuit 811 such as responses to the queries. The interface to the RFID tags 913 may include a UHF transmitter/receiver for communicating with the \RFID tags using an RFID protocol such as Gen2. In one implementation, a conventional reader 150 can be used. The reader does not have to be aware of the existence of the relay circuit. The relay circuit provides full transparency and full compatibility with any Gen2 commercial readers on the market.

The relay circuit 811 is a full-duplex relay circuit mounted on a drone/robot and acts as a transparent intermediary between the reader 150 and RFID tags, continuously forwarding uplink and downlink backscatter signals between the reader 150 and the tags as it navigates throughout an area of interest.

Figure 9C:
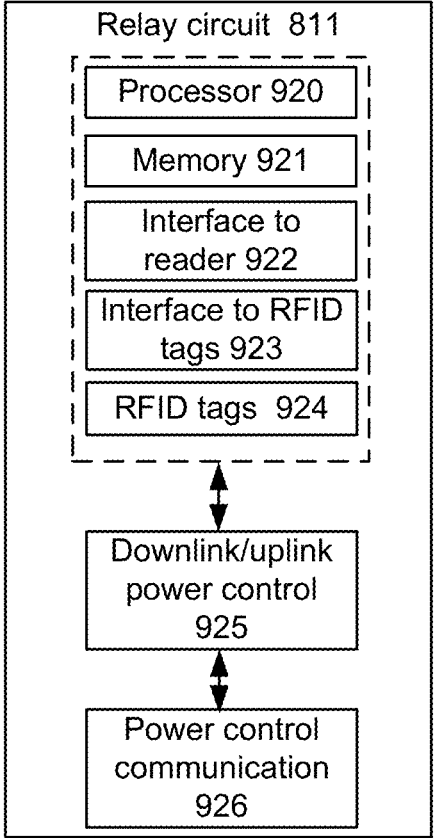
FIG. 9C depicts an example relay circuit configuration according to various embodiments.

FIG. 9C depicts an example configuration of the relay circuit 811 of FIG. 8 according to various embodiments. The relay circuit 811 includes a processor 920, memory 921, an interface to the reader 922, an interface to the RFID tags 923 and RFID tags 924. The memory may store instructions for execution by the processor to provide the techniques described herein. The interface to the reader 922 may include a UHF transmitter/receiver for communicating with the reader 150 using an RFID protocol. The interface to the RFID tags 923 may include a UHF transmitter/receiver for communicating with the RFID tags using an RFID protocol. A downlink/uplink power control application 925 is used to adjust the transmit power to the RFID tags. A power control communication application 926 can involve techniques such as depicted in FIGS. 11A to 13 for communicating with a host computer 152 via a reader 150 to receive instructions for setting a transmission power, or initiating some other function, at the relay circuit 811.

Figure 10:
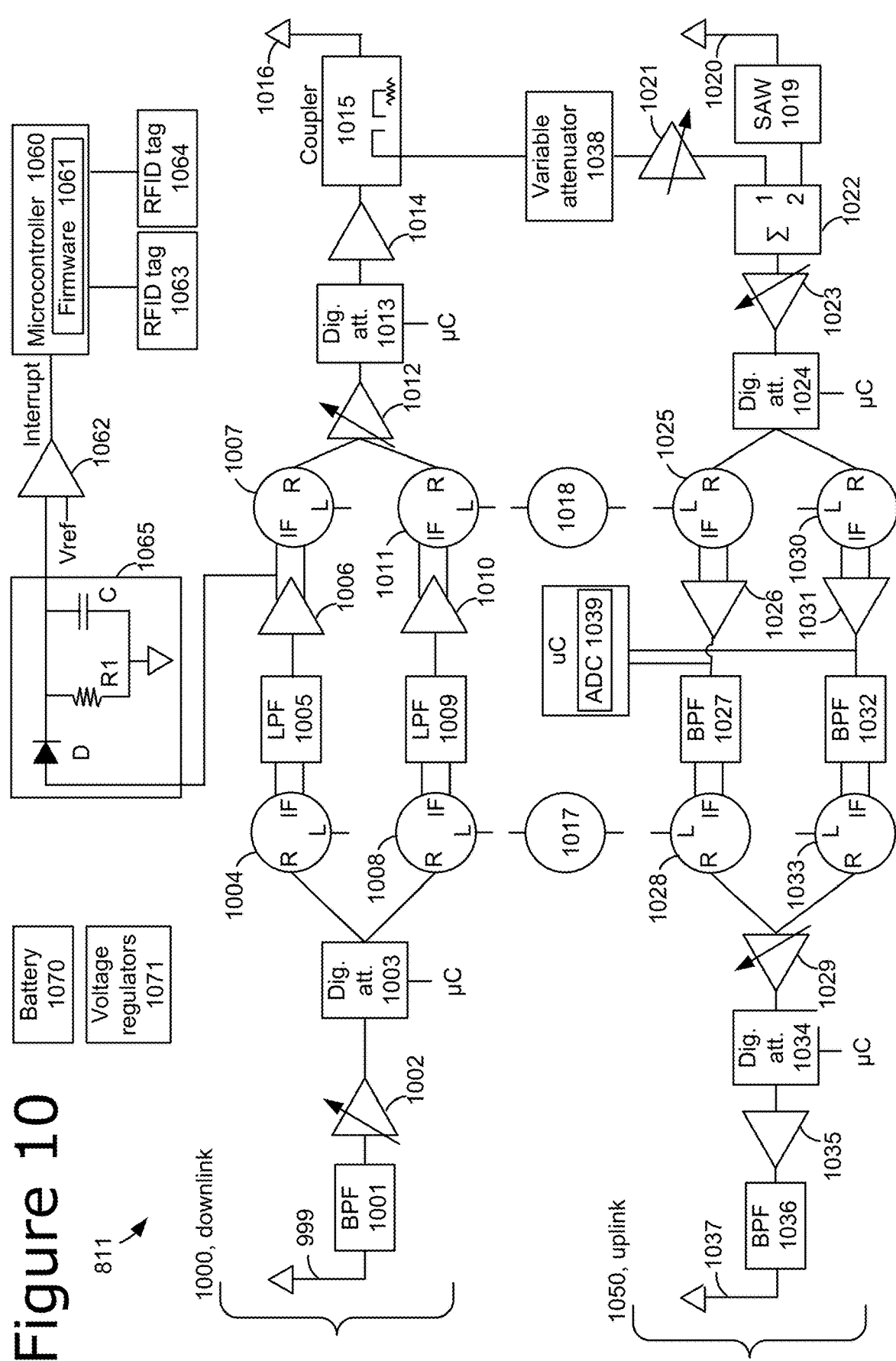
FIG. 10 depicts an example relay circuit according to various embodiments.

FIG. 10 depicts an example implementation of the relay circuit 811 of FIG. 8 according to various embodiments. The relay circuit 811 and its components may be carried on a printed circuit board (PCB) such as the PCB 811a of FIG. 1B, in one approach. The full-duplex relay circuit includes a downlink path 1000 and an uplink path 1050. The downlink path 1000, from left to right, represents the relaying of a signal from the reader 150 to the RFID tags. The uplink path 1050, from right to left, represents the relaying of a signal from the RFID tags to the reader 150.

In the downlink path, an RF signal from the reader 150 is received at an antenna 999, processed at a band pass filter (BPF) 1001, a variable gain amplifier 1002, and a digital attenuator (dig. att. 1003). The digital attenuator 1003 operates based on a control signal from a microprocessor (μP) to set an attenuation level. This level is set to provide the received RF signal from the reader 150 at a desired level for processing by the relay circuit 811. The power of the signal is controlled by amplifying it using the variable gain amplifier 1002, then attenuating it using the digital attenuator 1003.

First and second outputs of the digital attenuator 1003 are provided to the radio frequency port (R) of IQ demodulators 1004 and 1008, respectively. IQ refers to in-phase and quadrature phase signals. The IQ demodulators are frequency mixers. For the first output of the digital attenuator 1003, based on a signal at a local oscillator port (L) from a synthesizer 1017, I and Q signals are output from an intermediate frequency port (IF) to a low pass filter (LPF) 1005 and then to an amplifier 1006. The I and Q signals are provided to the IF port of a modulator 1007. Based on a signal at an L port from a synthesizer 1018, a first signal is output from the R port of the modulator 1007 to a variable gain amplifier 1012. For the second output of the digital attenuator 1003, based on a signal at the L port from the synthesizer 1017, I and Q signals are output from the IF port to an LPF 1009 and then to an amplifier 1010. The synthesizer may include a crystal oscillator.

The I and Q signals are provided to the IF port of a modulator 1011. Based on a signal at the L port from the synthesizer 1018, a second signal is output from the R port of the modulator 1011 to the variable gain amplifier 1012.

The amplifier 1012 uses the first and second signals to provide a signal to a digital attenuator 1013, which operates based on a control signal from the microprocessor to set an attenuation level. This level is set to provide the transmitted RF signal from the relay circuit 811 to the tags at a desired level to set a desired transmission range of the relay circuit 811 to the tags. The signal from the digital attenuator 1013 is amplified at an amplifier 1014 and provided to a coupler 1015 to provide a signal for transmission via an antenna 1016. The coupler couples the received signal to the uplink path 1050 via a variable attenuator 1038 and a variable gain amplifier 1021.

In one option, a peak detector 1065 is coupled to an output of the amplifier 1006 in the downlink channel. The peak detector 1065 includes a diode (D) in a path to a comparator 1062. A resistor (R1) and a capacitor (C) are connected to this path and to ground. The output of the peak detector 1065 is compared to a reference voltage, Vref, at the comparator. A result of the comparison can trigger an interrupt of the microcontroller 1060. Additionally, the peak detector 1065 and microcontroller 1060 on the same board can follow and lock on to an RFID query to support frequency hopping on commercial readers.

In the uplink path, a backscatter signal is received from the passive RFID tags, for example, at an antenna 1020 and processed at a surface acoustic wave (SAW) filter 1019. A summation circuit 1022 sums a signal from the amplifier 1021 at a first input and the signal from the tags at a second input to provide an output signal to a variable gain amplifier 1023 and a digital attenuator 1024.

The digital attenuator 1024 operates based on a control signal from the microprocessor to set an attenuation level. This level is set to provide the received RF signal from the tags at a desired level.

A first output of the digital attenuator 1024 is provided to the R port of an IQ demodulator 1025. Based on a signal at an L port from the synthesizer 1018, I and Q signals are output from an IF port to an amplifier 1026. An output of the amplifier 1026 is provided to a BPF 1027 which in turn provides I and Q outputs to an IF port of an IQ modulator 1028. An output from the R port of the modulator 1028 is provided to a variable gain amplifier 1029. A second output of the digital attenuator 1024 is provided to the R port of an IQ demodulator 1030. Based on a signal at an L port from the synthesizer 1018, I and Q signals are output from an IF port of the demodulator 1030 to an amplifier 1031. An output of the amplifier 1031 is provided to a BPF 1032 which in turn provides I and Q outputs to an IF port of an IQ modulator 1033. An output from the R port of the modulator 1033 is provided to the variable gain amplifier 1029.

An output of the variable gain amplifier 1029 is provided to a digital attenuator 1034. The digital attenuator 1034 operates based on a control signal from the microprocessor to set an attenuation level. This level is set to provide the transmitted RF signal from the relay circuit 811 to the reader 150 at a desired level. An output from the digital attenuator 1034 is processed at an amplifier 1035 and a BPF 1036 before being transmitted to the reader 150 via an antenna 1037.

Also, in the uplink path, an analog-to-digital converter 1039 is implemented by the microcontroller 1060 to obtain digital values from the output signals of the amplifiers 1026 and 1031. The relay circuit 811 can implement automatic gain control using the digital attenuators and the microcontroller 1060 for dynamic range control. For example, if the amplitude of the backscatter signal coming through the uplink receiver as analyzed through the ADC 1039 of the microcontroller 1060 is lower than a certain threshold, the microcontroller 1060 can adjust the digital attenuator 1024 or the gain of the amplifier 1023 to improve the signal-to-noise ratio (SNR) at the uplink transmit channel (Tx). This should improve the decoding at the reader 150 on the receiver end of the uplink.

The microcontroller 1060 manages the activities on the relay circuit 811. The microcontroller 1060 is an example of a processor and may execute firmware 1061 to provide the techniques described herein.

Figures 11A, 11B, 11C:
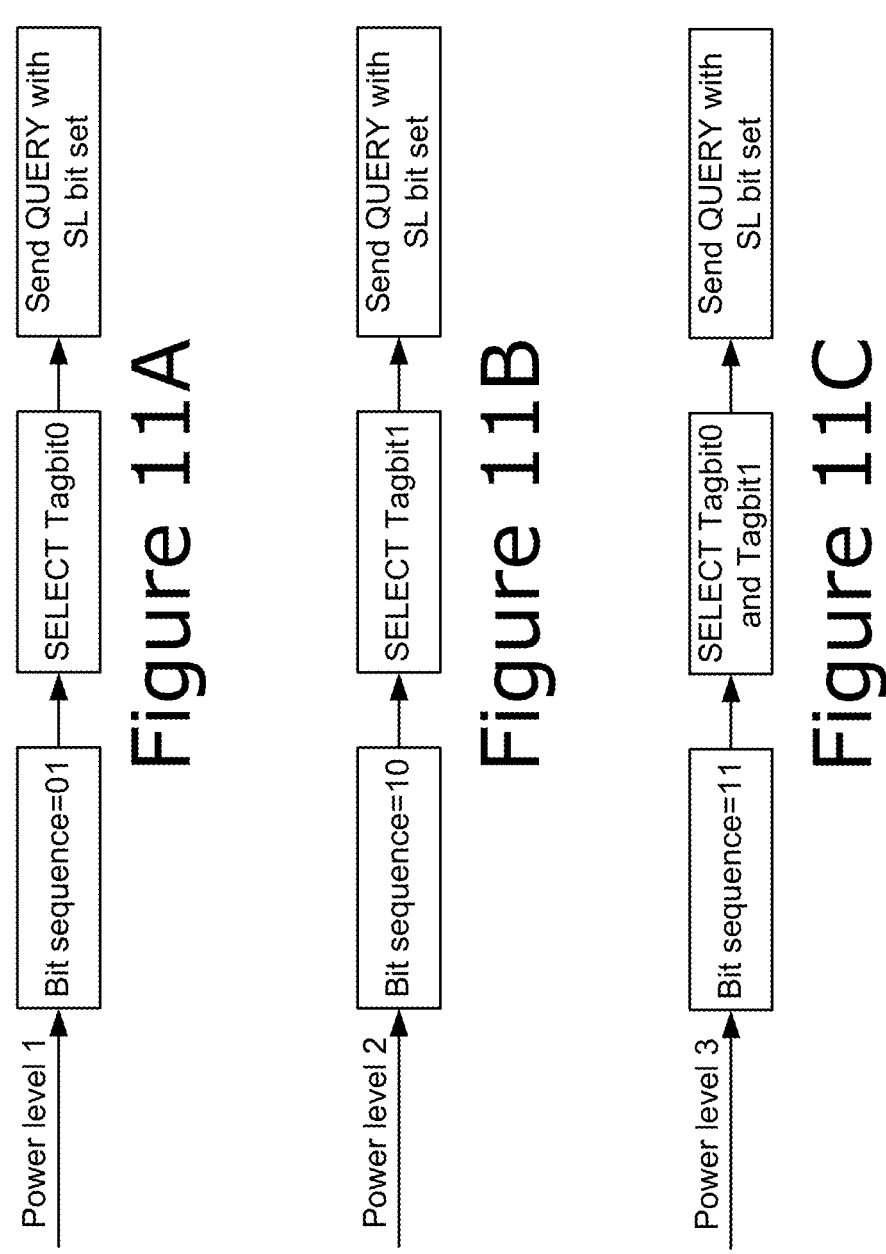
FIGS. 11A, 11B, and 11C depict example signaling protocols to set power levels of the relay circuit according to various embodiments.
Figure 12:
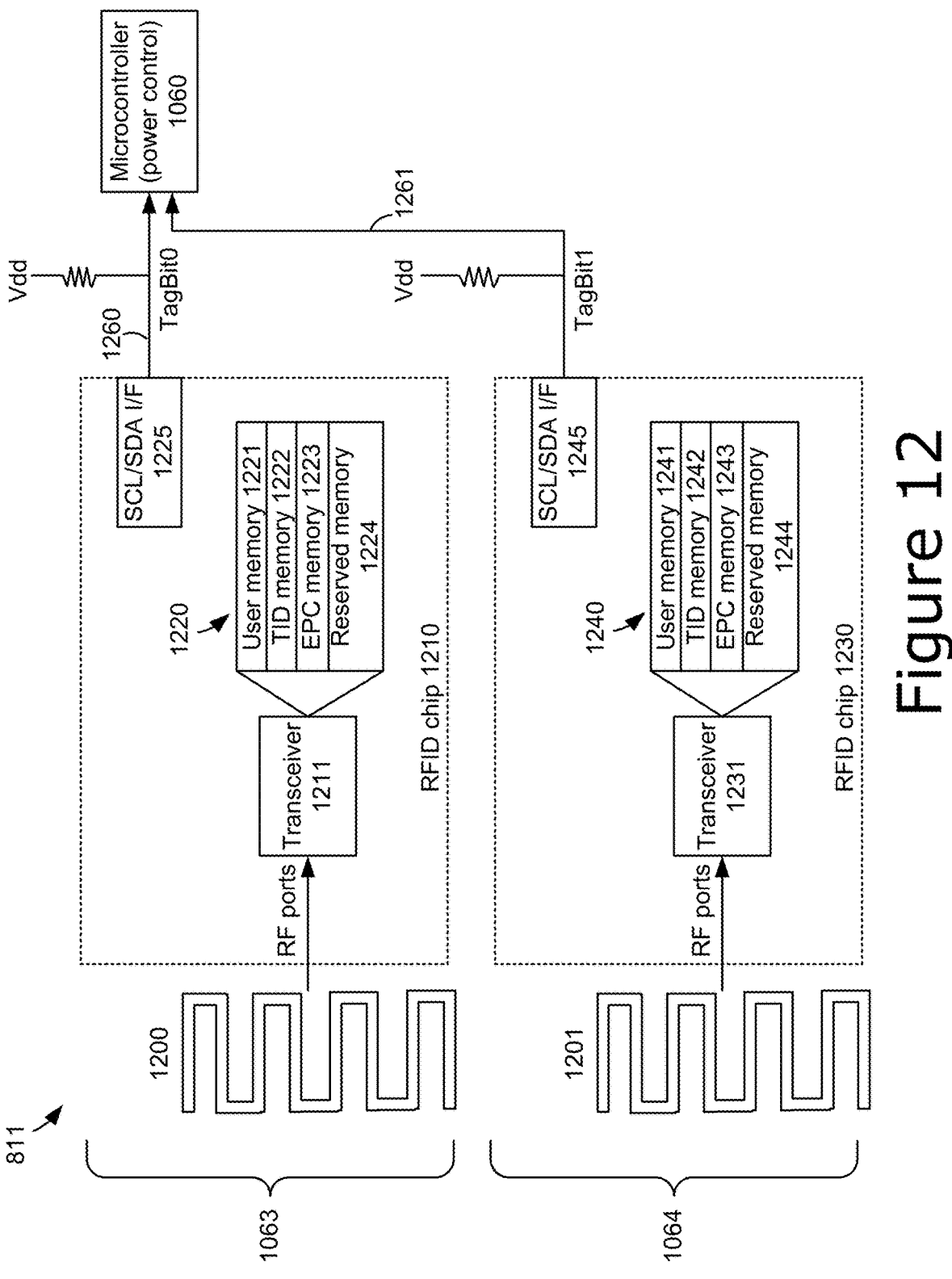
FIGS. 12 and 13 depict additional example relay circuit implementations according to various embodiments.

One or more on-board RFID tags can be carried on the same PCB 811*a* as the other components. An on-board RFID tag can be carried by the mobile agent and/or mobility mechanism generally. These on-board tags can be used to configure a transmission power level or other function of the relay circuit 811. For example, as depicted in FIG. 11A to 12, the reader 150 can query and select one or more of the tags. The querying and selecting is detected at the microcontroller 1060 by an interrupt signal from each involved tag. A bit value can then be associated with each tag based on whether or not it is queried and selected.

The relay circuit 811 also includes a battery 100 and voltage regulators 1071 for providing power to the various components.

The downlink path 1000 and the uplink path 1050 are an example of radio frequency (RF) chain circuitry to receive first signals from an RF identification (RFID) reader and receive second signals from one or more RFID tags within a relay range of the relay circuit 811. In one example implementation, the antenna 999 and the antenna 1016 are separate and distinct antenna elements. In another example implementation, the antennas 999 and the antenna 1016 are the same antenna element. Additionally or alternatively, the antenna 1037 and the antenna 1020 may be separate and distinct antenna elements. In another example implementation, the antenna 1037 and the antenna 1020 are the same antenna element. In another example implementation, the antennas 999, 1016, 1020, and 1037 are separate and distinct antenna elements from one another. Alternatively, the antennas 999, 1016, 1020, and 1037 are the same antenna or part of the same antenna element. Other implementations and arrangements are also possible.

FIG. 11A depicts an example signaling protocol to set a first power level of the relay circuit 811 of FIG. 10 using the on-board RFID tags 1063 and 1064, according to various embodiments. As mentioned, the reader 150, under the control of the host computer 152, can communicate query and select signals to the on-board RFID tags of the relay circuit 811 to set a bit sequence which identifies a transmission power level. For example, two tags can represent the bit value 00 as a default to set the highest power level, power level 4. If a tag is selected, its bit value changes to 1. In this approach, three additional power levels can be set, e.g., power level 1, 2 and 3 for the bit sequences 01, 10 and 11, respectively. In this example, power level 4> power level 3> power level 2> power level 1. The number of power levels can be extended depending on the application.

Tagbit0 and Tagbit1 refer to first and second on-board RFID tags such as the tags 1063 and 1064, respectively, of FIG. 10. Specifically, to trigger power level 1, a bit sequence 01 is provided by the reader 150 transmitting a SELECT command for Tagbit0, followed by transmitting a QUERY command with SL bit set/asserted. The SL bit is a selected flag in the tag which a reader 150 may assert or de-assert using the SELECT command. A SELECT command is used to identify the on-board RFID tags which are to be queried. The on-board RFID tags can have a bit pattern in their EPCs which matches a bit pattern in the SELECT command. The reader 150 then transmits a QUERY command to generate a response from the on-board RFID tags. This process may implement a slotted ALOHA-based probabilistic algorithm to avoid collisions in responses by the tags. When the RFID tag responds, an interrupt is triggered at the microcontroller 1060 which is interpreted as a 1 bit, for example. That is, an interrupt signal is sent to the processor circuitry. In this manner, each on-board RFID tag can set a bit value which the microcontroller 1060 interprets to implement a function such as setting a transmission power level. For example, the microcontroller 1060 can control the digital attenuator 1013 based on the bit values to set the transmission power to the other RFID tags, which are not on-board the relay circuit 811, such as the landmark tags.

FIG. 11B depicts an example signaling protocol to set a second power level of the relay circuit 811 of FIG. 10 using the on-board RFID tags 1063 and 1064, according to various embodiments. To trigger power level 2, a bit sequence 10 is provided by the reader 150 transmitting a SELECT command for Tagbit1, followed by transmitting a QUERY command with SL bit set.

FIG. 11C depicts an example signaling protocol to set a third power level of the relay circuit 811 of FIG. 10 using the on-board RFID tags 1063 and 1064, according to various embodiments. To trigger power level 3, a bit sequence 11 is provided by the reader 150 transmitting a SELECT command for Tagbit0 and Tagbit1, followed by transmitting a QUERY command with SL bit set.

FIG. 11A to 11C shows the high-level flow of three examples of additional power levels to be set at the relay circuit 811 as required by the landmark localization or the inventory control application. For example, to configure a power level 2 at the relay, a bit sequence "10" would be sent to the relay from the host computer 152 through the back-scatter link. By associating a specific tag with bit 0 and the other tag with bit 1, one can leverage the Gen2 SELECT command to trigger backscattering only from the specific tag representing the bit to send the signal over the backscatter link. In this example, to send over the bit sequence "10," TagBit1 is selected using the SELECT command, follow by sending a QUERY command with the SL bit set. This operation will trigger the tag (TagBit1) to backscatter and its signal will be picked up by the power control block on the relay. For the WRITE command, some memory is reserved in the USER memory for power control. A WRITE command will write the power level needed for the relay while a controlling device (e.g. microcontroller) will monitor the memory to set the corresponding power level.

FIG. 12 depicts an example implementation of the relay circuit 811 of FIG. 10, where the signaling protocol of FIGS. 11A to 11C and the RFID tags 1063 and 1064 are used to set a power level of the relay circuit 811, according to various embodiments. The RFID tag 1063 includes an antenna 1200 and an RFID chip 1210, also referred to as an integrated circuit. The RFID chip includes RF ports which transfer an RF signal from the antenna to a transceiver 1211. A memory bank 1220 includes a user memory 1221, a TID memory 1222, an EPC memory 1223 and a reserved memory 1224. Each location can be accessed in units of 16-bit words.

The user memory is typically 512 bits but can be up to 4K or 8K bits is some tags. In the user memory, an RFID reader can write information in the tag or read information which was previously written. The tag identifier (TID) memory stores a manufacturer's unique identification number which is written permanently at the time of its manufacture. The EPC memory includes the EPC number, which is typically 96 to 496 bits. The reserved memory allows for locking the read and write functions of the RFID chip data, such as in the case of sensitive or confidential data. The reserve memory may store a password which allows the tag to be permanently turned off.

The chip also includes a serial clock (SCL) line and a serial data (SDA) line interface (I/F) 1225 to the microcontroller 1060. These lines provide a bidirectional two-line communication in an inter-integrated circuit (I2C) serial data bus 1260 to communicate the bit value TagBit0 to the microcontroller 1060 for setting a power level of the relay circuit transmission to the off-board landmark and object RFID tags. The communicating of TagBit0 can trigger an interrupt of the microcontroller 1060. The data bus is connected to a power supply Vdd via a resistor.

Similarly, the RFID tag 1064 includes an antenna 1201 and an RFID chip 1230. The RFID chip includes a transceiver 1231 and a memory bank 1240 comprising a user memory 1241, a TID memory 1242, an EPC memory 1243 and a reserved memory 1244.

The RFID chip 1230 also includes a SCL/SDA interface 1245 to the microcontroller 1060. These lines provide a bidirectional two-line communication in an I2C serial data bus 1261 to communicate the bit value TagBit1 to the microcontroller 1060 for setting a power level of the relay circuit transmission to the off-board landmark and object RFID tags. The communicating of TagBit1 can trigger an interrupt of the microcontroller 1060. As mentioned, an interrupt on a bus associated with an on-board RFID tag can be interpreted by the microcontroller 1060 as a 1 bit while the lack of such an interrupt can be interpreted as a 0 bit.

The control mechanism can be implemented using two or more commercial generation RFID tags that implement user memory since they also have a serial interface (SPI/I2C) (full-duplex commination protocol/half-duplex communication protocol) that can be used by an external device (e.g., microcontroller) to access the EPC and the user memory of the tag. Moreover, as discussed below, some tags implement an interrupt via I2C that is triggered when data is written to the EPC and user memory. A SELECT command will write the SL bit which is the EPC memory, causing an interrupt. This writes the bits to the EPC memory to set the power level.

Figure 13:
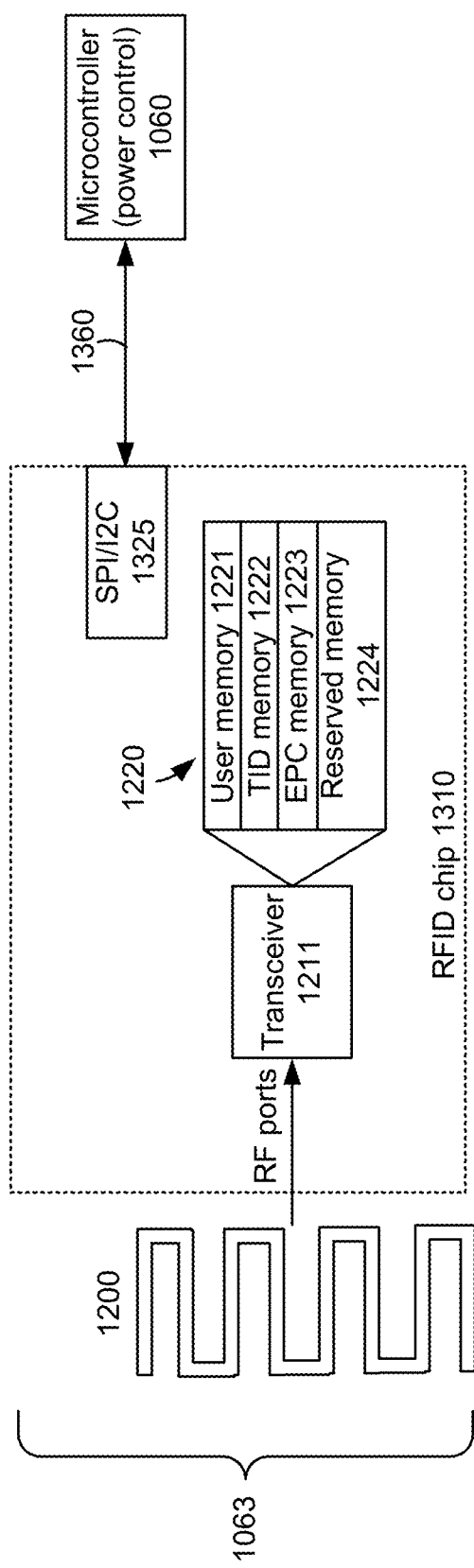

FIG. 13 depicts an example implementation of the relay circuit 811 of FIG. 10, where a signaling protocol is used to write data to the user memory 1221 of the on-board RFID tag 1063 of FIG. 12 to set a power level of the relay circuit 811, according to various embodiments. In this approach, the RFID chip 1310 is the same as the RFID chip 1210 of FIG. 10 except it includes a Serial Peripheral Interface (SPI) or I2C interface 1325 to communicate bits of data to the microcontroller 1060 via a bus 1360. Data for setting the transmission power level or for initiating some other function is sent by the reader 150 and stored in the user memory using a write command, such as defined in the Gen2 protocol. The microcontroller 1060 can continuously poll the memory location using the serial interface. This approach provides more flexibility that the approach of FIG. 12 since a larger amount of data can be stored in the user memory, e.g., to define many different power levels or trigger or define other functions, and a single on-board RFID tag can be used rather than one RFID tag for each bit.

Figure 14:
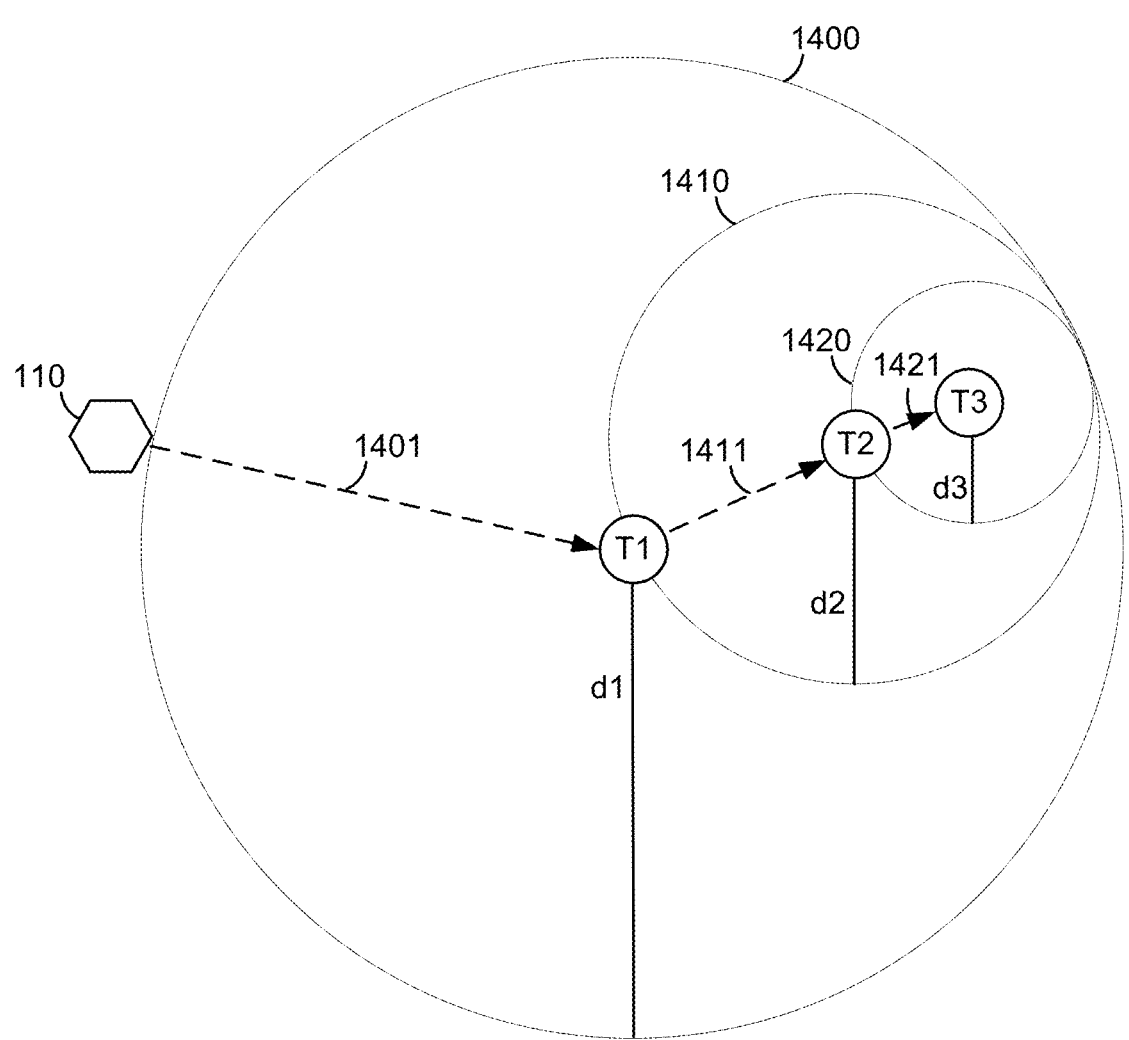
FIGS. 14, 15, and 16 depict example mobile agent scenarios according to various embodiments.

FIG. 14 depicts an example scenario in which the mobile agent 110 of FIG. 1A navigates toward active and passive RFID tags, according to various embodiments. An active tag is battery powered and transmits without being interrogated by a reader. Moreover, its transmission is over a much greater range than a passive tag, e.g., 100 m compared to 10 m. These characteristics can be used by the mobile agent 110 to provide coverage scalability when a mix of active and passive tags is used in an indoor/outdoor environment. Here, T1 is an active tag with a read range 1400 and T2 and T3 are passive tags with read ranges 1410 and 1420, respectively.

The mobile agent 110 starts locating T1 when the agent is within the range 1400. Once T1 is located, the mobile agent 110 moves towards it on the path 1401 by tracking the received signal strength from T1. After reaching T1, the mobile agent 110 is within the range 1410 and will be able to detect T2. The mobile agent 110 tracks the received signal strength and approaches T2 on the path 1411. After reaching T2, the mobile agent 110 is within the range 1420 and will be able to detect T3. The mobile agent 110 tracks the received signal strength and approaches T3 on the path 1421.

If the range between the relay board and the RFID reader 150 needs to be increased, e.g., for communicating with the power control block on the relay circuit 811, an active tag can also be placed on the relay circuit 811. The information fields on this active tag can then be programmed by the reader 150 to enable this longer range communication with low overhead.

Another approach to increasing the coverage of the mobile agent 110 is to increase the number of landmark tags. This approach is inexpensive since the RFID tags are the lowest cost item in the RFID infrastructure.

Figure 15:
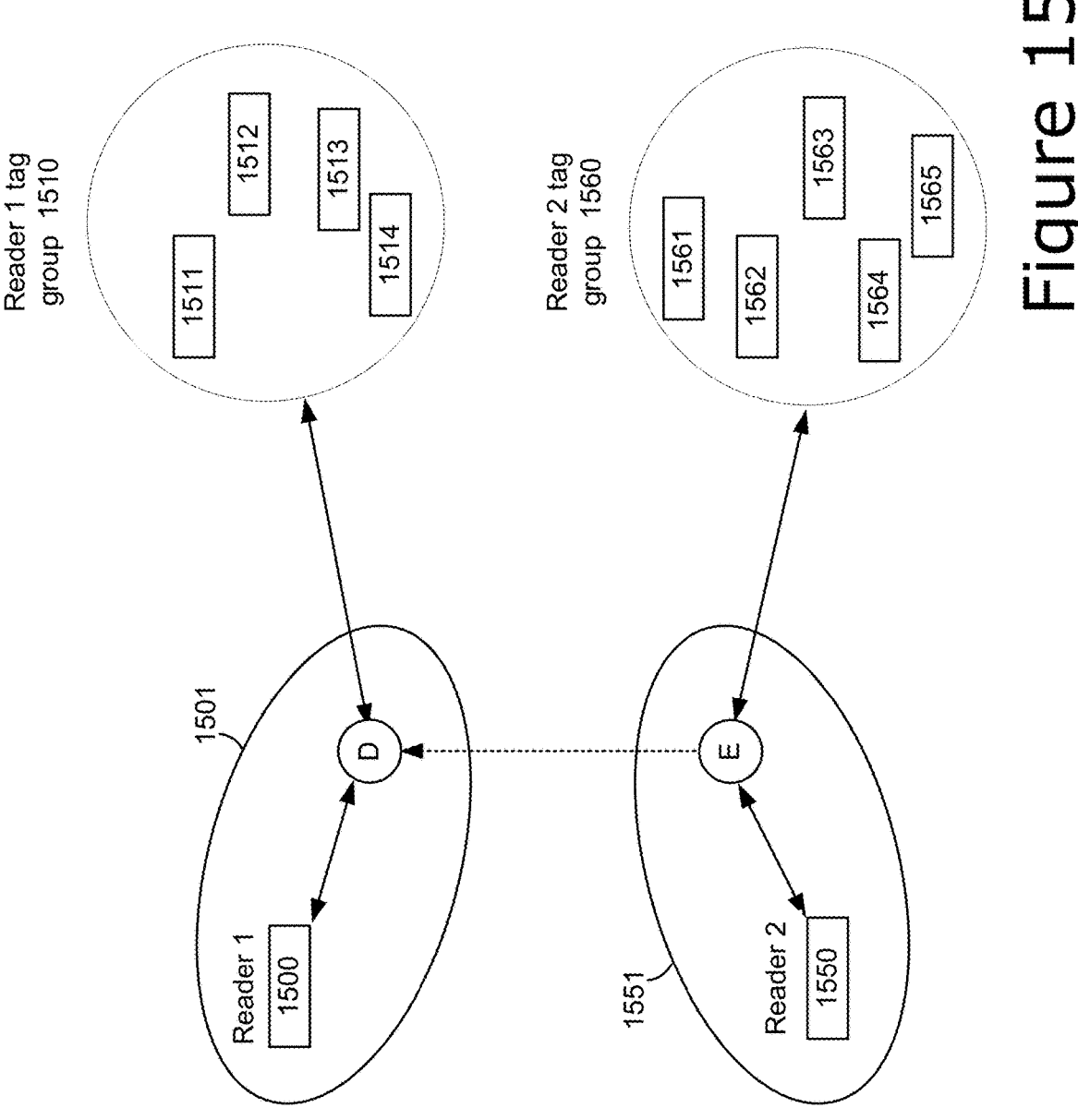

FIG. 15 depicts an example scenario in which the mobile agent 110 of FIG. 1A is shared by different RFID readers with non-overlapping ranges, according to various embodiments. One advantage of the mobile agent 110 as provided herein is its low overhead communication protocol that can allow different type of readers to quickly and seamlessly establish connections with the mobile agent 110. In this example, a first reader 1500 has a range 1501 and is used to communicate with a first group of tags 1510 including tags 1511-1514. A second reader 1550 has a range 1551 and is used to communicate with a second group of tags 1560 including tags 1561-1565.

Since the range of the readers is not sufficient to communicate with the respective tag groups, the mobile agent 110 is required to extend the reach of the readers by acting as a relay. To address this scenario, the mobile agent 110 may be initially positioned at a location E to relay signals between the reader 1550 and the tag group 1560. Once the inventory or other task is completed, the mobile agent 110 can move to a location D to relay signals between the reader 1500 and the tag group 1510. The mobile agent 110 can be configured to provide a seamless connection such that, as soon as the mobile agent 110 reaches the range 1501 of the reader 1500, the reader 1500 will connect to the mobile agent 110 and start reading the tags in the tag group 1510.

In one approach, a single host computer 152 which controls both readers can initiate the movement of the mobile agent 110. In another approach, a first host computer controls the first reader and a second host computer controls the second reader. The first and second host computers can communicate via a back channel such as a Wi-Fi network to coordinate the movement of the mobile agent 110. In one approach, the communication protocol disclosed herein such as in FIGS. 12 and 13 can be used by a host computer 152 to communicate commands to a mobile agent 110 to move toward another reader. This can involve programming an on-board tag or using the microcontroller 1060.

Figure 16:
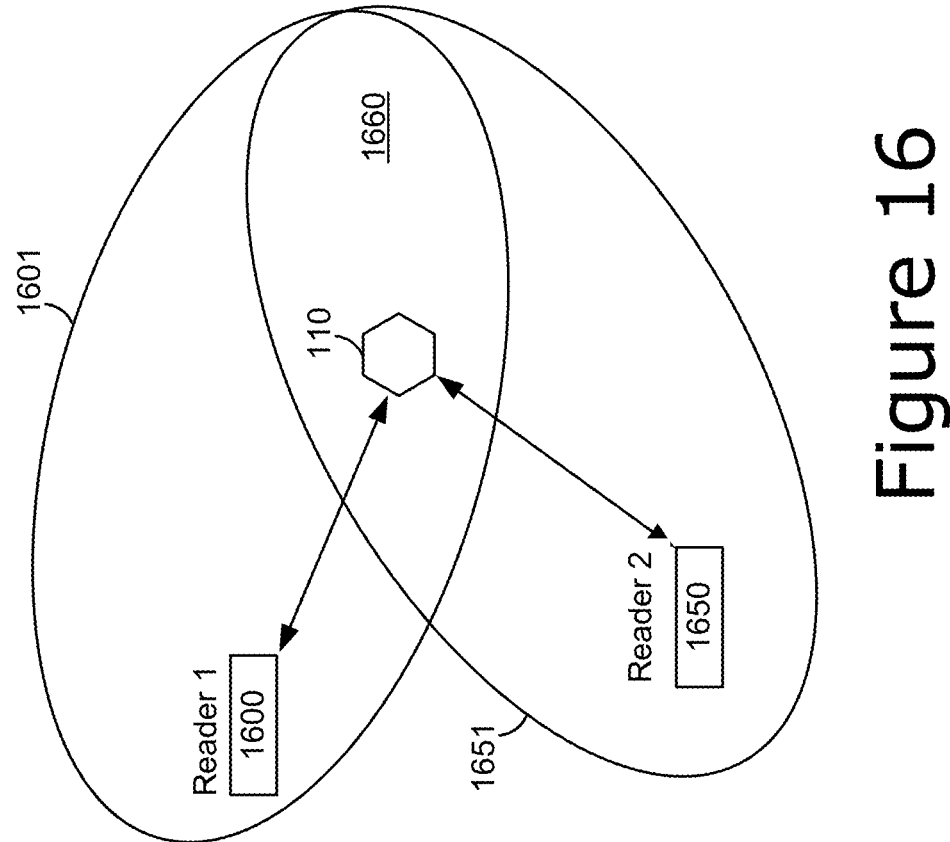

FIG. 16 depicts an example scenario in which the mobile agent 110 of FIG. 1A is shared by different RFID readers with overlapping ranges, according to various embodiments. A first reader 1600 has a range 1601 and a second reader 1650 has a range 1651. The two ranges overlap as depicted in an overlapping region 1660.

This overlap occurs when the separation between the antennas of different reader antennas is small. Such overlap scenarios can be difficult for the mobile agent to handle since the agent may switchover between the two readers may occur with excessive frequency. It is also possible that the mobile agent 110 cannot establish a connection to either of the readers. A first possible solution is for the relay circuit 811 to temporarily shut itself off, e.g., enter a sleep mode, while traversing the overlap region and power up again after a predetermined time period. The mobile agent 110 can check again as to whether multiple reader connections are available. If reader connections are still available, the relay board may shut off again and continue moving with a goal of exiting the overlap region. If a single reader connection is available when the relay board power up, it can proceed normally to relay signals to and from the reader.

A second possible solution is for one of the readers to shut off to allow the relay board to connect to the other reader while in the overlap region. The reader can autonomously make the decision to shut off (e.g., stop transmitting) for a random amount of time upon determining that the mobile agent 110 is in an overlap region. This can involve, e.g., determining that there are frequent connection dropouts with the mobile agent 110. The reader can detect a unique tag placed on the relay circuit 811 for this purpose. The reader could also coordinate with other readers via a backend/cloud connection.

These approaches are compatible with frequency hopping transmissions of RFID readers, which is a part of the FCC mandates for the RFID readers in the US, with minimal communication overhead. A third possible solution is to use frequency hopping systems that allows keeping all the readers in the environment in an ON state without interrupting their transmission. However, this is more complex than the first and second solutions. In jurisdictions such as Europe and China, the readers are permitted to hop on a pre-programmed set of channels, which can be known by the reader and the relay circuit 811 a priori. In this case, the third solution can be implemented with reduced complexity.

Specifically, the reader can broadcast the next channel that it will hop to and the relay circuit 811 quickly tunes to that channel before the reader hops. Since frequency hopping is a random process, the probability of two independent readers hopping on the same channel at the same time is low. The relay circuit 811 can then provide the tag information to the reader that is on the same channel.

1. Edge Computing System Configurations and Arrangements

Generally, the techniques discussed herein can be used in edge computing. Edge computing refers to the implementation, coordination, and use of computing and resources at locations closer to the "edge" or collection of "edges" of a network. Deploying computing resources at the network's edge may reduce application and network latency, reduce network backhaul traffic and associated energy consumption, improve service capabilities, improve compliance with security or data privacy requirements (especially as compared to conventional cloud computing), and improve total cost of ownership.

Individual compute platforms or other components that can perform edge computing operations (referred to as "edge compute nodes", "edge nodes," or the like) can reside in whatever location needed by the system architecture or ad hoc service. In many edge computing architectures, edge nodes are deployed at NANs, gateways, network routers, and/or other devices that are closer to endpoint devices (e.g., UEs, IoT devices, etc.) producing and consuming data. As examples, edge nodes may be implemented in a high performance compute data center or cloud installation; a designated edge node server, an enterprise server, a roadside server, a telecom central office; or a local or peer at-the-edge device being served consuming edge services.

Edge compute nodes may partition resources (e.g., memory, CPU, GPU, interrupt controller, I/O controller, memory controller, bus controller, network connections or sessions, etc.) where respective partitionings may contain security and/or integrity protection capabilities. Edge nodes may also provide orchestration of multiple applications through isolated user-space instances such as containers, partitions, virtual environments (VEs), virtual machines (VMs), Function-as-a-Service (FaaS) engines, Servlets, servers, and/or other like computation abstractions. Containers are contained, deployable units of software that provide code and needed dependencies. Various edge system arrangements/architecture treats VMs, containers, and functions equally in terms of application composition. The edge nodes are coordinated based on edge provisioning functions, while the operation of the various applications are coordinated with orchestration functions (e.g., VM or container engine, etc.). The orchestration functions may be used to deploy the isolated user-space instances, identifying and scheduling use of specific hardware, security related functions (e.g., key management, trust anchor management, etc.), and other tasks related to the provisioning and lifecycle of isolated user spaces.

Applications that have been adapted for edge computing include but are not limited to virtualization of traditional network functions including include, for example, Software-Defined Networking (SDN), Network Function Virtualization (NFV), distributed RAN units and/or RAN clouds, and the like. Additional example use cases for edge computing include computational offloading, Content Data Network (CDN) services (e.g., video on demand, content streaming, security surveillance, alarm system monitoring, building access, data/content caching, etc.), gaming services (e.g., AR/VR, etc.), accelerated browsing, IoT and industry applications (e.g., factory automation), media analytics, live streaming/transcoding, and V2X applications (e.g., driving assistance and/or autonomous driving applications).

The present disclosure provides specific examples relevant to various edge computing configurations provided within and various access/network implementations. Any suitable standards and network implementations are applicable to the edge computing concepts discussed herein. For example, many edge computing/networking technologies may be applicable to the present disclosure in various combinations and layouts of devices located at the edge of a network. Examples of such edge computing/networking technologies include Multi-access Edge Computing (MEC); Content Delivery Networks (CDNs) (also referred to as "Content Distribution Networks" or the like); Mobility Service Provider (MSP) edge computing and/or Mobility as a Service (MaaS) provider systems (e.g., used in AECC architectures); Nebula edge-cloud systems; Fog computing systems; Cloudlet edge-cloud systems; Mobile Cloud Computing (MCC) systems; Central Office Re-architected as a Datacenter (CORD), mobile CORD (M-CORD) and/or Converged Multi-Access and Core (COMAC) systems; and/or the like. Further, the techniques disclosed herein may relate to other IoT edge network systems and configurations, and other intermediate processing entities and architectures may also be used for purposes.

Figure 17:
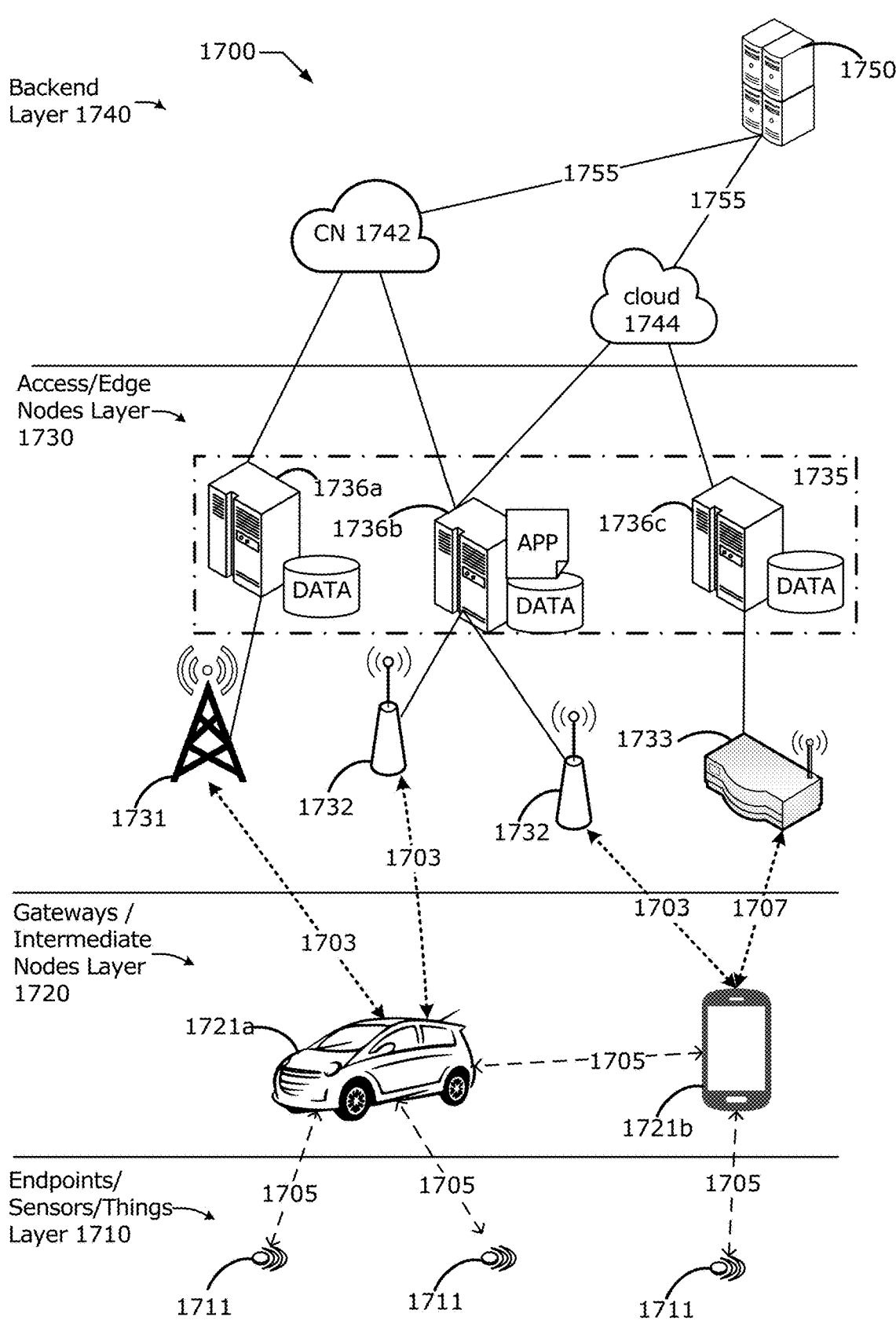
FIG. 17 illustrates an example edge computing environment.

FIG. 17 illustrates an example edge computing environment 1700. FIG. 17 specifically illustrates the different layers of communication occurring within the environment 1700, starting from endpoint sensors or things layer 1710 (e.g., operating in an Internet of Things (IoT) network topology) comprising one or more IoT devices 1711 (also referred to as edge endpoints 1710 or the like); increasing in sophistication to gateways or intermediate node layer 1720 comprising one or more user equipment (UEs) 1721*a* and 1721*b* (also referred to as intermediate nodes 1720 or the like), which facilitate the collection and processing of data from endpoints 1710; increasing in processing and connectivity sophistication to access node layer 1730 (or "edge node layer 1730") comprising a plurality of network access nodes (NANs) 1731, 1732, and 1733 (collectively referred to as "NANs 1731-1733" or the like) and a plurality of edge compute nodes 1736*a-c* (collectively referred to as "edge compute nodes 1736" or the like) within an edge computing system 1735; and increasing in connectivity and processing sophistication to a backend layer 1740 comprising core network (CN) 1742 and cloud 1744. The processing at the backend layer 1740 may be enhanced by network services as performed by one or more remote application (app) servers 1750 and/or other cloud services. Some or all of these elements may be equipped with or otherwise implement some or all features and/or functionality discussed herein.

The environment 1700 is shown to include end-user devices, such as intermediate nodes 1720 and endpoints 1710, which are configured to connect to (or communicatively couple with) one or more multiple communication networks (also referred to as "access networks," "radio access networks," or the like) based on different access technologies (or "radio access technologies") for accessing application services. These access networks may include one or more of NANs 1731, 1732, and/or 1733. The NANs 1731-1733 are arranged to provide network connectivity to the end-user devices via respective links 1703, 1707 between the individual NANs and the one or more UEs 1711, 1721.

As examples, the communication networks and/or access technologies may include cellular technology such as LTE, MuLTEfire, and/or NR/5G (e.g., as provided by Radio Access Network (RAN) node 1731 and/or RAN nodes 1732), WiFi or wireless local area network (WLAN) technologies (e.g., as provided by access point (AP) 1733 and/or RAN nodes 1732), and/or the like. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.).

The intermediate nodes 1720 include UE 1721*a* and UE 1721*b* (collectively referred to as "UE 1721" or "UEs 1721"). In this example, the UE 1721*a* is illustrated as a vehicle UE, and UE 1721*b* is illustrated as a smartphone (e.g., handheld touchscreen mobile computing device connectable to one or more cellular networks). However, these UEs 1721 may comprise any mobile or non-mobile computing device, such as tablet computers, wearable devices, PDAs, pagers, desktop computers, laptop computers, wireless handsets, unmanned vehicles or drones, and/or any type of computing device including a wireless communication interface.

The endpoints 1710 include UEs 1711, which may be IoT devices (also referred to as "IoT devices 1711"), which are uniquely identifiable embedded computing devices (e.g., within the Internet infrastructure) that comprise a network access layer designed for low-power IoT applications utilizing short-lived UE connections. The IoT devices 1711 are any physical or virtualized, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. As examples, IoT devices 1711 may be abiotic devices such as autonomous sensors, gauges, meters, image capture devices, microphones, light emitting devices, audio emitting devices, audio and/or video playback devices, electro-mechanical devices (e.g., switch, actuator, etc.), EEMS, ECUs, ECMs, embedded systems, microcontrollers, control modules, networked or "smart" appliances, MTC devices, M2M devices, and/or the like. The IoT devices 1711 can utilize technologies such as M2M or MTC for exchanging data with an MTC server (e.g., a server 1750), an edge server 1736 and/or edge computing system 1735, or device via a PLMN, ProSe or D2D communication, sensor networks, or IoT networks. The M2M or MTC exchange of data may be a machine-initiated exchange of data.

The IoT devices 1711 may execute background applications (e.g., keep-alive messages, status updates, etc.) to facilitate the connections of the IoT network. Where the IoT devices 1711 are, or are embedded in, sensor devices, the IoT network may be a WSN. An IoT network describes an interconnecting IoT UEs, such as the IoT devices 1711 being connected to one another over respective direct links 1705. The IoT devices may include any number of different types of devices, grouped in various combinations (referred to as an "IoT group") that may include IoT devices that provide one or more services for a particular user, customer, organizations, etc. A service provider (e.g., an owner/operator of server 1750, CN 1742, and/or cloud 1744) may deploy the IoT devices in the IoT group to a particular area (e.g., a geolocation, building, etc.) in order to provide the one or more services. In some implementations, the IoT network may be a mesh network of IoT devices 1711, which may be termed a fog device, fog system, or fog, operating at the edge of the cloud 1744. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 1744 to Things (e.g., IoT devices 1711). The fog may be established in accordance with specifications released by the OFC, the OCF, among others. Additionally or alternatively, the fog may be a tangle as defined by the IOTA foundation.

The fog may be used to perform low-latency computation/aggregation on the data while routing it to an edge cloud computing service (e.g., edge nodes 1730) and/or a central cloud computing service (e.g., cloud 1744) for performing heavy computations or computationally burdensome tasks. On the other hand, edge cloud computing consolidates human-operated, voluntary resources, as a cloud. These voluntary resources may include, inter-alia, intermediate nodes 1720 and/or endpoints 1710, desktop PCs, tablets, smartphones, nano data centers, and the like. In various implementations, resources in the edge cloud may be in one to two-hop proximity to the IoT devices 1711, which may result in reducing overhead related to processing data and may reduce network delay.

Additionally or alternatively, the fog may be a consolidation of IoT devices 1711 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

Additionally or alternatively, the fog may operate at the edge of the cloud 1744. The fog operating at the edge of the cloud 1744 may overlap or be subsumed into an edge network 1730 of the cloud 1744. The edge network of the cloud 1744 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes 1736 or edge devices). The Fog layer resides on top of the edge layer and is a consolidation of networking devices such as the intermediate nodes 1720 and/or endpoints 1710 of FIG. 17.

Data may be captured, stored/recorded, and communicated among the IoT devices 1711 or, for example, among the intermediate nodes 1720 and/or endpoints 1710 that have direct links 1705 with one another as shown by FIG. 17. Analysis of the traffic flow and control schemes may be implemented by aggregators that are in communication with the IoT devices 1711 and each other through a mesh network. The aggregators may be a type of IoT device 1711 and/or network appliance. In the example of FIG. 17, the aggregators may be edge nodes 1730, or one or more designated intermediate nodes 1720 and/or endpoints 1710. Data may be uploaded to the cloud 1744 via the aggregator, and commands can be received from the cloud 1744 through gateway devices that are in communication with the IoT devices 1711 and the aggregators through the mesh network. Unlike the traditional cloud computing model, in some implementations, the cloud 1744 may have little or no computational capabilities and only serves as a repository for archiving data recorded and processed by the fog. In these implementations, the cloud 1744 centralized data storage system and provides reliability and access to data by the computing resources in the fog and/or edge devices. Being at the core of the architecture, the Data Store of the cloud 1744 is accessible by both Edge and Fog layers of the aforementioned edge-fog network.

As mentioned previously, the access networks provide network connectivity to the end-user devices 1720, 1710 via respective NANs 1731-1733. The access networks may be Radio Access Networks (RANs) such as an NG RAN or a 5G RAN for a RAN that operates in a 5G/NR cellular network, an E-UTRAN for a RAN that operates in an LTE or 4G cellular network, or a legacy RAN such as a UTRAN or GERAN for GSM or CDMA cellular networks. The access network or RAN may be referred to as an Access Service Network for WiMAX implementations. Additionally or alternatively, all or parts of the RAN may be implemented as one or more software entities running on server computers as part of a virtual network, which may be referred to as a cloud RAN (CRAN), Cognitive Radio (CR), a virtual baseband unit pool (vBBUP), and/or the like. Additionally or alternatively, the CRAN, CR, or vBBUP may implement a RAN function split, wherein one or more communication protocol layers are operated by the CRAN/CR/vBBUP and other communication protocol entities are operated by individual RAN nodes 1731, 1732. This virtualized framework allows the freed-up processor cores of the NANs 1731, 1732 to perform other virtualized applications, such as virtualized applications for various elements discussed herein.

The UEs 1721, 1711 may utilize respective connections (or channels) 1703, each of which comprises a physical communications interface or layer. The connections 1703 are illustrated as an air interface to enable communicative coupling consistent with cellular communications protocols, such as 3GPP LTE, 5G/NR, Push-to-Talk (PTT) and/or PTT over cellular (POC), UMTS, GSM, CDMA, and/or any of the other communications protocols discussed herein. Additionally or alternatively, the UEs 1711, 1721 and the NANs 1731-1733 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). To operate in the unlicensed spectrum, the UEs 1711, 1721 and NANs 1731-1733 may operate using LAA, enhanced LAA (eLAA), and/or further eLAA (feLAA) mechanisms. The UEs 1721, 1711 may further directly exchange communication data via respective direct links 1705, which may be LTE/NR Proximity Services (ProSe) link or PC5 interfaces/links, or WiFi based links or a personal area network (PAN) based links (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols).

Additionally or alternatively, individual UEs 1721, 1711 provide radio information to one or more NANs 1731-1733 and/or one or more edge compute nodes 1736 (e.g., edge servers/hosts, etc.). The radio information may be in the form of one or more measurement reports, and/or may include, for example, signal strength measurements, signal quality measurements, and/or the like. Each measurement report is tagged with a timestamp and the location of the measurement (e.g., the UEs 1721, 1711 current location). As examples, the measurements collected by the UEs 1721, 1711 and/or included in the measurement reports may include one or more of the following: bandwidth (BW), network or cell load, latency, jitter, round trip time (RTT), number of interrupts, out-of-order delivery of data packets, transmission power, bit error rate, bit error ratio (BER), Block Error Rate (BLER), packet loss rate, packet reception rate (PRR), e2e delay, signal-to-noise ratio (SNR), signal-to-noise and interference ratio (SINR), signal-plus-noise-plus-distortion to noise-plus-distortion (SINAD) ratio, carrier-to-interference plus noise ratio (CINR), Additive White Gaussian Noise (AWGN), energy per bit to noise power density ratio (Eb/N0), energy per bit to interference power density ratio (Ec/I0), peak-to-average power ratio (PAPR), Reference Signal Received Power (RSRP), Received Signal Strength Indicator (RSSI), Reference Signal Received Quality (RSRQ), GNSS timing of cell frames for UE positioning for E-UTRAN or 5G/NR (e.g., a timing between an AP or RAN node reference time and a GNSS-specific reference time for a given GNSS), GNSS code measurements (e.g., The GNSS code phase (integer and fractional parts) of the spreading code of the ith GNSS satellite signal), GNSS carrier phase measurements (e.g., the number of carrier-phase cycles (integer and fractional parts) of the ith GNSS satellite signal, measured since locking onto the signal; also called Accumulated Delta Range (ADR)), channel interference measurement, thermal noise power measurement, received interference power measurement, and/or other like measurements. The RSRP, RSSI, and/or RSRQ measurements may include RSRP, RSSI, and/or RSRQ measurements of cell-specific reference signals, channel state information reference signals (CSI-RS), and/or synchronization signals (SS) or SS blocks for 3GPP networks (e.g., LTE or 5G/NR) and RSRP, RSSI, and/or RSRQ measurements of various beacon, Fast Initial Link Setup (FILS) discovery frames, or probe response frames for IEEE 802.11 WLAN/WiFi networks. Other measurements may be additionally or alternatively used, such as those discussed in 3GPP TS 36.214 v16.2.0 (2021-03-31) ("[TS36214]"), 3GPP TS 38.215 v16.4.0 (2020-12) ("[TS38215]"), IEEE 802.11-2020, "IEEE Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications" (2021-02-26) ("[IEEE80211]"), and/or the like. Additionally or alternatively, any of the aforementioned measurements (or combination of measurements) may be collected by one or more NANs 1731-1733 and provided to the edge compute node(s) 1736.

Additionally or alternatively, the measurements can include one or more of the following measurements: measurements related to Data Radio Bearer (DRB) (e.g., number of DRBs attempted to setup, number of DRBs successfully setup, number of released active DRBs, in-session activity time for DRB, number of DRBs attempted to be resumed, number of DRBs successfully resumed, etc.); measurements related to Radio Resource Control (RRC) (e.g., mean number of RRC connections, maximum number of RRC connections, mean number of stored inactive RRC connections, maximum number of stored inactive RRC connections, number of attempted, successful, and/or failed RRC connection establishments, etc.); measurements related to UE Context (UECNTX); measurements related to Radio Resource Utilization (RRU) (e.g., DL total PRB usage, UL total PRB usage, distribution of DL total PRB usage, distribution of UL total PRB usage, DL PRB used for data traffic, UL PRB used for data traffic, DL total available PRBs, UL total available PRBs, etc.); measurements related to Registration Management (RM); measurements related to Session Management (SM) (e.g., number of PDU sessions requested to setup; number of PDU sessions successfully setup; number of PDU sessions failed to setup, etc.); measurements related to GTP Management (GTP); measurements related to IP Management (IP); measurements related to Policy Association (PA); measurements related to Mobility Management (MM) (e.g., for inter-RAT, intra-RAT, and/or Intra/Inter-frequency handovers and/or conditional handovers: number of requested, successful, and/or failed handover preparations; number of requested, successful, and/or failed handover resource allocations; number of requested, successful, and/or failed handover executions; mean and/or maximum time of requested handover executions; number of successful and/or failed handover executions per beam pair, etc.); measurements related to Virtualized Resource(s) (VR); measurements related to Carrier (CARR); measurements related to QoS Flows (QF) (e.g., number of released active QoS flows, number of QoS flows attempted to release, in-session activity time for QoS flow, in-session activity time for a UE 1711, 1721, number of QoS flows attempted to setup, number of QoS flows successfully established, number of QoS flows failed to setup, number of initial QoS flows attempted to setup, number of initial QoS flows successfully established, number of initial QoS flows failed to setup, number of QoS flows attempted to modify, number of QoS flows successfully modified, number of QoS flows failed to modify, etc.); measurements related to Application Triggering (AT); measurements related to Short Message Service (SMS); measurements related to Power, Energy and Environment (PEE); measurements related to NF service (NFS); measurements related to Packet Flow Description (PFD); measurements related to Random Access Channel (RACH); measurements related to Measurement Report (MR); measurements related to Layer 1 Measurement (L1M); measurements related to Network Slice Selection (NSS); measurements related to Paging (PAG); measurements related to Non-IP Data Delivery (NIDD); measurements related to external parameter provisioning (EPP); measurements related to traffic influence (TI); measurements related to Connection Establishment (CE); measurements related to Service Parameter Provisioning (SPP); measurements related to Background Data Transfer Policy (BDTP); measurements related to Data Management (DM); and/or any other performance measurements.

The radio information may be reported in response to a trigger event and/or on a periodic basis. Additionally or alternatively, individual UEs 1721, 1711 report radio information either at a low periodicity or a high periodicity depending on a data transfer that is to take place, and/or other information about the data transfer. Additionally or alternatively, the edge compute node(s) 1736 may request the measurements from the NANs 1731-1733 at low or high periodicity, or the NANs 1731-1733 may provide the measurements to the edge compute node(s) 1736 at low or high periodicity. Additionally or alternatively, the edge compute node(s) 1736 may obtain other relevant data from other edge compute node(s) 1736, core network functions (NFs), application functions (AFs), and/or other UEs 1711, 1721 such as Key Performance Indicators (KPIs), with the measurement reports or separately from the measurement reports.

Additionally or alternatively, in cases where is discrepancy in the observation data from one or more UEs, one or more RAN nodes, and/or core network NFs (e.g., missing reports, erroneous data, etc.) simple imputations may be performed to supplement the obtained observation data such as, for example, substituting values from previous reports and/or historical data, apply to an extrapolation filter, and/or the like. Additionally or alternatively, acceptable bounds for the observation data may be predetermined or configured. For example, CQI and MCS measurements may be configured to only be within ranges defined by suitable 3GPP standards. In cases where a reported data value does not make sense (e.g., the value exceeds an acceptable range/bounds, or the like), such values may be dropped for the current learning/training episode or epoch. For example, on packet delivery delay bounds may be defined or configured, and packets determined to have been received after the packet delivery delay bound may be dropped.

In any of the embodiments discussed herein, any suitable data collection and/or measurement mechanism(s) may be used to collect the observation data. For example, data marking (e.g., sequence numbering, etc.), packet tracing, signal measurement, data sampling, and/or timestamping techniques may be used to determine any of the aforementioned metrics/observations. The collection of data may be based on occurrence of events that trigger collection of the data. Additionally or alternatively, data collection may take place at the initiation or termination of an event. The data collection can be continuous, discontinuous, and/or have start and stop times. The data collection techniques/mechanisms may be specific to a hardware (HW) configuration/implementation or non-HW-specific, or may be based on various software parameters (e.g., OS type and version, etc.). Various configurations may be used to define any of the aforementioned data collection parameters. Such configurations may be defined by suitable specifications/standards, such as 3GPP, ETSI O-RAN, and/or any other like standards such as those discussed herein.

The UE 1721*b* is shown to be configured to access an access point (AP) 1733 via a connection 1707. In this example, the AP 1733 is shown to be connected to the Internet without connecting to the CN 1742 of the wireless system. The connection 1707 can comprise a local wireless connection, such as a connection consistent with any IEEE 802.11 protocol, wherein the AP 1733 would comprise a wireless fidelity (WiFi®) router. Additionally or alternatively, the UEs 1721 and IoT devices 1711 can be configured to communicate using suitable communication signals with each other or with any of the AP 1733 over a single or multicarrier communication channel in accordance with various communication techniques, such as, but not limited to, an orthogonal frequency division multiplexing (OFDM) communication technique, a single-carrier frequency division multiple access (SC-FDMA) communication technique, and/or the like, although the scope is not limited in this respect. The communication technique may include a suitable modulation scheme such as Complementary Code Keying (CCK); Phase-Shift Keying (PSK) such as Binary PSK (BPSK), Quadrature PSK (QPSK), Differential PSK (DPSK), etc.; or Quadrature Amplitude Modulation (QAM) such as M-QAM; and/or the like.

The one or more NANs 1731 and 1732 that enable the connections 1703 may be referred to as "RAN nodes" or the like. The RAN nodes 1731, 1732 may comprise ground stations (e.g., terrestrial access points) or satellite stations providing coverage within a geographic area (e.g., a cell). The RAN nodes 1731, 1732 may be implemented as one or more of a dedicated physical device such as a macrocell base station, and/or a low power base station for providing femtocells, picocells or other like cells having smaller coverage areas, smaller user capacity, or higher bandwidth compared to macrocells. In this example, the RAN node 1731 is embodied as a NodeB, evolved NodeB (eNB), or a next generation NodeB (gNB), and the RAN nodes 1732 are embodied as relay nodes, distributed units, or Road Side Unites (RSUs). Any other type of NANs can be used.

Any of the RAN nodes 1731, 1732 can terminate the air interface protocol and can be the first point of contact for the UEs 1721 and IoT devices XE111. Additionally or alternatively, any of the RAN nodes 1731, 1732 can fulfill various logical functions for the RAN including, but not limited to, RAN function(s) (e.g., radio network controller (RNC) functions and/or NG-RAN functions) for radio resource management, admission control, uplink and downlink dynamic resource allocation, radio bearer management, data packet scheduling, etc. Additionally or alternatively, the UEs 1711, 1721 can be configured to communicate using OFDM communication signals with each other or with any of the NANs 1731, 1732 over a multicarrier communication channel in accordance with various communication techniques, such as, but not limited to, an OFDMA communication technique (e.g., for downlink communications) and/or an SC-FDMA communication technique (e.g., for uplink and ProSe or side link communications), although the scope is not limited in this respect.

For most cellular communication systems, the RAN function(s) operated by the RAN or individual NANs 1731-1732 organize downlink transmissions (e.g., from any of the RAN nodes 1731, 1732 to the UEs 1711, 1721) and uplink transmissions (e.g., from the UEs 1711, 1721 to RAN nodes 1731, 1732) into radio frames (or simply "frames") with 10 millisecond (ms) durations, where each frame includes ten 1 ms subframes. Each transmission direction has its own resource grid that indicate physical resource in each slot, where each column and each row of a resource grid corresponds to one symbol and one subcarrier, respectively. The duration of the resource grid in the time domain corresponds to one slot in a radio frame. The resource grids comprise a number of resource blocks (RBs), which describe the mapping of certain physical channels to resource elements (REs). Each RB may be a physical RB (PRB) or a virtual RB (VRB) and comprises a collection of REs. An RE is the smallest time-frequency unit in a resource grid. The RNC function(s) dynamically allocate resources (e.g., PRBs and modulation and coding to schemes (MCS)) to each UE 1711, 1721 at each transmission time interval (TTI). A TTI is the duration of a transmission on a radio link 1703, 1705, and is related to the size of the data blocks passed to the radio link layer from higher network layers.

The NANs 1731/1732 may be configured to communicate with one another via respective interfaces or links (not shown), such as an X2 interface for LTE implementations (e.g., when CN 1742 is an Evolved Packet Core (EPC)), an Xn interface for 5G or NR implementations (e.g., when CN 1742 is an Fifth Generation Core (5GC)), or the like. The NANs 1731 and 1732 are also communicatively coupled to CN 1742. Additionally or alternatively, the CN 1742 may be an evolved packet core (EPC) network, a NextGen Packet Core (NPC) network, a 5G core (5GC), or some other type of CN. The CN 1742 may comprise a plurality of network elements, which are configured to offer various data and telecommunications services to customers/subscribers (e.g., users of UEs 1721 and IoT devices 1711) who are connected to the CN 1742 via a RAN. The components of the CN 1742 may be implemented in one physical node or separate physical nodes including components to read and execute instructions from a machine-readable or computer-readable medium (e.g., a non-transitory machine-readable storage medium). Additionally or alternatively, Network Functions Virtualization (NFV) may be utilized to virtualize any or all of the above-described network node functions via executable instructions stored in one or more computer-readable storage mediums (described in further detail infra). A logical instantiation of the CN 1742 may be referred to as a network slice, and a logical instantiation of a portion of the CN 1742 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 1742 components/functions.

The CN 1742 is shown to be communicatively coupled to an application server 1750 and a network 1750 via an IP communications interface 1755. The one or more server(s) 1750 comprise one or more physical and/or virtualized systems for providing functionality (or services) to one or more clients (e.g., UEs 1721 and IoT devices 1711) over a network. The server(s) 1750 may include various computer devices with rack computing architecture component(s), tower computing architecture component(s), blade computing architecture component(s), and/or the like. The server(s) 1750 may represent a cluster of servers, a server farm, a cloud computing service, or other grouping or pool of servers, which may be located in one or more datacenters. The server(s) 1750 may also be connected to, or otherwise associated with one or more data storage devices (not shown). Moreover, the server(s) 1750 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 1750 offer applications or services that use IP/network resources. As examples, the server(s) 1750 may provide traffic management services, cloud analytics, content streaming services, immersive gaming experiences, social networking and/or microblogging services, and/or other like services. In addition, the various services provided by the server(s) 1750 may include initiating and controlling software and/or firmware updates for applications or individual components implemented by the UEs 1721 and IoT devices 1711. The server(s) 1750 can also be configured to support one or more communication services (e.g., Voice-over-Internet Protocol (VoIP) sessions, PTT sessions, group communication sessions, social networking services, etc.) for the UEs 1721 and IoT devices 1711 via the CN 1742.

The Radio Access Technologies (RATs) employed by the NANs 1731-1733, the UEs 1721, 1711, and the other elements in FIG. 17 may include, for example, any of the communication protocols and/or RATs discussed herein. Different technologies exhibit benefits and limitations in different scenarios, and application performance in different scenarios becomes dependent on the choice of the access networks (e.g., WiFi, LTE, etc.) and the used network and transport protocols (e.g., Transfer Control Protocol (TCP), Virtual Private Network (VPN), Multi-Path TCP (MPTCP), Generic Routing Encapsulation (GRE), etc.). These RATs may include one or more V2X RATs, which allow these elements to communicate directly with one another, with infrastructure equipment (e.g., NANs 1731-1733), and other devices. In some implementations, at least two distinct V2X RATs may be used including WLAN V2X (W-V2X) RAT based on IEEE V2X technologies (e.g., DSRC for the U.S. and ITS-G5 for Europe) and 3GPP C-V2X RAT (e.g., LTE, 5G/NR, and beyond). In one example, the C-V2X RAT may utilize a C-V2X air interface and the WLAN V2X RAT may utilize an W-V2X air interface.

The W-V2X RATs include, for example, IEEE 1609.0-2019, "IEEE Guide for Wireless Access in Vehicular Environments (WAVE) Architecture" (2019-04-10) ("[IEEE16090]"), SAE Intl, "V2X Communications Message Set Dictionary" (formerly "Dedicated Short Range Communication (DSRC) Message Set Dictionary") (2020-07-23) ("[J2735_202007]"), Intelligent Transport Systems in the 5 GHz frequency band (ITS-G5), the IEEE 802.11p protocol (which is the layer 1 (L1) and layer 2 (L2) part of WAVE, DSRC, and ITS-G5), and sometimes IEEE 802.16-2017, "IEEE Standard for Air Interface for Broadband Wireless Access Systems" (sometimes referred to as "Worldwide Interoperability for Microwave Access" or "WiMAX") (2018-03-02) ("[WiMAX]"). The term "DSRC" refers to vehicular communications in the 5.9 GHz frequency band that is generally used in the United States, while "ITS-G5" refers to vehicular communications in the 5.9 GHz frequency band in Europe. Since any number of different RATs are applicable (including IEEE 802.11p-based RATs) that may be used in any geographic or political region, the terms "DSRC" (used, among other regions, in the U.S.) and "ITS-G5" (used, among other regions, in Europe) may be used interchangeably throughout this disclosure. The access layer for the ITS-G5 interface is outlined in ETSI EN 302 663 V1.3.1 (2020-01) (hereinafter "[EN302663]") and describes the access layer of the ITS-S reference architecture. The ITS-G5 access layer comprises [IEEE80211] (which now incorporates IEEE 802.11p) and IEEE 802.2 Logical Link Control (LLC) ("[IEEE8022]") and/or IEEE/ISO/IEC 8802-2-1998 protocols, as well as features for Decentralized Congestion Control (DCC) methods discussed in ETSI TS 102 687 V1.2.1 (2018-04) ("[TS102687]"). The access layer for 3GPP LTE-V2X based interface(s) is outlined in, inter alia, ETSI EN 303 613 V1.1.1 (2020-01), 3GPP TS 23.285 v16.2.0 (2019-12); and 3GPP 5G/NR-V2X is outlined in, inter alia, 3GPP TR 23.786 v16.1.0 (2019-06) and 3GPP TS 23.287 v16.2.0 (2020-03).

The cloud 1744 may represent a cloud computing architecture/platform that provides one or more cloud computing services. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Some capabilities of cloud 1744 include application capabilities type, infrastructure capabilities type, and platform capabilities type. A cloud capabilities type is a classification of the functionality provided by a cloud service to a cloud service customer (e.g., a user of cloud 1744), based on the resources used. The application capabilities type is a cloud capabilities type in which the cloud service customer can use the cloud service provider's applications; the infrastructure capabilities type is a cloud capabilities type in which the cloud service customer can provision and use processing, storage or networking resources; and platform capabilities type is a cloud capabilities type in which the cloud service customer can deploy, manage and run customer-created or customer-acquired applications using one or more programming languages and one or more execution environments supported by the cloud service provider. Cloud services may be grouped into categories that possess some common set of qualities. Some cloud service categories that the cloud 1744 may provide include, for example, Communications as a Service (CaaS), which is a cloud service category involving real time interaction and collaboration services; Compute as a Service (CompaaS), which is a cloud service category involving the provision and use of processing resources needed to deploy and run software; Database as a Service (DaaS), which is a cloud service category involving the provision and use of database system management services; Data Storage as a Service (DSaaS), which is a cloud service category involving the provision and use of data storage and related capabilities; Firewall as a Service (FaaS), which is a cloud service category involving providing firewall and network traffic management services; Infrastructure as a Service (IaaS), which is a cloud service category involving infrastructure capabilities type; Network as a Service (NaaS), which is a cloud service category involving transport connectivity and related network capabilities; Platform as a Service (PaaS), which is a cloud service category involving the platform capabilities type; Software as a Service (SaaS), which is a cloud service category involving the application capabilities type; Security as a Service, which is a cloud service category involving providing network and information security (infosec) services; and/or other like cloud services.

Additionally or alternatively, the cloud 1744 may represent one or more cloud servers, application servers, web servers, and/or some other remote infrastructure. The remote/cloud servers may include any one of a number of services and capabilities such as, for example, any of those discussed herein.

Additionally or alternatively, the cloud 1744 may represent a network such as the Internet, a local area network (LAN), a wide area network (WAN), a wireless local area network (WLAN), or a wireless wide area network (WWAN) including proprietary and/or enterprise networks for a company or organization, or combinations thereof. The cloud 1744 may be a network that comprises computers, network connections among the computers, and software routines to enable communication between the computers over network connections. In this regard, the cloud 1744 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 1744 may be via a wired or a wireless connection using the various communication protocols discussed infra. More than one network may be involved in a communication session between the illustrated devices. Connection to the cloud 1744 may require that the computers execute software routines which enable, for example, the seven layers of the OSI model of computer networking or equivalent in a wireless (cellular) phone network. Cloud 1744 may be used to enable relatively long-range communication such as, for example, between the one or more server(s) 1750 and one or more UEs 1721 and IoT devices 1711. Additionally or alternatively, the cloud 1744 may represent the Internet, one or more cellular networks, local area networks, or wide area networks including proprietary and/or enterprise networks, TCP/Internet Protocol (IP)-based network, or combinations thereof. In these implementations, the cloud 1744 may be associated with network operator who owns or controls equipment and other elements necessary to provide network-related services, such as one or more base stations or access points, one or more servers for routing digital data or telephone calls (e.g., a core network or backbone network), etc. The backbone links 1755 may include any number of wired or wireless technologies, and may be part of a LAN, a WAN, or the Internet. In one example, the backbone links 1755 are fiber backbone links that couple lower levels of service providers to the Internet, such as the CN 1712 and cloud 1744.

The edge compute nodes 1736 may include or be part of an edge system 1735 (or edge network 1735). The edge compute nodes 1736 may also be referred to as "edge hosts 1736" or "edge servers 1736." The edge system 1735 includes a collection of edge servers 1736 and edge management systems (not shown by FIG. 17) necessary to run edge computing applications within an operator network or a subset of an operator network. The edge servers 1736 are physical computer systems that may include an edge platform and/or virtualization infrastructure, and provide compute, storage, and network resources to edge computing applications. Each of the edge servers 1736 are disposed at an edge of a corresponding access network, and are arranged to provide computing resources and/or various services (e.g., computational task and/or workload offloading, cloud-computing capabilities, IT services, and other like resources and/or services as discussed herein) in relatively close proximity to intermediate nodes 1720 and/or endpoints 1710. The VI of the edge servers 1736 provide virtualized environments and virtualized resources for the edge hosts, and the edge computing applications may run as VMs and/or application containers on top of the VI. One example implementation of the edge system 1735 is an MEC system 1735. It should be understood that the disclosed MEC systems and services deployment examples are only one illustrative example of edge computing systems/networks 1735, and that the present disclosure may be applicable to many other edge computing/networking technologies in various combinations and layouts of devices located at the edge of a network including the various edge computing networks/systems described herein. Further, the techniques disclosed herein may relate to other IoT edge network systems and configurations, and other intermediate processing entities and architectures may also be applicable to the present disclosure.

As shown by FIG. 17, each of the NANs 1731, 1732, and 1733 are co-located with edge compute nodes (or "edge servers") 1736a, 1736b, and 1736c, respectively. These implementations may be small-cell clouds (SCCs) where an edge compute node 1736 is co-located with a small cell (e.g., pico-cell, femto-cell, etc.), or may be mobile micro clouds (MCCs) where an edge compute node 1736 is co-located with a macro-cell (e.g., an eNB, gNB, etc.). The edge compute node 1736 may be deployed in a multitude of arrangements other than as shown by FIG. 17. In a first example, multiple NANs 1731-1733 are co-located or otherwise communicatively coupled with one edge compute node 1736. In a second example, the edge servers 1736 may be co-located or operated by RNCs, which may be the case for legacy network deployments, such as 3G networks. In a third example, the edge servers 1736 may be deployed at cell aggregation sites or at multi-RAT aggregation points that can be located either within an enterprise or used in public coverage areas. In a fourth example, the edge servers 1736 may be deployed at the edge of CN 1742. These implementations may be used in follow-me clouds (FMC), where cloud services running at distributed data centers follow the UEs 1721 as they roam throughout the network.

In any of the implementations discussed herein, the edge servers 1736 provide a distributed computing environment for application and service hosting, and also provide storage and processing resources so that data and/or content can be processed in close proximity to subscribers (e.g., users of UEs 1721, 1711) for faster response times The edge servers 1736 also support multitenancy run-time and hosting environment(s) for applications, including virtual appliance applications that may be delivered as packaged virtual machine (VM) images, middleware application and infrastructure services, content delivery services including content caching, mobile big data analytics, and computational offloading, among others. Computational offloading involves offloading computational tasks, workloads, applications, and/or services to the edge servers 1736 from the UEs 1711/1721, CN 1742, cloud 1744, and/or server(s) 1750, or vice versa. For example, a device application or client application operating in a UE 1721/1711 may offload application tasks or workloads to one or more edge servers 1736. In another example, an edge server 1736 may offload application tasks or workloads to one or more UE 1721/1711 (e.g., for distributed ML computation or the like).

2. Hardware Components

The network components of the various devices and/or systems discussed herein may be servers, appliances, network infrastructure, machines, robots, drones, and/or any other type of computing devices. For example, the edge cloud may include an appliance computing device that is a self-contained electronic device including a housing, a chassis, a case or a shell. In some circumstances, the housing may be dimensioned for portability such that it can be carried by a human and/or shipped. Alternatively, it may be a smaller module suitable for installation in a vehicle for example. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Smaller, modular implementations may also include an extendible or embedded antenna arrangement for wireless communications. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 18. The edge cloud may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figures 18, 19:
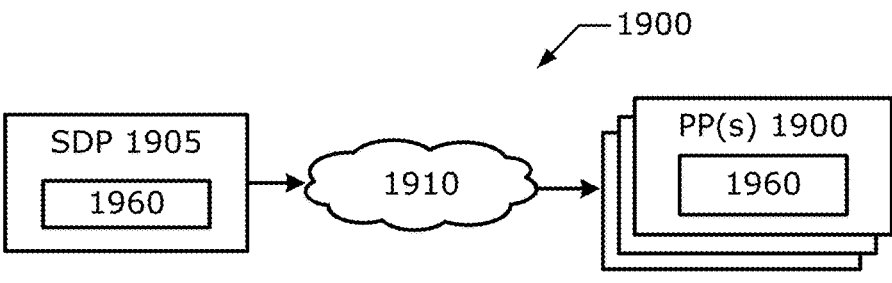
FIG. 18 depicts example components of a compute node.
FIG. 19 illustrates an example software distribution platform.

FIG. 18 illustrates an example of components that may be present in a computing node 1850 for implementing the techniques (e.g., operations, processes, methods, and methodologies) described herein. The compute node 1850 provides a closer view of the respective components of node 1800 when implemented as or as part of a computing device (e.g., as a mobile device, a base station, server, gateway, etc.). The compute node 1850 may include any combinations of the hardware or logical components referenced herein, and it may include or couple with any device usable with an edge communication network or a combination of such networks. The components may be implemented as integrated circuitry (ICs), a System on Chip (SoC), portions thereof, discrete electronic devices, or other modules, instruction sets, programmable logic or algorithms, hardware, hardware accelerators, software, firmware, or a combination thereof adapted in the compute node 1850, or as components otherwise incorporated within a chassis of a larger system.

In some embodiments, compute node 1850 may correspond to the RFID reader 150, host computer 152, or mobile agent 110 of FIG. 1A; the PCB 811*a* or the mobility mechanism 812 of FIG. 1B; UEs 1711, 1721*a*, NANs 1731-1733, edge compute node(s) 1736, CN 1742 (or compute node(s) therein), and/or cloud 1744 (or compute node(s) therein) of FIG. 17; software distribution platform 1905 and/or processor platform(s) 1900 of FIG. 19; and/or any other component, device, and/or system discussed herein. The compute node 1850 may be embodied as a type of device, appliance, computer, or other "thing" capable of communicating with other edge, networking, or endpoint components. For example, compute node 1850 may be embodied as a smartphone, a mobile compute device, a smart appliance, an in-vehicle compute system (e.g., a navigation system), an edge compute node, a NAN, switch, router, bridge, hub, and/or other device or system capable of performing the described functions.

The compute node 1850 includes processing circuitry in the form of one or more processors 1852. The processor circuitry 1852 includes circuitry such as, but not limited to one or more processor cores and one or more of cache memory, low drop-out voltage regulators (LDOs), interrupt controllers, serial interfaces such as SPI, I²C or universal programmable serial interface circuit, real time clock (RTC), timer-counters including interval and watchdog timers, general purpose I/O, memory card controllers such as secure digital/multi-media card (SD/MMC) or similar, interfaces, mobile industry processor interface (MIPI) interfaces and Joint Test Access Group (JTAG) test access ports. In some implementations, the processor circuitry 1852 may include one or more hardware accelerators (e.g., same as or similar to acceleration circuitry 1864), which may be microprocessors, programmable processing devices (e.g., FPGA, ASIC, etc.), or the like. The one or more accelerators may include, for example, computer vision and/or deep learning accelerators. In some implementations, the processor circuitry 1852 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor circuitry 1852 may be, for example, one or more processor cores (CPUs), application processors, GPUs, RISC processors, Acorn RISC Machine (ARM) processors, CISC processors, one or more DSPs, one or more FPGAs, one or more PLDs, one or more ASICs, one or more baseband processors, one or more radio-frequency integrated circuits (RFIC), one or more microprocessors or controllers, a multi-core processor, a multithreaded processor, an ultra-low voltage processor, an embedded processor, a special purpose processing unit and/or specialized processing unit, or any other known processing elements, or any suitable combination thereof. In some implementations, the processor circuitry 1852 may be embodied as a specialized x-processing unit (xPU) also known as a data processing unit (DPU), infrastructure processing unit (IPU), or network processing unit (NPU). An xPU may be embodied as a standalone circuit or circuit package, integrated within an SoC, or integrated with networking circuitry (e.g., in a SmartNIC, or enhanced SmartNIC), acceleration circuitry, storage devices, storage disks, and/or AI hardware (e.g., GPUs or programmed FPGAs). The xPU may be designed to receive programming to process one or more data streams and perform specific tasks and actions for the data streams (e.g., hosting microservices, performing service management or orchestration, organizing or managing server or data center hardware, managing service meshes, or collecting and distributing telemetry), outside of a CPU or general purpose processing hardware. However, an xPU, a SoC, a CPU, and other variations of the processor circuitry 1852 may work in coordination with each other to execute many types of operations and instructions within and on behalf of the compute node 1850.

The processors (or cores) 1852 may be coupled with or may include memory/storage and may be configured to execute instructions stored in the memory/storage to enable various applications or operating systems to run on the platform 1850. The processors (or cores) 1852 is configured to operate application software to provide a specific service to a user of the platform 1850. Additionally or alternatively, the processor(s) 1852 may be a special-purpose processor(s)/controller(s) configured (or configurable) to operate according to the elements, features, and implementations discussed herein.

As examples, the processor(s) 1852 may include an Intel® Architecture Core™ based processor such as an i3, an i5, an i7, an i9 based processor; an Intel® microcontroller-based processor such as a Quark™, an Atom™, or other MCU-based processor; Pentium® processor(s), Xeon® processor(s), or another such processor available from Intel® Corporation, Santa Clara, California. However, any number other processors may be used, such as one or more of Advanced Micro Devices (AMD) Zen® Architecture such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor(s) 1852 may be a part of a system on a chip (SoC), System-in-Package (SiP), a multi-chip package (MCP), and/or the like, in which the processor(s) 1852 and other components are formed into a single integrated circuit, or a single package, such as the Edison™ or Galileo™ SoC boards from Intel® Corporation. Other examples of the processor(s) 1852 are mentioned elsewhere in the present disclosure.

The processor(s) 1852 may communicate with system memory 1854 over an interconnect (IX) 1856. Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Other types of RAM, such as dynamic RAM (DRAM), synchronous DRAM (SDRAM), and/or the like may also be included. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1858 may also couple to the processor 1852 via the IX 1856. In an example, the storage 1858 may be implemented via a solid-state disk drive (SSDD) and/or high-speed electrically erasable memory (commonly referred to as "flash memory"). Other devices that may be used for the storage 1858 include flash memory cards, such as SD cards, microSD cards, eXtreme Digital (XD) picture cards, and the like, and USB flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, phase change RAM (PRAM), resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a Domain Wall (DW) and Spin Orbit Transfer (SOT) based device, a thyristor based memory device, or a combination of any of the above, or other memory. The memory circuitry 1854 and/or storage circuitry 1858 may also incorporate three-dimensional (3D) cross-point (XPOINT) memories from Intel® and Micron®.

In low power implementations, the storage 1858 may be on-die memory or registers associated with the processor 1852. However, in some examples, the storage 1858 may be implemented using a micro hard disk drive (HDD). Further, any number of new technologies may be used for the storage 1858 in addition to, or instead of, the technologies described, such resistance change memories, phase change memories, holographic memories, or chemical memories, among others.

The components of edge computing device 1850 may communicate over an interconnect (IX) 1856. The IX 1856 may represent any suitable type of connection or interface such as, for example, metal or metal alloys (e.g., copper, aluminum, etc.), fiber, and/or the like. The IX 1856 to may include any number of IX, fabric, and/or interface technologies, including instruction set architecture (ISA), extended ISA (eISA), Inter-Integrated Circuit (I²C), serial peripheral interface (SPI), point-to-point interfaces, power management bus (PMBus), peripheral component interconnect (PCI), PCI express (PCIe), PCI extended (PCIx), Intel® Ultra Path Interconnect (UPI), Intel® Accelerator Link, Intel® QuickPath Interconnect (QPI), Intel® Omni-Path Architecture (OPA), Compute Express Link™ (CXL™) IX technology, RapidIO™ IX, Coherent Accelerator Processor Interface (CAPI), OpenCAPI, cache coherent interconnect for accelerators (CCIX), Gen-Z Consortium IXs, Hyper-Transport IXs, NVLink provided by NVIDIA®, a Time-Trigger Protocol (TTP) system, a FlexRay system, PROFI-BUS, ARM® Advanced eXtensible Interface (AXI), ARM® Advanced Microcontroller Bus Architecture (AMBA) IX, HyperTransport, Infinity Fabric (IF), and/or any number of other IX technologies. The IX 1856 may be a proprietary bus, for example, used in a SoC based system. In some implementations, the IX 1856 connects the compute node 1850 with the RFID reader 150 and/or the agent control system 151 discussed previously with respect to FIG. 1A.

The IX 1856 couples the processor 1852 to communication circuitry 1866 for communications with other devices, such as a remote server (not shown) and/or the connected edge devices 1862. The communication circuitry 1866 is a hardware element, or collection of hardware elements, used to communicate over one or more networks (e.g., cloud 1863) and/or with other devices (e.g., edge devices 1862).

The transceiver 1866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1866 (or multiple transceivers) may communicate using multiple standards or radios for communications at a different range. For example, the compute node 1850 may communicate with close devices, e.g., within about 10 meters, using a local transceiver based on BLE, or another low power radio, to save power. More distant connected edge devices 1862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1866 (e.g., a radio transceiver) may be included to communicate with devices or services in the edge cloud 1863 via local or wide area network protocols. The wireless network transceiver 1866 may be an LPWA transceiver that follows the IEEE 802.15.4, or IEEE 802.15.4g standards, among others. The compute node 1863 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1866, as described herein. For example, the transceiver 1866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1866 may include radios that are compatible with any number of 3GPP specifications, such as LTE and 5G/NR communication systems, discussed in further detail at the end of the present disclosure. A network interface controller (NIC) 1868 may be included to provide a wired communication to nodes of the edge cloud 1863 or to other devices, such as the connected edge devices 1862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, or PROFINET, among many others. An additional NIC 1868 may be included to enable connecting to a second network, for example, a first NIC 1868 providing communications to the cloud over Ethernet, and a second NIC 1868 providing communications to other devices over another type of network. In some implementations, the NIC 1868 and/or the transceiver 1866 may communicatively couple the compute node 1850 with the RFID reader 150 and/or the agent control system 151 discussed previously with respect to FIG. 1A. In these implementations, the connected edge devices 1862 may include the RFID reader 150 and/or the agent control system 151.

Given the variety of types of applicable communications from the device to another component or network, applicable communications circuitry used by the device may include or be embodied by any one or more of components 1864, 1866, 1868, or 1870. Accordingly, in various examples, applicable means for communicating (e.g., receiving, transmitting, etc.) may be embodied by such communications circuitry.

The compute node 1850 may include or be coupled to acceleration circuitry 1864, which may be embodied by one or more AI accelerators, a neural compute stick, neuromorphic hardware, an FPGA, an arrangement of GPUs, one or more SoCs (including programmable SoCs), one or more CPUs, one or more digital signal processors, dedicated ASICs (including programmable ASICs), PLDs such as CPLDs or HCPLDs, and/or other forms of specialized processors or circuitry designed to accomplish one or more specialized tasks. These tasks may include AI processing (including machine learning, training, inferencing, and classification operations), visual data processing, network data processing, object detection, rule analysis, or the like. In FPGA-based implementations, the acceleration circuitry 1864 may comprise logic blocks or logic fabric and other interconnected resources that may be programmed (configured) to perform various functions, such as the procedures, methods, functions, etc. discussed herein. In such implementations, the acceleration circuitry 1864 may also include memory cells (e.g., EPROM, EEPROM, flash memory, static memory (e.g., SRAM, anti-fuses, etc.) used to store logic blocks, logic fabric, data, etc. in LUTs and the like.

The IX 1856 also couples the processor 1852 to a sensor hub or external interface 1870 that is used to connect additional devices or subsystems. The additional/external devices may include sensors 1872, actuators 1874, and positioning circuitry 1875. In some implementations, the additional/external devices may include the RFID reader 150 and/or the agent control system 151 discussed previously with respect to FIG. 1A.

The sensor circuitry 1872 includes devices, modules, or subsystems whose purpose is to detect events or changes in its environment and send the information (sensor data) about the detected events to some other a device, module, subsystem, etc. Examples of such sensors 1872 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors, including sensors for measuring the temperature of internal components and sensors for measuring temperature external to the compute node 1850); pressure sensors; barometric pressure sensors; gravimeters; altimeters; image capture devices (e.g., cameras); light detection and ranging (LiDAR) sensors; proximity sensors (e.g., infrared radiation detector and the like); depth sensors, ambient light sensors; optical light sensors; ultrasonic transceivers; microphones; and the like.

The actuators 1874, allow platform 1850 to change its state, position, and/or orientation, or move or control a mechanism or system. The actuators 1874 comprise electrical and/or mechanical devices for moving or controlling a mechanism or system, and converts energy (e.g., electric current or moving air and/or liquid) into some kind of motion. The actuators 1874 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 1874 may include one or more electromechanical devices such as pneumatic actuators, hydraulic actuators, electromechanical switches including electromechanical relays (EMRs), motors (e.g., DC motors, stepper motors, servomechanisms, etc.), power switches, valve actuators, wheels, thrusters, propellers, claws, clamps, hooks, audible sound generators, visual warning devices, and/or other like electromechanical components. The platform 1850 may be configured to operate one or more actuators 1874 based on one or more captured events and/or instructions or control signals received from a service provider and/or various client systems.

The positioning circuitry 1875 includes circuitry to receive and decode signals transmitted/broadcasted by a positioning network of a global navigation satellite system (GNSS).

Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 1875 comprises various hardware elements (e.g., including hardware devices such as switches, filters, amplifiers, antenna elements, and the like to facilitate OTA communications) to communicate with components of a positioning network, such as navigation satellite constellation nodes. Additionally or alternatively, the positioning circuitry 1875 may include a Micro-Technology for Positioning, Navigation, and Timing (Micro-PNT) IC that uses a master timing clock to perform position tracking/estimation without GNSS assistance. The positioning circuitry 1875 may also be part of, or interact with, the communication circuitry 1866 to communicate with the nodes and components of the positioning network. The positioning circuitry 1875 may also provide position data and/or time data to the application circuitry, which may use the data to synchronize operations with various infrastructure (e.g., radio base stations), for turn-by-turn navigation, or the like. When a GNSS signal is not available or when GNSS position accuracy is not sufficient for a particular application or service, a positioning augmentation technology can be used to provide augmented positioning information and data to the application or service. Such a positioning augmentation technology may include, for example, satellite based positioning augmentation (e.g., EGNOS) and/or ground based positioning augmentation (e.g., DGPS). In some implementations, the positioning circuitry 1875 is, or includes an INS, which is a system or device that uses sensor circuitry 1872 (e.g., motion sensors such as accelerometers, rotation sensors such as gyroscopes, and altimeters, magnetic sensors, and/or the like to continuously calculate (e.g., using dead by dead reckoning, triangulation, or the like) a position, orientation, and/or velocity (including direction and speed of movement) of the platform 1850 without the need for external references.

In some optional examples, various input/output (I/O) devices may be present within or connected to, the compute node 1850, which are referred to as input circuitry 1886 and output circuitry 1884 in FIG. 18. The input circuitry 1886 and output circuitry 1884 include one or more user interfaces designed to enable user interaction with the platform 1850 and/or peripheral component interfaces designed to enable peripheral component interaction with the platform 1850. Input circuitry 1886 may include any physical or virtual means for accepting an input including, inter alia, one or more physical or virtual buttons (e.g., a reset button), a physical keyboard, keypad, mouse, touchpad, touchscreen, microphones, scanner, headset, and/or the like. The output circuitry 1884 may be included to show information or otherwise convey information, such as sensor readings, actuator position(s), or other like information. Data and/or graphics may be displayed on one or more user interface components of the output circuitry 1884. Output circuitry 1884 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1850. The output circuitry 1884 may also include speakers or other audio emitting devices, printer(s), and/or the like. Additionally or alternatively, the sensor circuitry 1872 may be used as the input circuitry 1884 (e.g., an image capture device, motion capture device, or the like) and one or more actuators 1874 may be used as the output device circuitry 1884 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc. A display or console hardware, in the context of the present system, may be used to provide output and receive input of an edge computing system; to manage components or services of an edge computing system; identify a state of an edge computing component or service; or to conduct any other number of management or administration functions or service use cases. In some implementations, the output device circuitry 1884 may include the RFID reader 150 and/or the agent control system 151 discussed previously with respect to FIG. 1A.

A battery 1876 may power the compute node 1850, although, in examples in which the compute node 1850 is mounted in a fixed location, it may have a power supply coupled to an electrical grid, or the battery may be used as a backup or for temporary capabilities. The battery 1876 may be a lithium ion battery, or a metal-air battery, such as a zinc-air battery, an aluminum-air battery, a lithium-air battery, and the like. The battery 1876 may correspond to battery 1070 of FIG. 10.

A battery monitor/charger 1878 may be included in the compute node 1850 to track the state of charge (SoCh) of the battery 1876, if included. The battery monitor/charger 1878 may be used to monitor other parameters of the battery 1876 to provide failure predictions, such as the state of health (SoH) and the state of function (SoF) of the battery 1876. The battery monitor/charger 1878 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, TX. The battery monitor/charger 1878 may communicate the information on the battery 1876 to the processor 1852 over the IX 1856. The battery monitor/charger 1878 may also include an analog-to-digital (ADC) converter that enables the processor 1852 to directly monitor the voltage of the battery 1876 or the current flow from the battery 1876. The battery parameters may be used to determine actions that the compute node 1850 may perform, such as transmission frequency, mesh network operation, sensing frequency, and the like.

A power block 1880, or other power supply coupled to a grid, may be coupled with the battery monitor/charger 1878 to charge the battery 1876. In some examples, the power block 1880 may be replaced with a wireless power receiver to obtain the power wirelessly, for example, through a loop antenna in the compute node 1850. A wireless battery charging circuit, such as an LTC4020 chip from Linear Technologies of Milpitas, California, among others, may be included in the battery monitor/charger 1878. The specific charging circuits may be selected based on the size of the battery 1876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1858 may include instructions 1883 in the form of software, firmware, or hardware commands to implement the techniques described herein. Although such instructions 1882, 1883 are shown as code blocks included in the memory 1854 and the storage 1858, any of the code blocks 1882, 1883 may be replaced with hardwired circuits, for example, built into an application specific integrated circuit (ASIC) or programmed into an FPGA, or the like.

In an example, the instructions 1881, 1882, 1883 provided via the memory 1854, the storage 1858, or the processor 1852 may be embodied as a non-transitory machine-readable medium (NTMRM) 1860 including code to direct the processor 1852 to perform electronic operations in the compute node 1850. The processor 1852 may access the NTMRM 1860 over the IX 1856. For instance, the NTMRM 1860 may be embodied by devices described for the storage 1858 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The NTMRM 1860 may include instructions to direct the processor 1852 to perform a specific sequence or flow of actions, for example, as described with respect to the flowchart(s) and block diagram (s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

Computer program code for carrying out operations of the present disclosure (e.g., computational logic and/or instructions 1881, 1882, 1883) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, PHP, Pearl, Python, Ruby on Rails, and/or the like; a markup language such as Hypertext Markup Language (HTML), Extensible Markup Language (XML), Java Script Object Notion (JSON), Apex®, Abstract Syntax Notation One (ASN.1), Google® Protocol Buffers (protobuf), or the like; some other suitable programming languages including proprietary programming languages and/or development tools, or any other languages tools. The computer program code 1881, 1882, 1883 for carrying out operations of the present disclosure may also be written in any combination of the programming languages discussed herein. The program code may execute entirely on the system 1850, partly on the system 1850, as a stand-alone software package, partly on the system 1850 and partly on a remote computer or entirely on the remote computer or server. In the latter scenario, the remote computer may be connected to the system 1850 through any type of network, including a LAN or WAN, or the connection may be made to an external computer (e.g., through the Internet using an Internet Service Provider).

In an example, the instructions 1881, 1882, 1883 on the processor circuitry 1852 (separately, or in combination with the instructions 1881, 1882, 1883) may configure execution or operation of a trusted execution environment (TEE) 1890. The TEE 1890 operates as a protected area accessible to the processor circuitry 1802 to enable secure access to data and secure execution of instructions. In some embodiments, the TEE 1890 may be a physical hardware device that is separate from other components of the system 1850 such as a secure-embedded controller, a dedicated SoC, or a tamper-resistant chipset or microcontroller with embedded processing devices and memory devices. Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like.

Additionally or alternatively, the TEE 1890 may be implemented as secure enclaves, which are isolated regions of code and/or data within the processor and/or memory/ storage circuitry of the system 1850. Only code executed within a secure enclave may access data within the same secure enclave, and the secure enclave may only be accessible using the secure application (which may be implemented by an application processor or a tamper-resistant microcontroller). Various implementations of the TEE 1890, and an accompanying secure area in the processor circuitry 1852 or the memory circuitry 1854 and/or storage circuitry 1858 may be provided, for instance, through use of Intel® Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the device 1800 through the TEE 1890 and the processor circuitry 1852. Additionally or alternatively, the memory circuitry 1854 and/or storage circuitry 1858 may be divided into isolated user-space instances such as containers, partitions, virtual environments (VEs), etc. The isolated user-space instances may be implemented using a suitable OS-level virtualization technology such as Docker® containers, Kubernetes® containers, Solaris® containers and/or zones, OpenVZ® virtual private servers, DragonFly BSD® virtual kernels and/or jails, chroot jails, and/or the like. Virtual machines could also be used in some implementations. In some embodiments, the memory circuitry 1804 and/or storage circuitry 1808 may be divided into one or more trusted memory regions for storing applications or software modules of the TEE 1890.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

FIG. 18 depicts a high-level view of components of a varying device, subsystem, or arrangement of a compute node. However, some of the components shown may be omitted, additional components may be present, and a different arrangement of the components shown may occur in other implementations. Further, these arrangements are usable in a variety of use cases and environments, including those discussed below (e.g., a mobile UE in industrial compute for smart city or smart factory, among many other examples).

FIG. 19 illustrates an example software (SW) distribution platform (SDP) 1905 to distribute software 1960, such as the example computer readable instructions 1881, 1882, 1883 of FIG. 18, to one or more devices, such as example processor platform(s) (pp) 1900, connected edge devices 1862 (see e.g., FIG. 18), and/or any of the other computing systems/devices discussed herein. The SDP 1905 (or components thereof) may be implemented by any computer server, data facility, cloud service, CDN, edge computing framework, etc., capable of storing and transmitting software (e.g., code, scripts, executable binaries, containers, packages, compressed files, and/or derivatives thereof) to other computing devices (e.g., third parties, the example connected edge devices 1862 of FIG. 18). The SDP 1905 (or components thereof) may be located in a cloud (e.g., data center, etc.), a local area network, an edge network, a wide area network, on the Internet, and/or any other location communicatively coupled with the pp 1900.

The pp 1900 and/or connected edge devices 1862 connected edge devices 1862 may include customers, clients, managing devices (e.g., servers), third parties (e.g., customers of an entity owning and/or operating the SDP 1905), IoT devices, and the like. The pp 1900/connected edge devices 1862 may operate in commercial and/or home automation environments. In some examples, a third party is a developer, a seller, and/or a licensor of software such as the example computer readable media 1881, 1882, 1883 of FIG. 18. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.). In some examples, the pp 1900/connected edge devices 1862 can be physically located in different geographic locations, legal jurisdictions, etc.

In FIG. 19, the SDP 1905 includes one or more servers (referred to as "servers 1905") and one or more storage devices (referred to as "storage 1905"). The storage 1905 store the computer readable instructions 1960, which may correspond to the instructions 1881, 1882, 1883 of FIG. 18. The servers 1905 are in communication with a network 1910, which may correspond to any one or more of the Internet and/or any of the example networks as described herein. The servers 1905 are responsive to requests to transmit the software to a requesting party as part of a commercial transaction. Payment for the delivery, sale and/or license of the software may be handled by the servers 1905 and/or via a third-party payment entity. The servers 1905 enable purchasers and/or licensors to download the computer readable instructions 1960 from the SDP 1905.

The servers 1905 are communicatively connected to one or more security domains and/or security devices through which requests and transmissions of the example computer readable instructions 1960 must pass. Additionally or alternatively, the servers 1905 periodically offer, transmit, and/or force updates to the software 1960 to ensure improvements, patches, updates, etc. are distributed and applied to the software at the end user devices. The computer readable instructions 1960 are stored on storage 1905 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.), and/or any other format such as those discussed herein. In some examples, the computer readable instructions 1960 stored in the SDP 1905 are in a first format when transmitted to the pp 1900. Additionally or alternatively, the first format is an executable binary in which particular types of the pp 1900 can execute. Additionally or alternatively, the first format is uncompiled code that requires one or more preparation tasks to transform the first format to a second format to enable execution on the pp 1900. For example, the receiving pp 1900 may need to compile the computer readable instructions 1960 in the first format to generate executable code in a second format that is capable of being executed on the pp 1900. Additionally or alternatively, the first format is interpreted code that, upon reaching the pp 1900, is interpreted by an interpreter to facilitate execution of instructions. Additionally or alternatively, different components of the computer readable instructions 1882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

3. Example Implementations

Additional examples of the presently described methods, devices, systems, and networks discussed herein include the following, non-limiting implementations. Each of the following non-limiting examples may stand on its own or may be combined in any permutation or combination with any one or more of the other examples provided below or throughout the present disclosure.

Example A01 includes a method of operating a relay circuit, comprising: receiving, via radio frequency (RF) chain circuitry, first signals from an RF identification (RFID) reader; receiving, via the RF chain circuitry, second signals from one or more RFID tags within a relay range of the relay circuit; and configuring the RF chain circuitry to relay the received first signals at a power level towards the one or more RFID tags, wherein the power level is adjustable based on commands obtained from the RFID reader; and configuring the RF chain circuitry to relay the second signals to the RFID reader, wherein the second signals are responses to the first signals.

Example 2 includes the method of example A01 and/or some other example(s) herein, wherein the first and second signals are for identification of one or more landmark RFID tags and one or more object RFID tags.

Example 3 includes the method of example 2 and/or some other example(s) herein, wherein the relay circuit includes one or more on-board RFID tags, wherein each of the on-board RFID tags comprises an interface to at least one processor.

Example 4a includes the method of example 3 and/or some other example(s) herein, further comprising: when multiple landmark tags and the one or more object RFID tags are within the relay range of the relay circuit, the method comprises: receiving, via the RF chain circuitry, signals for the one or more on-board RFID tags from the RFID reader, and responsive to a signal from the interface of the one or more on-board RFID tags, reducing the power level until a single landmark tag of the one or more landmark RFID tags is within the relay range of the relay circuit.

Example 4b includes the method of example 3 and/or some other example(s) herein, wherein when multiple landmark tags and the one or more object RFID tags are within the relay range of the relay circuit, the method comprises: receiving, via the RF chain circuitry, signals for the one or more on-board RFID tags from the RFID reader, and responsive to a signal from the interface of the one or more on-board RFID tags, reducing the power level to reduce a number of landmark tags within the relay range of the relay circuit.

Example 5 includes the method of examples 3-4b and/or some other example(s) herein, further comprising: receiving select and query signals for the one or more on-board RFID tags from the RFID reader; responsive to a signal from the interface of the one or more on-board RFID tags, associating a bit value with each on-board RFID tag based on whether each on-board RFID tag has been selected and queried by the RFID reader; and adjusting the power level based on the bit values.

Example 6 includes the method of example 5 and/or some other example(s) herein, wherein the signal from the interface of the one or more on-board RFID tags are to trigger an interrupt of the at least one processor in response to the one or more on-board RFID tags being selected and queried.

Example 7 includes the method of examples 3-6 and/or some other example(s) herein, further comprising: receiving, via the RF chain circuitry, select and write signals for one of the one or more on-board RFID tags from the RFID reader to write data to a user memory of the on-board RFID tag; and adjusting the power level based on the data in the user memory.

Example 8a includes the method of examples 1-7 and/or some other example(s) herein, further comprising: adjusting the power level based on a density of RFID tags within the relay range of the relay circuit.

Example 8b includes the method of examples 1-8a and/or some other example(s) herein, wherein adjusting the power level comprises: increasing the power level when the density of RFID tags is relatively low; and decreasing the power level when the density of RFID tags is relatively high.

Example 8c includes the method of examples 1-8b and/or some other example(s) herein, wherein adjusting the power level comprises: adjusting the power level as the relay circuit moves relative to a population of RFID tags.

Example 9 includes the method of examples 1-8c and/or some other example(s) herein, wherein the RF chain circuitry, the memory, and the at least one processor are disposed on a printed circuit board, and the printed circuit board is to be carried by a mobility mechanism.

Example 10 includes the method of examples 1-9 and/or some other example(s) herein, further comprising: receiving a signal from the RFID reader to instruct the relay circuit to enter a sleep mode for a predetermined time period when a landmark tag is within the relay range of the relay circuit, and then power back on, to reduce a power consumption of the relay circuit while the relay circuit moves toward a target location.

Example 11 includes the method of examples 1-10 and/or some other example(s) herein, further comprising: receiving a signal from the RFID reader to instruct the relay circuit to enter a sleep mode for a predetermined time period when the RFID reader determines that the relay range of the relay circuit overlaps with one or more other RFID readers, and then power back on, to allow the relay circuit to move to a location in which the relay range of the relay circuit overlaps with a single RFID reader.

Example 12 includes the method of examples 1-11 and/or some other example(s) herein, wherein when the relay range of the relay circuit overlaps with the one or more other RFID readers, the method comprises: receiving a signal from the RFID reader to instruct the relay circuit to set a sleep mode for a predetermined time period, and then power back on, to allow the relay circuit to move to a location in which the relay range of the relay circuit overlaps with a single RFID reader.

Example 13 includes the method of examples 1-12 and/or some other example(s) herein, further comprising: tracking a signal strength of an active RFID tag, and navigating toward the active RFID tag based on the tracked signal strength.

Example 14 includes the method of examples 1-13 and/or some other example(s) herein, wherein the RF chain circuitry comprises: a downlink path to relay the received first signals at the power level towards the one or more RFID tags; and the downlink path comprises a digital attenuator under control of the at least one processor to set the power level.

Example 15 includes the method of examples 1-14 and/or some other example(s) herein, wherein the RF chain circuitry comprises: a first antenna configured to receive the first signals from the RFID reader; a second antenna configured to receive second signals from the one or more RFID tags; and one or more hardware (HW) elements configured to control the relaying of the received first signals and control the relaying of the second signals based on the configuring.

Example 16 includes the method of example 15 and/or some other example(s) herein, wherein the first antenna is a different antenna than the second antenna.

Example 17 includes the method of example 15 and/or some other example(s) herein, wherein the first antenna is a same antenna as the second antennas.

Example 18 includes the method of examples 15-17 and/or some other example(s) herein, wherein the relaying comprises: relaying, via the RF chain circuitry, the first signals or the second signals from at least one HW element of the set of HW elements to at least one other HW element of the set of HW elements.

Example 19 includes the method of examples 15-18 and/or some other example(s) to herein, wherein the relaying comprises: receiving the first signals through the first antenna;

relaying the received first signals at the power level through a first subset of the set of HW elements to the second antenna for transmission to the one or more RFID tags; receiving the second signals through the second antenna; and relaying the received second signals through a second subset of the set of HW elements to the first antenna for transmission to the RFID reader.

Example 20 includes a method, comprising: communicating with a mobile agent to identify one or more landmark radio frequency identification (RFID) tags and one or more object RFID tags within a relay range of the mobile agent; determining from the communication with the mobile agent that multiple landmark RFID tags are within the relay range of the mobile agent; and sending a command to the mobile agent to reduce the relay range of the mobile agent when multiple landmark RFID tags are within the relay range of the mobile agent.

Example 21 includes the method of example 20 and/or some other example(s) herein, further comprising: in response to the determination that the mobile agent that multiple landmark RFID tags are within the relay range of the mobile agent, sending the command and one or more additional commands to the mobile agent to repeatedly reduce the relay range of the mobile agent until it is determined that a single landmark RFID tag of the multiple landmark RFID tags is within the relay range of the mobile agent.

Example 22 includes the method of example 21 and/or some other example(s) herein, further comprising: storing data associating an identifier of the single landmark RFID tag with identifiers of the one or more object RFID tags.

Example 23 includes the method of examples 21-22 and/or some other example(s) herein, wherein the command and the one or more additional commands to reduce the relay range of the mobile agent comprises a command to select and query one or more RFID tags carried by the mobile agent.

Example 24 includes the method of examples 21-23 and/or some other example(s) herein, wherein the commands to reduce the relay range of the mobile agent comprises a command to write data to a user memory of one or more RFID tags carried by the mobile agent.

Example 25 includes the method of examples 20-24 and/or some other example(s) herein, further comprising: performing the method of any combination of examples 1-19.

Example 26 includes a method of operating a mobile agent, the mobile agent including a plurality of radio frequency identification (RFID) chips; and to the method comprises: associating a bit value with each RFID chip based on whether each RFID chip has been selected and queried by an RFID reader remote from the mobile agent; and performing a function based on the bit values.

Example 27 includes the method of example 26 and/or some other example(s) herein, wherein a number of bits per command from the RFID reader is increased when a number of the RFID chips is increased.

Example 28 includes the method of examples 26-27 and/or some other example(s) herein, wherein each RFID chip of the plurality of RFID chips comprises an inter-integrated circuit (I2C) interface arranged to connect respective RFID chips of the plurality of RFID chips to processor circuitry, and the method comprises: sending an interrupt signal to the processor circuitry over an I2C interface of at least one of the RFID chip of the plurality of RFID chips if the at least one RFID chip is selected and queried by the RFID reader.

Example 29 includes the method of examples 26-28 and/or some other example(s) herein, further comprising: configuring relay circuitry to relay signals from the RFID reader towards a set of RFID tags within a relay range of the relay circuitry, wherein the function includes adjusting a power level with which the relay circuitry is to relay the signals from the RFID reader.

Example 30 includes the method of examples 26-29 and/or some other example(s) herein, further comprising: configuring relay circuitry to relay signals from the RFID reader towards a set of RFID tags within a relay range of the relay circuitry, wherein the function includes entering a sleep mode to prevent the relay circuitry from relaying signals from the RFID reader towards the set of RFID tags for a predetermined time period.

Example 31 includes the method of examples 26-30 and/or some other example(s) herein, further comprising: performing the method of any combination of examples 1-21.

Example Z01 includes one or more computer readable media comprising instructions, wherein execution of the instructions by processor circuitry is to cause the processor circuitry to perform the method of any one of examples 1-31.

Example Z02 includes a computer program comprising the instructions of example Z01.

Example Z03a includes an Application Programming Interface defining functions, methods, variables, data structures, and/or protocols for the computer program of example Z02.

Example Z03b includes an API or specification defining functions, methods, variables, data structures, protocols, etc., defining or involving use of any of examples 1-23 or portions thereof, or otherwise related to any of examples 1-23 or portions thereof.

Example Z04 includes an apparatus comprising circuitry loaded with the instructions of example Z01.

Example Z05 includes an apparatus comprising circuitry operable to run the instructions of example Z01.

Example Z06 includes an integrated circuit comprising one or more of the processor circuitry of example Z01 and the one or more computer readable media of example Z01.

Example Z07 includes a computing system comprising the one or more computer readable media and the processor circuitry of example Z01.

Example Z08 includes an apparatus comprising means for executing the instructions of example Z01.

Example Z09 includes a signal generated as a result of executing the instructions of example Z01.

Example Z10 includes a data unit generated as a result of executing the instructions of example Z01.

Example Z11 includes the data unit of example Z10 and/or some other example(s) herein, wherein the data unit is a datagram, network packet, data frame, data segment, a Protocol Data Unit (PDU), a Service Data Unit (SDU), a message, or a database object.

Example Z12 includes a signal encoded with the data unit of examples Z10 and/or Z11.

Example Z13 includes an electromagnetic signal carrying the instructions of example Z01.

Example Z14 includes an apparatus comprising means for performing the method of any one of examples 1-23 and/or some other example(s) herein.

Example Z15 includes an edge compute node executing a service as part of one or more edge applications instantiated on virtualization infrastructure, the service being related to any of examples 1-31, portions thereof, and/or some other example(s) herein.

4. Terminology

As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. The phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," each of which may refer to one or more of the same or different embodiments. Furthermore, the terms "comprising," "including," "having," and the like, as used with respect to the present disclosure, are synonymous.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "signal" at least in some embodiments refers to an observable change in a quality and/or quantity. Additionally or alternatively, the term "signal" at least in some embodiments refers to a function that conveys information about of an object, event, or phenomenon. Additionally or alternatively, the term "signal" at least in some embodiments refers to any time varying voltage, current, or electromagnetic wave that may or may not carry information. The term "digital signal" at least in some embodiments refers to a signal that is constructed from a discrete set of waveforms of a physical quantity so as to represent a sequence of discrete values.

The term "circuitry" at least in some embodiments refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an application-specific integrated circuit (ASIC), field-programmable gate array (FPGA), programmable logic controller (PLC), system on chip (SoC), system in package (SiP), multi-chip package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

The term "processor circuitry" at least in some embodiments refers to, is part of, or includes circuitry capable of sequentially and automatically carrying out a sequence of arithmetic or logical operations, or recording, storing, and/or transferring digital data. The term "processor circuitry" at least in some embodiments refers to one or more application processors, one or more baseband processors, a physical CPU, a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" at least in some embodiments refers to one or more hardware devices for storing data, including RAM, MRAM, PRAM, DRAM, and/or SDRAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" at least in some embodiments refers to, is part of, or includes circuitry that enables the exchange of information between two or more components or devices. The term "interface circuitry" at least in some embodiments refers to one or more hardware interfaces, for example, buses, I/O interfaces, peripheral component interfaces, network interface cards, and/or the like.

The term "device" at least in some embodiments refers to a physical entity embedded inside, or attached to, another physical entity in its vicinity, with capabilities to convey digital information from or to that physical entity.

The term "entity" at least in some embodiments refers to a distinct component of an architecture or device, or information transferred as a payload.

The term "controller" at least in some embodiments refers to an element or entity that has the capability to affect a physical entity, such as by changing its state or causing the physical entity to move.

The term "terminal" at least in some embodiments refers to point at which a conductor from a component, device, or network comes to an end. Additionally or alternatively, the term "terminal" at least in some embodiments refers to an electrical connector acting as an interface to a conductor and creating a point where external circuits can be connected. In some embodiments, terminals may include electrical leads, electrical connectors, electrical connectors, solder cups or buckets, and/or the like.

The term "compute node" or "compute device" at least in some embodiments refers to an identifiable entity implementing an aspect of computing operations, whether part of a larger system, distributed collection of systems, or a standalone apparatus. In some examples, a compute node may be referred to as a "computing device", "computing system", or the like, whether in operation as a client, server, or intermediate entity. Specific implementations of a compute node may be incorporated into a server, base station, gateway, road side unit, on-premise unit, user equipment, end consuming device, appliance, or the like.

The term "computer system" at least in some embodiments refers to any type interconnected electronic devices, computer devices, or components thereof. Additionally, the terms "computer system" and/or "system" at least in some embodiments refer to various components of a computer that are communicatively coupled with one another. Furthermore, the term "computer system" and/or "system" at least in some embodiments refer to multiple computer devices and/or multiple computing systems that are communicatively coupled with one another and configured to share computing and/or networking resources.

The term "architecture" at least in some embodiments refers to a computer architecture or a network architecture. A "computer architecture" is a physical and logical design or arrangement of software and/or hardware elements in a computing system or platform including technology standards for interacts therebetween. A "network architecture" is a physical and logical design or arrangement of software and/or hardware elements in a network including communication protocols, interfaces, and media transmission.

The term "appliance," "computer appliance," or the like, at least in some embodiments refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "user equipment" or "UE" at least in some embodiments refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, station, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface. Examples of UEs, client devices, etc., include desktop computers, workstations, laptop computers, mobile data terminals, smartphones, tablet computers, wearable devices, machine-to-machine (M2M) devices, machine-type communication (MTC) devices, Internet of Things (IoT) devices, embedded systems, sensors, autonomous vehicles, drones, robots, in-vehicle infotainment systems, instrument clusters, onboard diagnostic devices, dashtop mobile equipment, electronic engine management systems, electronic/engine control units/modules, microcontrollers, control module, server devices, network appliances, head-up display (HUD) devices, helmet-mounted display devices, augmented reality (AR) devices, virtual reality (VR) devices, mixed reality (MR) devices, and/or other like systems or devices.

The term "station" or "STA" at least in some embodiments refers to a logical entity that is a singly addressable instance of a medium access control (MAC) and physical layer (PHY) interface to the wireless medium (WM). The term "wireless medium" or WM" at least in some embodiments refers to the medium used to implement the transfer of protocol data units (PDUs) between peer physical layer (PHY) entities of a wireless local area network (LAN).

The term "network element" at least in some embodiments refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, network access node (NAN), base station, access point (AP), RAN device, RAN node, gateway, server, network appliance, network function (NF), virtualized NF (VNF), and/or the like.

The term "access point" or "AP" at least in some embodiments refers to an entity that contains one station (STA) and provides access to the distribution services, via the wireless medium (WM) for associated STAs. An AP comprises a STA and a distribution system access function (DSAF).

The term "base station" at least in some embodiments refers to a network element in a radio access network (RAN), such as a fourth-generation (4G) or fifth-generation (5G) mobile communications network which is responsible for the transmission and reception of radio signals in one or more cells to or from a UE. A base station can have an integrated antenna or may be connected to an antenna array by feeder cables. A base station uses specialized digital signal processing and network function hardware. In some examples, the base station may be split into multiple functional blocks operating in software for flexibility, cost, and performance. In some examples, a base station can include an evolved Node B (eNB) or a next generation Node B (gNB). In some examples, the base station may operate or include compute hardware to operate as a compute node. However, in many of the scenarios discussed herein, a RAN node may be substituted with an access point (e.g., wireless network access point) or other network access hardware.

The term "E-UTEAN NodeB", "eNodeB", or "eNB" at least in some embodiments refers to a RAN node providing E-UTRA user plane (PDCP/RLC/MAC/PHY) and control plane (RRC) protocol terminations towards a UE, and connected via an S1 interface to the Evolved Packet Core (EPC). Two or more eNBs are interconnected with each other (and/or with one or more en-gNBs) by means of an X2 interface.

The term "next generation eNB" or "ng-eNB" at least in some embodiments refers to a RAN node providing E-UTRA user plane and control plane protocol terminations towards a UE, and connected via the NG interface to the 5GC. Two or more ng-eNBs are interconnected with each other (and/or with one or more gNBs) by means of an Xn interface.

The term "Next Generation NodeB", "gNodeB", or "gNB" at least in some embodiments refers to a RAN node providing NR user plane and control plane protocol terminations towards a UE, and connected via the NG interface to the 5GC. Two or more gNBs are interconnected with each other (and/or with one or more ng-eNBs) by means of an Xn interface.

The term "E-UTRA-NR gNB" or "en-gNB" at least in some embodiments refers to a RAN node providing NR user plane and control plane protocol terminations towards a UE, and acting as a Secondary Node in E-UTRA-NR Dual Connectivity (EN-DC) scenarios (see e.g., 3GPP TS 37.340 v16.6.0 (2021-07-09)). Two or more en-gNBs are interconnected with each other (and/or with one or more eNBs) by means of an X2 interface.

The term "Next Generation RAN node" or "NG-RAN node" at least in some embodiments refers to either a gNB or an ng-eNB.

The term "Central Unit" or "CU" at least in some embodiments refers to a logical node hosting radio resource control (RRC), Service Data Adaptation Protocol (SDAP), and/or Packet Data Convergence Protocol (PDCP) protocols/layers of an NG-RAN node, or RRC and PDCP protocols of the en-gNB that controls the operation of one or more DUs; a CU terminates an F1 interface connected with a DU and may be connected with multiple DUs.

The term "Distributed Unit" or "DU" at least in some embodiments refers to a logical node hosting radio link control (RLC), medium access control (MAC), and physical (PHY) layers of the NG-RAN node or en-gNB, and its operation is partly controlled by a CU; one DU supports one or multiple cells, and one cell is supported by only one DU; and a DU terminates the F1 interface connected with a CU.

The term "Residential Gateway" or "RG" at least in some embodiments refers to a device providing, for example, voice, data, broadcast video, video on demand, to other devices in customer premises. The term "Wireline 5G Access Network" or "W-5GAN" at least in some embodiments refers to a wireline AN that connects to a 5GC via N2 and N3 reference points. The W-5GAN can be either a W-5GBAN or W-5GCAN. The term "Wireline 5G Cable Access Network" or "W-5GCAN" at least in some embodiments refers to an Access Network defined in/by CableLabs. The term "Wireline BBF Access Network" or "W-5GBAN" at least in some embodiments refers to an Access Network defined in/by the Broadband Forum (BBF). The term "Wireline Access Gateway Function" or "W-AGF" at least in some embodiments refers to a Network function in W-5GAN that provides connectivity to a 3GPP 5G Core network (5GC) to 5G-RG and/or FN-RG. The term "5G-RG" at least in some embodiments refers to an RG capable of connecting to a 5GC playing the role of a user equipment with regard to the 5GC; it supports secure element and exchanges N1 signaling with 5GC. The 5G-RG can be either a 5G-BRG or 5G-CRG.

The term "edge computing" encompasses many implementations of distributed computing that move processing activities and resources (e.g., compute, storage, acceleration resources) towards the "edge" of the network, in an effort to reduce latency and increase throughput for endpoint users (client devices, user equipment, etc.). Such edge computing implementations typically involve the offering of such activities and resources in cloud-like services, functions, applications, and subsystems, from one or multiple locations accessible via wireless networks. Thus, the references to an "edge" of a network, cluster, domain, system or computing arrangement used herein are groups or groupings of functional distributed compute elements and, therefore, generally unrelated to "edges" (links or connections) as used in graph theory.

The term "central office" (or CO) indicates an aggregation point for telecommunications infrastructure within an accessible or defined geographical area, often where telecommunication service providers have traditionally located switching equipment for one or multiple types of access networks. The CO can be physically designed to house telecommunications infrastructure equipment or compute, data storage, and network resources. The CO need not, however, be a designated location by a telecommunications service provider. The CO may host any number of compute devices for Edge applications and services, or even local implementations of cloud-like services.

The term "cloud computing" or "cloud" at least in some embodiments refers to a paradigm for enabling network access to a scalable and elastic pool of shareable computing resources with self-service provisioning and administration on-demand and without active management by users. Cloud computing provides cloud computing services (or cloud services), which are one or more capabilities offered via cloud computing that are invoked using a defined interface (e.g., an API or the like).

The term "computing resource" or simply "resource" at least in some embodiments refers to any physical or virtual component, or usage of such components, of limited availability within a computer system or network. Examples of computing resources include usage/access to, for a period of time, servers, processor(s), storage equipment, memory devices, memory areas, networks, electrical power, input/ output (peripheral) devices, mechanical devices, network connections (e.g., channels/links, ports, network sockets, etc.), operating systems, virtual machines (VMs), software/applications, computer files, and/or the like. A "hardware resource" at least in some embodiments refers to compute, storage, and/or network resources provided by physical hardware element(s). A "virtualized resource" at least in some embodiments refers to to compute, storage, and/or network resources provided by virtualization infrastructure to an application, device, system, etc. The term "network resource" or "communication resource" at least in some embodiments refers to resources that are accessible by computer devices/systems via a communications network. The term "system resources" at least in some embodiments refers to to any kind of shared entities to provide services, and may include computing and/or network resources. System resources may be considered as a set of coherent functions, network data objects or services, accessible through a server where such system resources reside on a single host or multiple hosts and are clearly identifiable.

The term "workload" at least in some embodiments refers to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by a processor during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "cloud service provider" (or CSP) indicates an organization which operates typically large-scale "cloud" resources comprised of centralized, regional, and Edge data centers (e.g., as used in the context of the public cloud). In other examples, a CSP may also be referred to as a Cloud Service Operator (CSO). References to "cloud computing" generally refer to computing resources and services offered by a CSP or a CSO, at remote locations with at least some increased latency, distance, or constraints relative to Edge computing.

The term "data center" at least in some embodiments refers to a purpose-designed structure that is intended to house multiple high-performance compute and data storage nodes such that a large amount of compute, data storage and network resources are present at a single location. This often entails specialized rack and enclosure systems, suitable heating, cooling, ventilation, security, fire suppression, and power delivery systems. The term may also refer to a compute and data storage node in some contexts. A data center may vary in scale between a centralized or cloud data center (e.g., largest), regional data center, and edge data center (e.g., smallest).

The term "access edge layer" indicates the sub-layer of infrastructure edge closest to the end user or device. For example, such layer may be fulfilled by an edge data center deployed at a cellular network site. The access edge layer functions as the front line of the infrastructure Edge and may connect to an aggregation Edge layer higher in the hierarchy.

The term "aggregation edge layer" indicates the layer of infrastructure edge one hop away from the access edge layer. This layer can exist as either a medium-scale data center in a single location or may be formed from multiple interconnected micro data centers to form a hierarchical topology with the access Edge to allow for greater collaboration, workload failover, and scalability than access Edge alone.

The term "network function virtualization" (or NFV) indicates the migration of NFs from embedded services inside proprietary hardware appliances to software-based virtualized NFs (or VNFs) running on standardized CPUs (e.g., within standard x86® and ARM® servers, such as those including Intel® Xeon™ or AMD® Epyc™ or Opteron™ processors) using industry standard virtualization and cloud computing technologies. Additionally or alternatively, NFV processing and data storage will occur at the Edge data centers that are connected directly to the local cellular site, within the infrastructure Edge.

The term "virtualized NF" (or VNF) indicates a software-based NF operating on multi-function, multi-purpose compute resources (e.g., x86, ARM processing architecture) which are used by NFV in place of dedicated physical equipment. Additionally or alternatively, several VNFs will operate on an Edge data center at the infrastructure Edge.

The term "edge compute node" or "edge compute device" at least in some embodiments refers to an identifiable entity implementing an aspect of edge computing operations, whether part of a larger system, distributed collection of systems, or a standalone apparatus. In some examples, a compute node may be referred to as a "edge node", "edge device", "edge system", whether in operation as a client, server, or intermediate entity. Additionally or alternatively, the term "edge compute node" at least in some embodiments refers to a real-world, logical, or virtualized implementation of a compute-capable element in the form of a device, gateway, bridge, system or subsystem, component, whether operating in a server, client, endpoint, or peer mode, and whether located at an "edge" of an network or at a connected location further within the network. References to a "node" used herein are generally interchangeable with a "device", "component", and "sub-system"; however, references to an "edge computing system" generally refer to a distributed architecture, organization, or collection of multiple nodes and devices, and which is organized to accomplish or offer some aspect of services or resources in an edge computing setting.

The term "cluster" at least in some embodiments refers to a set or grouping of entities as part of an Edge computing system (or systems), in the form of physical entities (e.g., different computing systems, networks or network groups), logical entities (e.g., applications, functions, security constructs, containers), and the like. In some locations, a "cluster" is also referred to as a "group" or a "domain". The membership of cluster may be modified or affected based on conditions or functions, including from dynamic or property-based membership, from network or system management scenarios, or from various example techniques discussed below which may add, modify, or remove an entity in a cluster. Clusters may also include or be associated with multiple layers, levels, or properties, including variations in security features and results based on such layers, levels, or properties.

The term "Data Network" or "DN" at least in some embodiments refers to a network hosting data-centric services such as, for example, operator services, the internet, third-party services, or enterprise networks. Additionally or alternatively, a DN at least in some embodiments refers to service networks that belong to an operator or third party, which are offered as a service to a client or user equipment (UE). DNs are sometimes referred to as "Packet Data Networks" or "PDNs". The term "Local Area Data Network" or "LADN" at least in some embodiments refers to a DN that is accessible by the UE only in specific locations, that provides connectivity to a specific DNN, and whose availability is provided to the UE.

The term "Internet of Things" or "IoT" at least in some embodiments refers to a system of interrelated computing devices, mechanical and digital machines capable of transferring data with little or no human interaction, and may involve technologies such as real-time analytics, machine learning and/or AI, embedded systems, wireless sensor networks, control systems, automation (e.g., smart home, smart building and/or smart city technologies), and the like. IoT devices are usually low-power devices without heavy compute or storage capabilities. The term "Edge IoT devices" at least in some embodiments refers to any kind of IoT devices deployed at a network's edge.

Although many of the previous examples are provided with use of specific cellular/mobile network terminology, including with the use of 4G/5G 3GPP network components (or expected terahertz-based 6G/6G+ technologies), it will be understood these examples may be applied to many other deployments of wide area and local wireless networks, as well as the integration of wired networks (including optical networks and associated fibers, transceivers, etc.).

Furthermore, various standards (e.g., 3GPP, ETSI, etc.) may define various message formats, PDUs, containers, frames, etc., as comprising a sequence of optional or mandatory data elements (DEs), data frames (DFs), information elements (IEs), and/or the like. However, it should be understood that the requirements of any particular standard should not limit the embodiments discussed herein, and as such, any combination of containers, frames, DFs, DEs, IEs, values, actions, and/or features are possible in various embodiments, including any combination of containers, DFs, DEs, values, actions, and/or features that are strictly required to be followed in order to conform to such standards or any combination of containers, frames, DFs, DEs, IEs, values, actions, and/or features strongly recommended and/or used with or in the presence/absence of optional elements.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

The invention claimed is:

1. A relay circuit comprising:
radio frequency (RF) circuitry to:
receive an instruction signal from an RF identification (RFID) reader to cause the relay circuit to (i) enter a sleep mode for a time period based on a determination that a relay range of the relay circuit overlaps with multiple RFID readers, and (ii) power back on after expiration of the time period; and
receive signals from one or more RFID tags within the relay range of the relay circuit;
instructions; and
at least one processor circuit to be programmed based on the instructions to configure the RF circuitry to:
relay signals received from the RFID reader to the one or more RFID tags, the relayed signals having a power level that is adjustable based on commands from the RFID reader; and
relay the signals from the one or more RFID tags to the RFID reader, the signals from the one or more RFID tags including responses to the signals from the RFID reader.

2. The relay circuit of claim 1, wherein the signals from the RFID reader and the signals from the one or more RFID tags are to identify one or more landmark RFID tags and one or more object RFID tags.

3. The relay circuit of claim 2, including one or more on-board RFID tags, wherein:
at least one of the on-board RFID tags includes an interface to one or more of the at least one processor circuit; and
based on multiple ones of the landmark RFID tags and the one or more object RFID tags being within the relay range of the relay circuit, one or more of the at least one processor circuit is to reduce the power level until a single landmark RFID tag of the one or more landmark RFID tags is within the relay range of the relay circuit.

4. The relay circuit of claim 2, including one or more on-board RFID tags, wherein:
at least one of the on-board RFID tags includes an interface to one or more of the at least one processor circuit; and
based on multiple landmark RFID tags and the one or more object RFID tags being within the relay range of the relay circuit, one or more of the at least one processor circuit is to reduce the power level to reduce a number of landmark RFID tags within the relay range of the relay circuit.

5. The relay circuit of claim 1, including one or more on-board RFID tags, wherein:

at least one of the on-board RFID tags includes an interface to one or more of the at least one processor circuit;

the RF circuitry is to receive select and query signals for the one or more on-board RFID tags from the RFID reader; and one or more of the at least one processor circuit is to:

associate respective bit values with ones of the on-board RFID tags based on whether the ones of the on-board RFID tags have been selected and queried by the RFID reader; and adjust the power level based on the bit values.

6. The relay circuit of claim 5, wherein an individual one of the one or more on-board RFID tags is to trigger an interrupt of one or more of the at least one processor circuit based on the individual one of the one or more on-board RFID tags being selected and queried.

7. The relay circuit of claim 1, including an on-board RFID tag, wherein:

the RF circuitry is to receive select and write signals from the RFID reader to cause the on-board RFID tag to write data to a user memory of the on-board RFID tag; and one or more of the at least one processor circuit is to adjust the power level based on the data in the user memory.

8. The relay circuit of claim 1, wherein one or more of the at least one processor circuit is to adjust the power level based on a density of RFID tags within the relay range of the relay circuit.

9. The relay circuit of claim 1, including:

a printed circuit board to be carried by a mobility mechanism, wherein the RF circuitry, and one or more of the at least one processor circuit are disposed on the printed circuit board.

10. The relay circuit of claim 1, wherein one or more of the at least one processor circuit is to:

track a signal strength of an active RFID tag; and navigate toward the active RFID tag based on the tracked signal strength.

11. The relay circuit of claim 1, wherein the RF circuitry includes:

a downlink path to relay the signals from the RFID reader at the power level to the one or more RFID tags; and the downlink path includes a digital attenuator to set the power level.

12. The relay circuit of claim 1, wherein the RF circuitry includes:

a first antenna to receive the signals from the RFID reader;

a second antenna to receive the signals from the one or more RFID tags; and a set of hardware (HW) elements to relay the signals from the RFID reader and the signals from the one or more RFID tags, the set of HW elements configurable by one or more of the at least one processor circuit.

13. The relay circuit of claim 12, wherein the first antenna is different than the second antenna, or the first and second antennas are a same antenna.

14. The relay circuit of claim 12, wherein the RF circuitry is to:

relay the signals from the RFID reader or the signals from the one or more RFID tags from at least one HW element of the set of HW elements to at least one other HW element of the set of HW elements.

15. The relay circuit of claim 12, wherein the RF circuitry is to:

receive the signals from the RFID reader through the first antenna;

relay the received signals from the RFID reader at the power level through a first subset of the set of HW elements to the second antenna for transmission to the one or more RFID tags;

receive the signals from the one or more RFID tags through the second antenna; and relay the received signals from the one or more RFID tags through a second subset of the set of HW elements to the first antenna for transmission to the RFID reader.

16. At least one non-transitory computer readable medium comprising instructions to cause a compute node to:

communicate with a mobile agent to identify one or more landmark radio frequency identification (RFID) tags and one or more object RFID tags within a relay range of the mobile agent;

send a first command to the mobile agent to reduce the relay range of the mobile agent when based on a determination that multiple landmark RFID tags are within the relay range of the mobile agent; and send a second command to the mobile agent to set a sleep mode for a time period and power back on after expiration of the time period based on a determination that the relay range of the mobile agent overlaps with multiple RFID readers.

17. The at least one non-transitory computer readable medium of claim 16, wherein the instructions are to cause the compute node to:

based on the determination that multiple landmark RFID tags are within the relay range of the mobile agent, send additional commands to the mobile agent to repeatedly reduce the relay range of the mobile agent until a single landmark RFID tag of the multiple landmark RFID tags is within the relay range of the mobile agent.

18. The at least one non-transitory computer readable medium of claim 17, wherein the instructions are to cause the compute node to:

store data associating an identifier of the single landmark RFID tag with identifiers of the one or more object RFID tags.

19. The at least one non-transitory computer readable medium of claim 17, wherein the first command includes a command to select and query one or more RFID tags carried by the mobile agent.

20. The at least one non-transitory computer readable medium of claim 16, wherein the first command includes a command to write data to a user memory of one or more RFID tags carried by the mobile agent.

21. A mobile agent comprising:

a plurality of radio frequency identification (RFID) chips;

instructions; and processor circuitry coupled to the plurality of RFID chips, the processor circuitry to be programmed based on the instructions to:

associate respective bit values with ones of the RFID chips based on whether the ones of the RFID have been selected and queried by an RFID reader remote from the mobile agent;

perform a function based on the bit values; and obtain an instruction from the RFID reader to (i) enter a sleep mode for a time period based on a landmark tag being within a relay range of the mobile agent, and (ii) power back on after expiration of the time period.

22. The mobile agent of claim 21, wherein:

a number of bits per command from the RFID reader is increased when a number of the RFID chips is increased.

23. The mobile agent of claim 21, wherein at least one of the RFID chips includes an inter-integrated circuit (I2C) interface to:

connect the at least one of the RFID chips to the processor circuitry, and carry an interrupt signal to the processor circuitry based on the at least one of the RFID chips being selected and queried by the RFID reader.

24. The mobile agent of claim 21, including:

relay circuitry to relay signals from the RFID reader to a set of RFID tags within a relay range of the relay circuitry, wherein the function is to adjust a power level with which the relay circuitry is to relay the signals from the RFID reader.

25. The mobile agent of claim 21, including:

relay circuitry to relay signals from the RFID reader to a set of RFID tags within a relay range of the relay circuitry, wherein the function is to cause the relay circuitry to enter a sleep mode to prevent the relay circuitry from relaying signals from the RFID reader to the set of RFID tags for a time period.

* * * * *